(12) United States Patent
Keinert et al.

(10) Patent No.: US 12,033,339 B2
(45) Date of Patent: *Jul. 9, 2024

(54) LOCALIZATION OF ELEMENTS IN THE SPACE

(71) Applicant: Fraunhofer-Gesellschaft zur Förderung der angewandten Forschung e.V., Munich (DE)

(72) Inventors: Joachim Keinert, Erlangen (DE); Thorsten Wolf, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 414 days.

This patent is subject to a terminal disclaimer.

(21) Appl. No.: 17/387,051

(22) Filed: Jul. 28, 2021

(65) Prior Publication Data
US 2021/0357622 A1    Nov. 18, 2021

Related U.S. Application Data

(63) Continuation of application No. PCT/EP2019/052027, filed on Jan. 28, 2019.

(51) Int. Cl.
*G06T 7/50* (2017.01)
*G06F 18/214* (2023.01)
(Continued)

(52) U.S. Cl.
CPC ............. *G06T 7/50* (2017.01); *G06F 18/214* (2023.01); *G06T 7/70* (2017.01); *G06T 15/04* (2013.01);
(Continued)

(58) Field of Classification Search
CPC .. G06T 7/50; G06T 7/70; G06T 15/04; G06T 15/08; G06T 2207/20092; G06T 7/73;
(Continued)

(56) References Cited

U.S. PATENT DOCUMENTS 8,340,402 B2 * 12/2012 Schmitt ................ H04N 13/271
382/154
9,208,541 B2    12/2015 Kim
(Continued)

FOREIGN PATENT DOCUMENTS

CN    101443817 A    5/2009
CN    103503025 A    1/2014
(Continued)

OTHER PUBLICATIONS

Alicevision, "MeshroomMaya Photomodeling plugin for Maya", https://github.com/alicevision/MeshroomMaya, Apr. 10, 2021, 2 pp.
(Continued)

*Primary Examiner* — Edward F Urban
*Assistant Examiner* — Benedict E Lee
(74) *Attorney, Agent, or Firm* — Perkins Coie LLP; Michael A. Glenn

(57) ABSTRACT

A method for localizing, in a space containing at least one determined object, an object element associated to a particular 2D representation element in a determined 2D image of the space, may have: deriving a range or interval of candidate spatial positions for the imaged object element on the basis of predefined positional relationships); restricting the range or interval of candidate spatial positions to at least one restricted range or interval of admissible candidate spatial positions, wherein restricting includes at least one of: limiting the range or interval of candidate spatial positions using at least one inclusive volume surrounding at least one determined object; and limiting the range or interval of candidate spatial positions using at least one exclusive volume surrounding non-admissible candidate spatial positions; and retrieving, among the admissible candidate spatial positions of the restricted range or interval, a most appro-
(Continued)

priate candidate spatial position on the basis of similarity metrics.

13 Claims, 49 Drawing Sheets

(51) Int. Cl.
    *G06T 7/70*     (2017.01)
    *G06T 15/04*     (2011.01)
    *G06T 15/08*     (2011.01)
    *G06V 20/64*     (2022.01)

(52) U.S. Cl.
    CPC .......... *G06T 15/08* (2013.01); *G06V 20/647* (2022.01); *G06V 20/653* (2022.01); *G06T 2207/20092* (2013.01)

(58) Field of Classification Search
    CPC ......... G06T 7/75; G06T 7/557; G06F 18/214; G06V 20/64; G06V 20/647; G06V 20/653; H04N 13/00; H04N 13/128; H04N 2013/0081
    See application file for complete search history.

(56) References Cited

U.S. PATENT DOCUMENTS

| | | | |
|---|---|---|---|
| 9,208,547 B2 | 12/2015 | Cohen et al. | |
| 9,609,307 B1 * | 3/2017 | Lopez | G06T 7/557 |
| 9,922,244 B2 * | 3/2018 | Klement | G06V 10/426 |
| 10,062,199 B2 * | 8/2018 | Schoeneman | G06T 15/40 |
| 10,296,812 B2 * | 5/2019 | Dabeer | G06V 20/56 |
| 10,313,639 B2 * | 6/2019 | Wei | G06T 7/33 |
| 10,445,928 B2 * | 10/2019 | Nehmadi | G06T 3/4007 |
| 11,644,901 B2 * | 5/2023 | Ette | G06T 7/60 382/103 |
| 2003/0091226 A1 | 5/2003 | Cahill et al. | |
| 2009/0129666 A1 | 5/2009 | Goevert et al. | |
| 2011/0096832 A1 | 4/2011 | Zhang et al. | |
| 2012/0155743 A1 | 6/2012 | Kim | |
| 2013/0129192 A1 | 5/2013 | Wang et al. | |
| 2013/0176300 A1 | 7/2013 | Philippe et al. | |
| 2013/0258062 A1 | 10/2013 | Noh et al. | |
| 2013/0336583 A1 | 12/2013 | Ernst et al. | |
| 2015/0042658 A1 | 2/2015 | Erhard et al. | |
| 2015/0269737 A1 | 9/2015 | Lam et al. | |
| 2016/0155011 A1 | 6/2016 | Sulc et al. | |
| 2018/0225968 A1 | 8/2018 | Wang | |
| 2018/0342076 A1 | 11/2018 | Chen et al. | |
| 2021/0358163 A1 * | 11/2021 | Keinert | G06T 7/50 |

FOREIGN PATENT DOCUMENTS

| | | |
|---|---|---|
| CN | 107358629 A | 11/2017 |
| CN | 108399218 A | 8/2018 |
| EP | 3525167 A1 | 8/2019 |
| WO | 2012084277 A1 | 6/2012 |

OTHER PUBLICATIONS

Blender, "Blender Renderer Passes", https://docs.blender.org/manual/en/latest/render/blender_render/settings/passes.html, accessed Dec. 18, 2018, Dec. 18, 2018, 8 pp.

Bleyer, Michael, et al., "PatchMatch Stereo-Stereo Matching with Slanted Support Windows", in BMVC, 2011, vol. 11 http://dx.doi.org/10.5244/C.25.14, pp. 1-11.

Cao, Xun, et al., "Semi-automatic 2D-to-3D conversion using disparity propagation", IEEE Transactions on Broadcasting, vol. 57, No. 2, pp. 491-499, 2011, pp. 491-499.

Donatsch, Daniel, et al., "3D conversion using vanishing points and image warping", 3DTV-Conference: The True Vision-Capture, Transmission and Dispaly of 3D Video (3DTV-CON), 2013, pp. 1-4.

Enwaii, "Photogrammetry software for VFX—Ewasculpt", http://www.banzaipipeline.com/product_enwasculpt.html, accessed Dec. 18, 2018, Dec. 18, 2018, 1 p.

Glyph, "The Mattepainting Tooklit", http://www.glyphfx.com/mptk.html, accessed Dec. 18, 2018, Dec. 18, 2018, 3 pp.

Hirschmüller, Heiko, et al., "Evaluation of Stereo Matching Costs on Images with Radiometric Differences", IEEE Transactions on pattern analysis and machine intelligence, Aug. 2008, 17 pp.

Knorr, Sebastian, et al., "DeepStereoBrush: Interactive Depth Map Creation", International Conference on 3D Immersion, Brussels, Belgium, 2018, 8 pp.

Lin, Caizhang, et al., "Interactive Disparity Map Post-processing", Second International Conference on 3D Imaging, Modeling, Processing, Visualization and Transmission (3DIMPVT), 2012, pp. 448-455.

Schönberger, Johannes L, "Pixelwise View Selection for Unstructured Multi-View Stereo", ECCV 2016: Computer Vision—ECCV 2016, 2016, pp. 501-518.

Schönberger, Johannes L, et al., "Structure-from-Motion Revisited", Conference on Computer Vision and Pattern Recognition (CVPR), 2016, 2016, 10 pp.

Wikipedia, "Fle: Epipolar geometry.svg", https://en.wikipedia.org/wiki/File:Epipolar_geometry.svg, 2007, 4 pp.

Wildeboer, Meindert Onno, et al., "A semi-automatic depth estimation method for FTV", Special Issue Image Processing/Coding and Applications, vol. 64, No. 11, 2010., 2010, pp. 1678-1684.

Yuan, Hongxing, et al., "Robust Semiautomatic 2D-to-3D Conversion with Welsch M-Estimator for Data Fidelity", Mathematical Problems in Engineering, vol. 2018, 15 pp.

* cited by examiner

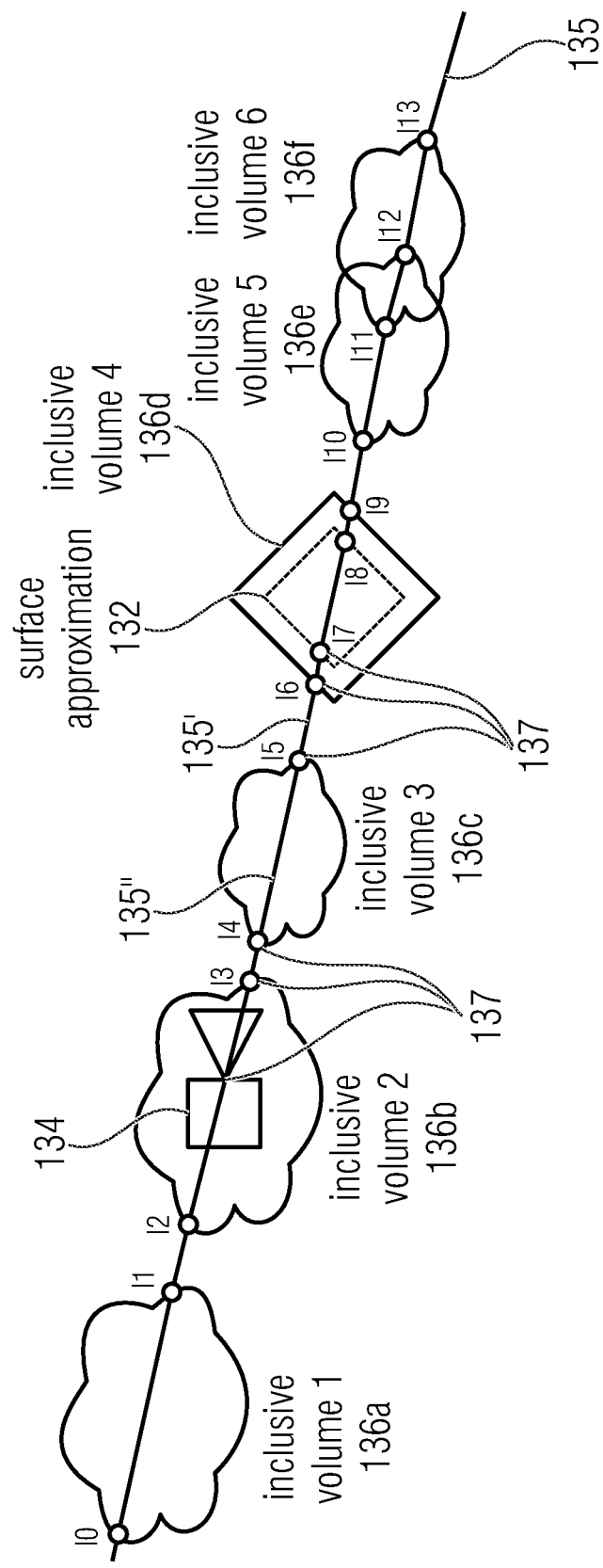

LOCALIZATION OF ELEMENTS IN THE SPACE

CROSS-REFERENCE TO RELATED APPLICATIONS

This application is a continuation of copending International Application No. PCT/EP2019/052027, filed Jan. 28, 2019, which is incorporated herein by reference in its entirety.

1 TECHNICAL FIELD

Examples here refer to techniques (methods, systems, etc.) for localizing object elements in an imaged space.

For example, some techniques relate with computation of admissible depth intervals for (e.g., semi-automatic) depth map estimation, e.g., based on 3D geometry primitives.

Examples may related to 2D images obtained in multi-camera systems.

2 TECHNIQUES DISCUSSED HERE

Having multiple images from a scene permits to compute depth or disparity values for each pixel of the image. Unfortunately, automatic depth estimation algorithms are error prone and not able to provide an error-free depth map.

To correct those errors, the literature proposes a depth map refinement based on meshes, in that the distance of the mesh is an approximation of the admissible depth value. However, so far no clear description how the admissible depth interval can be computed is available. Moreover, it is not considered that the mesh only partially represents a scene, and specific methods are needed to avoid wrong depth map constraints.

Present examples propose, inter alia, methods for attaining such purpose. The present application further describes methods to compute a set of admissible depth intervals (or more in general a range or interval of candidate spatial positions) from a given 3D geometry of a mesh, for example. Such a set of depth intervals (or range or interval of candidate spatial positions) may disambiguate the problem of correspondence detection and hence improve the overall resulting depth map quality. Moreover, the present application further shows how inaccuracies in the 3D geometries can be compensated by so called inclusive volumes to avoid wrong mesh constraints. Moreover, inclusive volumes can also be used to cope with occluders to prevent wrong depth values.

In general, examples relate to a method for localizing, in a space (e.g., 3D space) containing at least one determined object, an object element (e.g., the part of the surface of the object which is imaged in the 2D image) which is associated to a particular 2D representation element (e.g., a pixel) in a determined 2D image of the space. The depth of the object element may therefore be obtained.

In examples, the imaged space may contain more than one object, such as a first object and a second object, and it may be requested to determine whether a pixel (or more in general a 2D representation element) is to be associated to the first imaged object or the second imaged object. It is also possible to obtain the depth of the object element in the space: the depth for each object element will be similar to the depths of the neighbouring elements of the same object.

Examples above and below may be based on multi-camera systems (e.g., stereoscopic systems or light-field camera arrays, e.g. for virtual movie productions, virtual reality, etc.), in which each different camera acquires a respective 2D image of the same space (with the same objects) from different angles (more in general, on the basis of a predefined positional and/or geometrical relationship). By relying on the known predefined positional and/or geometrical relationship, is possible to localize each pixel (or more in general each 2D representation element). For example, epi-polar geometry may be used.

It is also possible to reconstruct the shape of one or more object(s) placed within the imaged space, e.g., by localizing multiple pixels (or more in general 2D representation elements), to construct a complete depth map.

In general terms, the processing power wasted by processing units for performing these methods are not negligible. Therefore, it is in general requested to reduce the involved computational effort.

SUMMARY

According to an embodiment, a method for localizing, in a space containing at least one determined object, an object element associated to a particular 2D representation element in a determined 2D image of the space, may have the steps of: deriving a range or interval of candidate spatial positions for the imaged object element on the basis of predefined positional relationships; restricting the range or interval of candidate spatial positions to at least one restricted range or interval of admissible candidate spatial positions, wherein restricting includes defining at least one surface approximation, so as to limit the at least one range or interval of candidate spatial positions to a restricted range or interval of candidate spatial positions; considering a normal vector of the surface approximation located at the intersection between the surface approximation and the range or interval of candidate spatial positions; retrieving, among the admissible candidate spatial positions of the restricted range or interval, a most appropriate candidate spatial position on the basis of similarity metrics, wherein retrieving includes retrieving, among the admissible candidate spatial positions of the restricted range or interval and on the basis of the normal vector, a most appropriate candidate spatial position on the basis of similarity metrics involving the normal vector.

According to another embodiment, a system for localizing, in a space for containing at least one determined object, an object element associated to a particular 2D representation element in a determined 2D image of the space, may have: a deriving block for deriving a range or interval of candidate spatial positions for the imaged object element on the basis of predefined positional relationships, wherein the range or interval of candidate spatial positions for the imaged object element is developed in a depth direction with respect to the determined 2D representation element; a restricting block for restricting the range or interval of candidate spatial positions to at least one restricted range or interval of admissible candidate spatial positions; a retrieving block for retrieving, among the admissible candidate spatial positions of the restricted range or interval, a most appropriate candidate spatial position on the basis of similarity metrics, wherein retrieving includes retrieving, among the admissible candidate spatial positions of the restricted range or interval and on the basis of a normal vector, a most appropriate candidate spatial position on the basis of similarity metrics involving the normal vector, wherein the normal vector of the surface approximation is located at the intersection between the surface approximation and the range or interval of candidate spatial positions.

Another embodiment may have a non-transitory storage unit including instructions which, when executed by a processor, cause the processor to perform the inventive method for localizing, in a space containing at least one determined object, an object element associated to a particular 2D representation element in a determined 2D image of the space.

BRIEF DESCRIPTION OF THE DRAWINGS

Embodiments of the present invention will be detailed subsequently referring to the appended drawings, in which:

FIG. 4 illustrates to a technique for approximating an object using a surface approximation.

FIG. 5 illustrates competing constraints due to approximate surface approximations;

FIG. 6 illustrates the challenge of occluding objects for determination of the admissible depth interval.

FIGS. 7-38 show techniques according to the present examples, and in particular:

FIG. 7 shows admissible locations and depth values induced by a surface approximation;

FIG. 8 shows admissible locations and depth values induced by an inclusive volume;

FIG. 9 illustrates a use of inclusive volumes to bound the admissible depth values allowed by a surface approximation;

FIG. 10 illustrates a concept for coping with occluding objects;

FIG. 11 illustrates a concept for solving competing constraints;

FIGS. 12 and 12a show planar surface approximations and their comparison with closed volume surface approximations;

FIG. 13 shows an example of restricted range of admissible candidate positions (ray) intersecting several inclusive volumes and one surface approximation;

FIG. 14 shows an example for derivation of the admissible depth ranges by means of a tolerance value;

FIG. 15 illustrates an aggregation of matching costs between two 2D images for computation of similarity metrics;

FIG. 16 shows an implementation with a slanted plane;

FIG. 17 shows the relation of 3D points (X, Y, Z) in a camera coordinate system and a corresponding pixel;

FIG. 18 shows an example of a generation of an inclusive volume by scaling a surface approximation relating to a scaling center;

FIG. 19 illustrates the creation of an inclusive volume from a planar surface approximation;

FIG. 20 shows an example of surface approximation represented by a triangle structure.

FIG. 21 shows an example of an initial surface approximation where all triangles elements have been shifted in the 3D space along their normal vector;

FIG. 22 shows an example of reconnected mesh elements;

FIG. 23 shows a technique for duplicating control points;

FIG. 24 illustrates the reconnection of the duplicated control points such that all control points originating from the same initial control point are directly connected by a mesh;

FIG. 25 shows an original triangle element intersected by another triangle element;

FIG. 26 shows a triangle structure decomposed into three new sub-triangle structures;

FIG. 27 shows an example of exclusive volumes;

FIG. 28 shows an example of a closed volume;

FIG. 29 shows an example of exclusive volumes;

FIG. 30 shows an example of planar exclusive volumes;

FIG. 31 shows an example of image-based rendering or displaying;

FIG. 32 shows an example of determination of the pixels causing the view-rendering (or displaying) artefacts;

FIG. 33 shows an example of epi-polar editing mode;

FIG. 34 illustrates a principle of the free epi-polar editing mode;

FIG. 35 shows a method according to an example;

FIG. 36 shows a system according to an example;

FIG. 37 shows an implementation according to an example (e.g., for exploiting multi-camera consistency);

FIG. 38 shows a system according to an example.

DETAILED DESCRIPTION OF THE INVENTION

3 BACKGROUND 2D photos captured by a digital camera provide a faithful reproduction of a scene (e.g., one or more objects within in a space). Unfortunately, this reproduction is valid for a single point of view. This is too limited for advanced applications, such as virtual movie productions or virtual reality. Instead, the latter involve generation of novel views from the captured material.

Such creation of novel views is possible in different ways. The most straightforward approach is to create a mesh or a point cloud from the captured data [12][13]. Alternatively, depth image-based rendering or displaying can be applied.

In both cases it is entailed to compute a depth map per view point for the captured scene. A view point corresponds to one camera position from which the scene has been captured. A depth map assigns to each pixel of the considered captured image a depth value.

Figure 1:
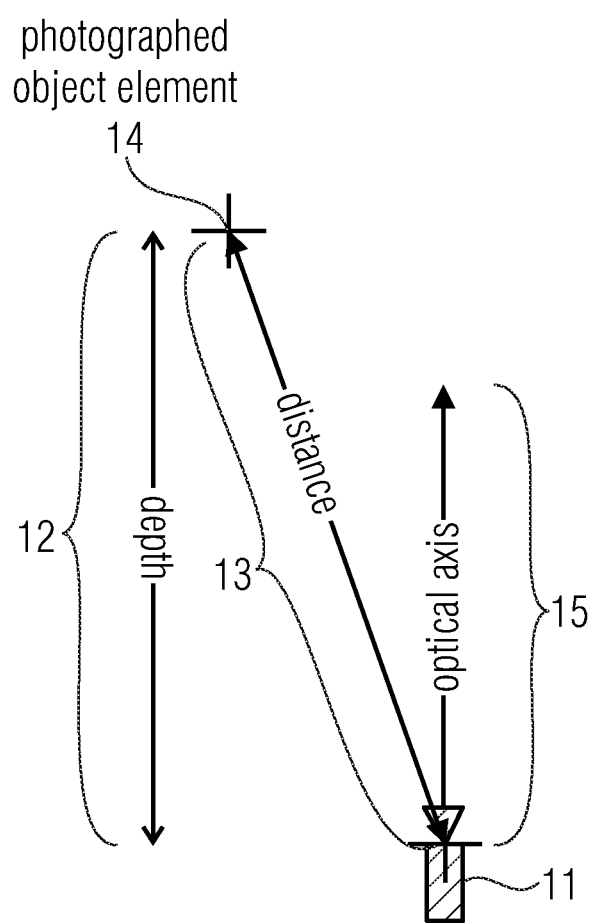
FIG. 1 refers a localization technique and in particular relates to the definition of depth.

The depth value 12 is the projection of the object element distance 13 on the optical axis 15 of the camera 1 as depicted in FIG. 1. The object element 14 is to be understood as an (ideally 0-dimensional) element that is represented by a 2D representation element (which may be a pixel, even if it would ideally be 0-dimensional). The object element 14 may be an element of the surface of a solid, opaque object (of course, in case of transparent objects, the object element may be refracted by the transparent object according to the laws of optics).

In order to obtain the depth value 12 per pixel (or more in general per 2D representation element), there exist different methods:

Usage of active depth sensing devices such as structured illumination, or LIDAR

Computation of the depth from multiple images of the same scene

A combination of both

While all of these methods have their merits, the computation of depth from multiple images excels by its low costs, its short capture times and the high-resolution depth maps. Unfortunately, it is not free of errors. If such an erroneous depth map is directly used in one of the applications mentioned before, the synthesis of novel views would result in artefacts.

It is hence needed to devise methods by which artefacts in depth maps can be corrected in an intuitive and fast manner.

4 PROBLEMS ENCOUNTERED IN THE TECHNICAL FIELD

In several examples of the following we may be considering a scenario where a scene is photographed—or captured or acquired or imaged—from multiple camera positions (in particular, at known positional/geometrical relationships between the different cameras). The cameras themselves can be photo cameras, video cameras, or other types of cameras (LIDAR, infrared, etc.).

Moreover, a single camera can be moved to several places, or multiple cameras can be used simultaneously. In the first case, static scenes (e.g., with non-movable object/s) can be captured, while in the latter case, also acquisitions of moving objects are supported.

The camera(s) can be arranged in an arbitrary manner (but, in examples, in known positional relationships with each other). In a simple case, two cameras may be arranged next to each other, with parallel optical axes. In a more advanced scenario, the camera positions are situated on a regular two-dimensional grid and all optical axes are parallel. In the most general case, the known camera positions are located arbitrarily in space, and the known optical axes can be oriented in any direction.

Having multiple images from a scene, we may derive a depth value for (or more in general localize) each pixel (or more in general 2D representation element) in each 2D image.

To this end, we can principally distinguish two approaches, namely the manual assignment of depth values, the automatic computation, and the semi-automatic approach. The manual assignment is the one extreme, where photos are manually converted into a 3D mesh [10], [15], [16]. Then the depth maps can be computed by rendering or displaying so called depth or z-passes [14]. Though this approach allows full user control, it is very cumbersome to come to precise pixel-wise depth maps.

The other extreme are the fully automatic algorithms [12][13]. While they have the potential to compute a precise depth value per pixel, they are error-prone by nature. In other words, for some pixels the computed depth value is simply wrong.

Consequently, none of these approaches is completely satisfying. Methods are needed where the precision of the automatic depth map computation can be combined with the flexibility and control of the manual approach. Moreover, the needed method(s) may be such that they rely as much as possible on existing software tools for 2D and 3D image processing. This allows to profit from the very powerful editing tools already available in the art, without needing to recreate everything from scratch.

To this end, reference [8] indicates the possibility to use a 3D mesh for refinement of depth values. While their method uses a mesh created for or within a previous frame, it is possible to deduce that instead of using the mesh from a preceding frame, also a 3D mesh created for the current frame can be used. Then reference [8] advocates correcting possible depth map errors by limiting a stereo matching range based on the depth information available from the 3D mesh.

While such an approach hence entitles us to use existing 3D editing software for interactive correction and improvement of depth maps, its direct application is not possible. First of all, since our meshes shall be created in a manual manner, we need to prevent that a user has to remodel the complete scene for fixing a depth map error that is well located in a precise subpart of the image. To this end, we will need specific mesh types as explained in Section 9. Secondly, reference [8] doesn't explain how to precisely limit the search reach of the underlying depth estimation algorithms. Consequently we will propose a precise method how to translate 3D meshes into admissible depth ranges.

5 METHODS USING SIMILARITY METRICS

Depth computation from multiple images of a scene essentially involves the establishment of correspondences within the images. Such correspondences then permit to compute the depth of an object by means of triangulation.

Figure 2:
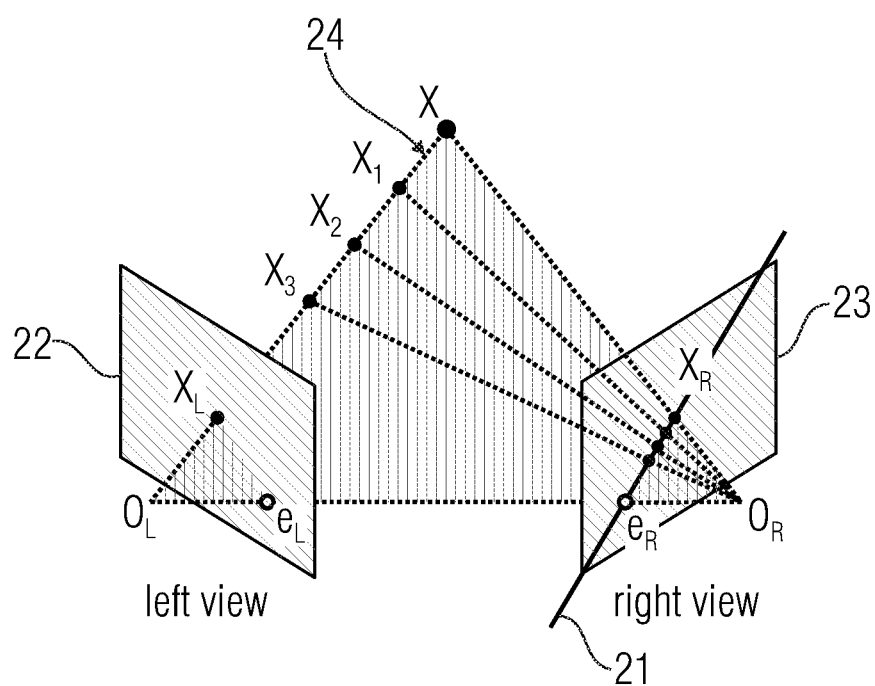
FIG. 2 illustrates the epi-polar geometry, valid both for conventional technology and for the present examples.

FIG. 2 depicts a corresponding example in form of two cameras (left 2D image 22 and right 2D image 23), whose optical centers (or entrance pupils or nodal points) are located in $O_L$ and $O_R$ respectively. They both take a picture of an object element X (e.g., the object element 14 of FIG. 1). This object element X is depicted in pixel $X_L$ in the left camera image 22.

Unfortunately, from the left image 22 only it is not possible to determine the depth of (or otherwise localize) the object element X. In fact, all object elements X, $X_1$, $X_2$, $X_3$ would result in the same pixel (or otherwise 2D representation element) $X_L$. All these object elements are situated on a line in the right camera, the so-called epi-polar line 21. Hence, identifying the same object element in both the left view 22 and the right view 23 permits to compute the depth of the corresponding pixels. More in general, by identifying the object element X, associated in the left 2D image 22 to the 2D representation element $X_L$, in the right view 23, it is possible to localize the object element X.

To identify such correspondences, there exist a huge amount of different techniques. In general, these different techniques have in common that they compute for every possible correspondence some matching costs or similarity metrics. In other words, every pixel or 2D representation element (and possibly its neighbor pixels or 2D representation elements) on the epi-polar line 21 in the right view 23 is compared with the reference pixel $X_L$ (and possibly its neighbor pixels) in the left view 22. Such a comparison can for instance be done by computing a sum of absolute differences [11] or the hamming distance of a census transform [11]. The remaining difference is then considered (in examples) as a matching cost or similarity metric, and larger costs indicate a worse match. Depth estimation hence comes back to choosing for every pixel a depth candidate such that the matching costs are minimized. This minimization can be performed independently for every pixel, or by performing a global optimization over the whole image.

Unfortunately, from this description it is possible to grasp that determination of correspondences is a problem which is difficult to be solved. It can happen that there are several similar objects that are located on the epi-polar line of the right view shown in FIG. 2. As a consequence, a wrong correspondence might be chosen, leading to a wrong depth value, and hence to an artefact in virtual view synthesis. Just to give an example, if on the basis of the similarity metrics it is incorrectly concluded that reference pixel $X_L$ of the left image view 22 corresponds to the position of the object element $X_2$, the object element X will be consequently incorrectly located in space.

In order to reduce such depth errors, the user needs to have the possibility to manipulate the depth values. One approach to do so is the so-called 2D to 3D conversion. In this case, the user can assign depth values to the different pixels in a tool assisted manner [1][2][3][4]. However, such depth maps are typically not consistent between multiple captured views and can thus not be applied to virtual view synthesis, because the latter involves a set of captured input images and consistent depth maps for high-quality occlusion free results.

Another class of methods consists in post filtering operations [5]. In this case the user marks erroneous regions in the depth map, combined with some additional information like whether a pixel belongs to a foreground, or a background region. Based on this information, depth errors are then eliminated by some filtering. While such an approach is straight-forward, it shows several drawbacks. First of all, it directly operates in 2D space, such that each depth map of each image needs to be corrected individually, which is a lot of work. Secondly, the correction is only indirect in form of filtering, such that a successful depth map correction cannot be guaranteed.

The third class of methods hence avoids filtering erroneous depth maps, but aims to directly improve the initial depth map. One way to do so is to simply limit the admissible depth values on a pixel level. Hence, instead of searching the whole epi-polar 21 line in FIG. 2 for correspondences, only a smaller part will be considered. This limits the probability of confusing correspondences, and hence leads to improved depth maps.

Such a concept is followed by [8]. It assumes a temporal video sequences, where the depth map should be computed for time instance t. Moreover, it is assumed that a 3D model is available for time instance t-1. This 3D model is then used as an approximation for the current pixel depths, allowing reducing the search space. Since the 3D model belongs to a different time instance than the frame for which the depth map should be improved, they need to align the 3D model with the current frame by performing a pose estimation. While this complicates the application, it is possible to grasp that by replacing the pose estimation by a function that simply returns the 3D model instead of changing its pose, this method is very close to the challenge defined in Section 4. Unfortunately, such a concept misses important properties that are needed for using manually created meshes. Adding those methods is subject to the present examples.

Reference [6] explicitly introduces a method for manual user interaction. Their algorithm applies a graph cut algorithm to minimize the global matching costs. These matching costs are composed of two parts: A data cost part, which defines how well the color of two corresponding pixels matches, and a smoothness cost that penalizes depth jumps between neighboring pixels with similar color. The user can influence the cost minimization by setting the depth values for some pixels or by requesting that the depth value for some pixels is the same of that in the previous frame. Due to the smoothness costs, these depth guides will also be propagated to the neighbor pixels. In addition, the user can provide an edge map, such that the smoothness costs are not applied at edges. Compared to this work, our approach is complementary. We do not describe how to precisely correct a depth map error for a specific depth map algorithm. Instead we show how to derive admissible depth ranges from user input provided in 3D space. These admissible depth ranges that can be different for every pixel can then be used in every depth map estimation algorithm to limit the possible depth candidates and hence to reduce the probability of a depth map error.

An alternative method for depth map improvement is presented in reference [7]. It allows a user to define a smooth region that should not contain a depth jump. This information is then used to improve the depth estimation. Compared to our method, this method is only indirect and can hence not guarantee to be error free depth map. Moreover, the smoothness constraints are defined in the 2D image domain, which makes it difficult to propagate this information into all captured camera views.

6. CONTRIBUTIONS

At least some of the contributions are present in examples:

We provide a precise method that derives an admissible depth value range for relevant pixels of an image. By these means, it is possible to use meshes that describe a 3D object only approximately to generate a high precision and high-quality depth map. In other words, instead of insisting that the 3D mesh exactly describes the position of the 3D object, we take into account that a user will only be able to provide a rough estimate. This estimate is then converted into an interval of admissible depth values. Independent of the applied depth estimation algorithm, this reduces the search space for correspondence determination, and hence the probability of wrong depth values (Section 10).

In case the user is only requested to provide approximate 3D mesh locations, meshes can be interpreted wrongly. We provide a method how this can be avoided (Section 9.3).

The method supports the partial constraining of a scene. In other words, the user needs not to give depth constraints for all objects of a scene. Instead, only for the most difficult objects a precise depth guide is needed. This explicitly includes scenarios, where one object is occluded by another object. This involves specific mesh types that are not known in literature and that may hence be essential parts of present examples (Section 9).

We show how the normal vectors known from the meshes can further simplify the depth map estimation by taking slanted surfaces into account. Our contribution may limit the admissible normal vectors and hence reduces the possible matching candidates, which again reduces the probability of wrong matches and hence higher quality depth maps (Section 11).

We introduce another constraint type, called exclusive volumes which explicitly disallow some depth values. By these means, we can further reduce the possible depth candidates and hence reduce the probability for wrong depth values (Section 13).

We give some improvements how 3D geometry constraints can be created based on a single or multiple 2D images (Section 15).

According to an aspect, there is provided a method for localizing, in a space containing at least one determined object, an object element associated to a particular 2D representation element ($X_L$) in a determined 2D image of the space, the method comprising:
  deriving a range or interval of candidate spatial positions for the imaged object element on the basis of predefined positional relationships;
  restricting the range or interval of candidate spatial positions to at least one restricted range or interval of admissible candidate spatial positions, wherein restricting includes at least one of:
    limiting the range or interval of candidate spatial positions using at least one inclusive volume surrounding at least one determined object; and
    limiting the range or interval of candidate spatial positions using at least one exclusive volume surrounding non-admissible candidate spatial positions; and
  retrieving, among the admissible candidate spatial positions of the restricted range or interval, a most appropriate candidate spatial position on the basis of similarity metrics.

In methods according to examples, the space there may be contained at least one first determined object and one second determined object,
  wherein restricting includes limiting the range or interval of candidate spatial positions to:
    at least one first restricted range or interval of admissible candidate spatial positions associated to the first determined object; and
    at least one second restricted range or interval of admissible candidate spatial positions associated to the second determined object,
  wherein restricting includes defining the at least one inclusive volume as a first inclusive volume surrounding the first determined object and/or a second inclusive volume surrounding the second determined object, to limit the at least one first and/or second range or interval of candidate spatial positions to at least one first and/or second restricted range or interval of admissible candidate spatial positions; and
  wherein retrieving includes determining whether the particular 2D representation element is associated to the first determined object or is associated to the second determined object.

According to examples, determining whether the particular 2D representation element is associated to the first determined object or to the second determined object is performed on the basis of similarity metrics.

According to examples, determining whether the particular 2D representation element is associated to the first determined object or to the second determined object is performed on the basis of the observation that:
  one of the at least one first and second restricted range or interval of admissible candidate spatial positions is void; and
  the other of the at least one first and second restricted range or interval of admissible candidate spatial positions is not void, so as to determine that the particular 2D representation element is within the other of the at least one first and second restricted range of admissible candidate spatial positions.

According to examples, restricting includes using information from a second camera or 2D image for determining whether the particular 2D representation element is associated to the first determined object or to the second determined object.

According to examples, the information from a second camera or 2D image includes a previously obtained localization of an object element contained in:
  the at least one first restricted range or interval of admissible candidate spatial positions, so as to conclude that the object element is associated to the first object; or
  the at least one second restricted range or interval of admissible candidate spatial positions, so as to conclude that the object element is associated to the second object.

In accordance with an aspect, there is provided a method comprising:
  as a first operation, obtaining positional parameters associated to a second camera position and at least one inclusive volume;
  as a second operation, performing a method according to any of the methods above and below for a particular 2D representation element for a first 2D image acquired at a first camera position, the method including:
    analyzing, on the basis of the positional parameters obtained at the first operation, whether both the following conditions are met:
      at least one candidate spatial position would occlude at least one inclusive volume in a second 2D image obtained or obtainable at the second camera position, and
      the at least one candidate spatial position would not be occluded by at least one inclusive volume in the second 2D image,
    so as, in case the two conditions are met:
    to refrain from performing retrieving even if the at least one candidate spatial position was in the restricted range of admissible candidate spatial positions for the first 2D image and/or
    to exclude the at least one candidate spatial position from the restricted range or interval of admissible candidate spatial positions for the first 2D image even if the at least one candidate spatial position was in the restricted range of admissible candidate spatial positions.

According to examples, the method may comprise:
  as a first operation, obtaining positional parameters associated to a second camera position and at least one inclusive volume;
  as a second operation, performing a method according to any of the methods above and below for a particular 2D representation element for a first 2D image acquired at a first camera position, the method including:
    analyzing, on the basis of the positional parameters obtained at the first operation, whether at least one admissible candidate spatial position of the restricted range would be occluded by the at least one inclusive volume in a second 2D image obtained or obtainable at the second camera position, so as to maintain the admissible candidate spatial position in the restricted range.

According to examples the method may include
  as a first operation, localizing a plurality of 2D representation elements for a second 2D image,
  as a second, subsequent operation, performing the deriving, the restricting and the retrieving of the method according to any of the methods above and below for determining a most appropriate candidate spatial position for the determined 2D representation element of a first determined 2D image, wherein the second 2D image and the first determined 2D image are acquired at spatial positions in predetermined positional relationship,
  wherein the second operation further includes finding a 2D representation element in the second 2D image, previously processed in the first operation, which corresponds to a candidate spatial position of the first determined 2D representation element of the first determined 2D image, so as to further restrict, in the second operation, the range or interval of admissible candidate spatial positions and/or to obtain similarity metrics on the first determined 2D representation element.

According to examples, wherein the second operation is such that, at the observation that the previously obtained localized position for the 2D representation element in the second 2D image would be occluded to the second 2D image by the candidate spatial position of the first determined 2D representation element considered in the second operation:

further restricting the restricted range or interval of admissible candidate spatial positions so as to exclude the candidate spatial position for the determined 2D representation element of the first determined 2D image from the restricted range or interval of admissible candidate spatial positions.

According to examples, at the observation that the localized position of the 2D representation element in the second 2D image corresponds to the first determined 2D representation element:

restricting, for the determined 2D representation element of the first determined 2D image, the range or interval of admissible candidate spatial positions so as to exclude, from the restricted range or interval of admissible candidate spatial positions, positions more distant than the localized position.

According to examples a method may further comprise, at the observation that the localized position of the 2D representation element in the second 2D image does not correspond to the localized position of the first determined 2D representation element:

invalidating the most appropriate candidate spatial position for the determined 2D representation element of the first determined 2D image as obtained in the second operation.

According to examples, the localized position of the 2D representation element in the second 2D image corresponds to the first determined 2D representation element when the distance of the localized position is within a maximum predetermined tolerance distance to one of the candidate spatial positions of the first determined 2D representation element.

According to examples, the method may further comprise, when finding a 2D representation element in the second 2D image, analysing a confidence or reliability value of the localization of the first a 2D representation element in the second 2D image, and using it only in case of the confidence or reliability value being above a predetermined confidence threshold, or the unreliability value being below a predetermined threshold.

According to examples, the confidence value may be at least partially based on the distance between the localized position and the camera position, and is increased for a closer distance.

According to examples, the confidence value is at least partially based on the number of objects or inclusive volumes or restricted ranges of admissible spatial positions, so as to increase the confidence value if, in the range or interval of admissible spatial candidate positions, where there are found a fewer number of objects or inclusive volumes or restricted ranges of admissible spatial positions.

According to examples, restricting includes defining at least one surface approximation, so as to limit the at least one range or interval of candidate spatial positions to at least one restricted range or interval of admissible candidate spatial positions.

According to examples, defining includes defining at least one surface approximation and one tolerance interval, so as to limit the at least one range or interval of candidate spatial positions to a restricted range or interval of candidate spatial positions defined by the tolerance interval, wherein the tolerance interval has:

a distal extremity defined by the at least one surface approximation; and a proximal extremity defined on the basis of the tolerance interval; and retrieving, among the admissible candidate spatial positions of the restricted range or interval, a most appropriate candidate spatial position on the basis of similarity metrics.

According to examples, a method may comprise for localizing, in a space containing at least one determined object, an object element associated to a particular 2D representation element in a 2D image of the space, the method comprising:

deriving a range or interval of candidate spatial positions for the imaged object element on the basis of predefined positional relationships;

restricting the range or interval of candidate spatial positions to at least one restricted range or interval of admissible candidate spatial positions, wherein restricting includes:

defining at least one surface approximation and one tolerance interval, so as to limit the at least one range or interval of candidate spatial positions to a restricted range or interval of candidate spatial positions defined by the tolerance interval, wherein the tolerance interval has:

a distal extremity defined by the at least one surface approximation; and a proximal extremity defined on the basis of the tolerance interval; and retrieving, among the admissible candidate spatial positions of the restricted range or interval, a most appropriate candidate spatial position on the basis of similarity metrics.

According to examples, a method may be reiterated by using an increased tolerance interval, so as to increase the probability of containing the object element.

According to examples, a method may be reiterated by using a reduced tolerance interval, so as to reduce the probability of containing a different object element.

According to examples, wherein restricting includes defining a tolerance value for defining the tolerance interval.

According to examples, wherein restricting includes defining a tolerance interval value $\Delta d$ obtained from the at least one surface approximation based on $$\frac{\|\vec{n_0}\| \cdot \|\vec{a}\|}{|\vec{a} \cdot \vec{n_0}|},$$

where $\vec{n_0}$ is the normal vector of the surface approximation in the point where the interval of candidate spatial positions intersects with the surface approximation, and vector $\vec{a}$ defines the optical axis of the determined camera or 2D image.

According to examples, at least part of the tolerance interval value Δd is defined from the at least one surface approximation on the basis of $$\Delta d = t_0 \cdot \max\left\{ \frac{\|\vec{n_0}\| \cdot \|\vec{a}\|}{|\vec{a} \cdot \vec{n_0}|}, \frac{1}{\cos\phi_{max}} \right\}, \text{ or}$$

$$\Delta d = t_0 \cdot \frac{\|\vec{n_0}\| \cdot \|\vec{a}\|}{|\vec{a} \cdot \vec{n_0}|}$$

where $t_0$ is a predetermined tolerance value, where $\vec{n_0}$ is the normal vector of the surface approximation in the point where the interval of candidate spatial positions intersects with the surface approximation, where vector $\vec{\alpha}$ defines the optical axis of the considered camera, and $\phi$ clips the angle between $\vec{n_0}$ and $\vec{\alpha}$.

According to examples, retrieving includes:
considering a normal vector ($\vec{n_0}$) of the surface approximation located at the intersection between the surface approximation and the range or interval of candidate spatial positions;
retrieving, among the admissible candidate spatial positions of the restricted range or interval, a most appropriate candidate spatial position on the basis of similarity metrics, wherein retrieving includes retrieving, among the admissible candidate spatial positions of the restricted range or interval and on the basis of the normal vector ($\vec{n_0}$), a most appropriate candidate spatial position on the basis of similarity metrics involving the normal vector ($\vec{n_0}$).

In accordance with an aspect, there is provided method for localizing, in a space containing at least one determined object, an object element associated to a particular 2D representation element in a determined 2D image of the space, the method comprising:
deriving a range or interval of candidate spatial positions for the imaged object element on the basis of predefined positional relationships;
restricting the range or interval of candidate spatial positions to at least one restricted range or interval of admissible candidate spatial positions, wherein restricting includes defining at least one surface approximation, so as to limit the at least one range or interval of candidate spatial positions to a restricted range or interval of candidate spatial positions;
considering a normal vector ($\vec{n_0}$) of the surface approximation located at the intersection between the surface approximation and the range or interval of candidate spatial positions;
retrieving, among the admissible candidate spatial positions of the restricted range or interval, a most appropriate candidate spatial position on the basis of similarity metrics, wherein retrieving includes retrieving, among the admissible candidate spatial positions of the restricted range or interval and on the basis of the normal vector ($\vec{n_0}$), a most appropriate candidate spatial position on the basis of similarity metrics involving the normal vector ($\vec{n_0}$).

According to examples:
retrieving comprises processing similarity metrics ($c_{sum}$) for at least one candidate spatial position (d) for the particular 2D representation element (($x0, y0$),$X_L$),
wherein processing involves further 2D representation elements (x,y) within a particular neighbourhood (N(x0, y0)) of the particular 2D representation element (x0, y0),
wherein processing includes obtaining a vector $\vec{n}$ among a plurality of vectors within a predetermined range defined from vector $\vec{n_0}$, to derive a candidate spatial position (D), associated to vector $\vec{n}$, for each of the other 2D representation elements (x,y), under the assumption of a planar surface of the object in the object element, wherein the candidate spatial position (D) is used to determine the contribution of each of the 2D representation elements (x,y), in the neighbourhood (N(x0,y0)) to the similarity metrics ($c_{sum}$).

According to examples, retrieving is based on a relationship such as:

$$\frac{1}{D(x_0, y_0, x, y, d, \vec{n})} = \frac{1}{d} \cdot \frac{\vec{n} \cdot K^{-1} \cdot \begin{bmatrix} x \\ y \\ 1 \end{bmatrix}}{\vec{n} \cdot K^{-1} \cdot \begin{bmatrix} x_0 \\ y_0 \\ 1 \end{bmatrix}}$$

where ($x_0$, $y_0$) is the particular 2D representation element, (x,y) are elements in a neighbourhood of ($x_0$, $y_0$), K is the intrinsic camera matrix, d is a depth candidate representing the candidate spatial position, D ($x_0$, $y_0$, x, y, d, $\vec{n}$) is a function that computes a depth candidate for the particular 2D representation element (x, y) based on the depth candidate d for the particular 2D representation element ($x_0$, $y_0$) under the assumption of a planar surface of the object in the object element.

According to examples, retrieving is based on evaluating a similarity metric $c_{sum}(d)$ of the type $$c_{sum}(d, \vec{n}) = \sum_{(x,y) \in N(x_0, y_0)} c(x, y, D(x_0, y_0, x, y, d, \vec{n}))$$

where $\Sigma_{(x,y) \in N(x_0, y_0)}$ represents a sum or a general aggregation function.

According to examples, restricting includes obtaining a vector $\vec{n}$ normal to the at least one determined object at the intersection with the range or interval of candidate spatial positions among a range or interval of admissible vectors within a maximum inclination angle relative to the normal vector $\vec{n_0}$.

According to examples, restricting includes obtaining the vector normal to the at least one determined object using according to $$\vec{n} \in \left\{ \begin{pmatrix} \sin\theta \cdot \cos\phi \\ \sin\theta \cdot \sin\phi \\ \cos\theta \end{pmatrix} \middle| 0 \leq \theta \leq \theta_{max}, 0 \leq \phi \leq 2\pi \right\}$$

where θ is the inclination angle around the normal vector $\vec{n}_0$, $\theta_{max}$ is a predefined maximum inclination angle, φ is the azimuth angle, and where $\vec{n}$ is interpreted relative to an orthonormal coordinate system whose third axes (z) is parallel to $\vec{n}_0$ and whose other two axes (x, y) are orthogonal to $\vec{n}_0$ According to examples, restricting includes using information from a 2D image for determining whether the particular 2D representation element is associated to the first determined object or to the second determined object,
further comprising finding:
a first vector normal to the at least one determined object at the intersection with the range or interval of candidate spatial positions for the first determined 2D image and
a second vector normal to the at least one determined object at the intersection with the range or interval of candidate spatial positions for the second 2D image and
comparing the first and second vectors so as to:
validate the localization in case the angle between first and second vectors are within a predetermined threshold and/or
invalidate the localization in case the angle between first and second vectors are within a predetermined threshold or choose the localization of the first or second image according to a confidence value.

According to examples, wherein restricting is only applied when the normal vector ($\vec{n}_0$) of the surface approximation in the intersection between the surface approximation and the range or interval of candidate spatial positions has a predetermined direction within a particular range of directions.

According to an aspect of the present examples there is provided a method, the particular range of directions is computed based on the direction of the range or interval of candidate spatial positions related to the determined 2D image.

According to an aspect of the present examples there is provided a method, restricting is only applied when the dot product between the normal vector ($\vec{n}_0$) of the surface approximation in the intersection between the surface approximation and the range or interval of candidate spatial positions and the vector describing the path of the candidate spatial positions from the camera has a predefined sign.

According to examples, restricting includes defining at least one surface-approximation-defined extremity of at least one restricted range or interval of admissible candidate spatial positions, wherein the at least one surface-approximation-defined extremity is located at the intersection between the surface approximation and the range or interval of candidate spatial positions.

According to examples, the surface approximation is defined by a user.

According to examples, restricting includes sweeping along the range of candidate positions from a proximal position towards a distal position and is concluded at the observation that the at least one restricted range or interval of admissible candidate spatial positions has a distal extremity associated to a surface approximation.

According to examples, at least one inclusive volume is defined automatically from the at least one surface approximation.

According to examples at least one inclusive volume is defined from the at least one surface approximation by scaling the at least one surface approximation.

According to examples at least one inclusive volume is defined from the at least one surface approximation by scaling the at least one surface approximation from a scaling center of the at least one surface approximation.

According to examples restricting involves at least one inclusive volume or surface approximation to be formed by a structure composed of vertices or control points, edges and surface elements, where each edge connects two vertices, and each surface element is surrounded by at least three edges, and from every vertex there exists a connected path of edges to any other vertex of the structure.

In accordance with an aspect there is provided a method where each edge is connected to an even number of surface elements.

In accordance with an aspect there is provided a method where each edge is connected to two surface elements.

In accordance with an aspect there is provided a method wherein the structure occupies a closed volume which has no border.

According to examples at least one inclusive volume is formed by a geometric structure, the method further comprising defining the at least one inclusive volume by:
shifting the elements by exploding the elements along their normals; and
reconnecting the elements by generating additional elements (210bc, 210cb).

In accordance with an aspect there is provided a method which further comprises:
inserting at least one new control point within the exploded area;
reconnecting the at least one new control point with the exploded elements to form further elements.

According to examples the elements are triangle elements.

According to examples restricting includes:
searching for ranges or intervals within the range or interval of candidate spatial positions from a proximal position to a distal position, and ending the searching at the retrieval of a surface approximation.

According to examples the at least one surface approximation is contained within the at least one object.

According to examples the at least one surface approximation is a rough approximation of the at least one object.

According to examples the method further comprises, at the observation that the range or interval of candidate spatial positions obtained during deriving does not intersect with any surface approximation, defining the restricted range or interval of admissible candidate spatial positions as the range or interval of candidate spatial positions obtained during deriving.

According to examples, the at least one inclusive volume is a rough approximation of the at least one object.

According to examples, retrieving is applied to a random subset among the restricted range or interval of admissible candidate positions and/or admissible normal vectors.

According to examples restricting includes defining at least one inclusive-volume-defined extremity of the at least one restricted range or interval of admissible candidate spatial positions.

According to examples, the inclusive volume is defined by a user.

According to examples, retrieving includes determining whether the particular 2D representation element is associated to at least one determined object on the basis similarity metrics.

According to examples, at least one of the 2D representation elements is a pixel ($X_L$) in the determined 2D image.

According to examples, the object element is a surficial element of the at least one determined object.

According to examples, the range or interval of candidate spatial positions for the imaged object element is developed in a depth direction with respect to the determined 2D representation element.

According to examples, the range or interval of candidate spatial positions for the imaged object element is developed along a ray exiting from the nodal point of the camera with respect to the determined 2D representation element.

According to examples, retrieving includes measuring similarity metrics along the admissible candidate spatial positions of the restricted range or interval as obtained from a further 2D image of the space and in predefined positional relationship with the determined 2D image.

In accordance with an aspect there is provided an aspect where retrieving includes measuring similarity metrics along the 2D representation elements, in the further 2D image, forming an epi-polar line associated to the at least one restricted range.

According to examples, restricting includes finding an intersection between the range or interval of candidate positions with at least one of the inclusive volume, exclusive volume, and/or surface approximation.

According to examples, restricting includes finding an extremity of a restricted range or interval of candidate positions with at least one of the inclusive volume, exclusive volume, and/or surface approximation.

According to examples, restricting includes:
searching for ranges or intervals within the range or interval of candidate spatial positions from a proximal position towards a distal position.

According to examples, defining includes:
selecting a first 2D image of the space and a second 2D image of the space, wherein the first and second 2D images have been acquired at camera positions in a predefined positional relationship with each other;
displaying at least the first 2D image,
guiding a user to select a control point in the first 2D image, wherein the selected control point is a control point of an element of a structure forming a surface approximation or an exclusive volume or an inclusive volume;
guiding the user to selectively translate the selected point, in the first 2D image, while limiting the movement of the point along the epi-polar line associated to the point in the second 2D image, wherein point corresponds to the same control point of the element of a structure than point,
so as to define a movement of the element of the structure in the 3D space.

According to an aspect there is provided a method for localizing, in a space containing at least one determined object, an object element associated to a particular 2D representation element in a determined 2D image of the space, the method comprising:
obtaining a spatial position for the imaged object element;
obtaining a reliability or unreliability value for this spatial position of the imaged object element;
in case of the reliability value does not comply with a predefined minimum reliability or the unreliability does not comply with a predefined maximum unreliability, performing the method of any of the methods above and below so as to refine the previously obtained spatial position.

According to an aspect there is provided a method for refining, in a space containing at least one determined object, a previously obtained localization of an object element associated to a particular 2D representation element in a determined 2D image of the space, the method comprising:
graphically displaying the determined 2D image of the space;
guiding a user to define at least one inclusive volume and/or at least one surface approximation and/or at least one surface approximation;
performing a method according to any of the methods above and below so as to refine the previously obtained localization.

According to examples, a method may further comprise, after the definition of at least one inclusive volume or surface approximation, automatically defining an exclusive volume between the at least one inclusive volume or surface approximation and the position of at least one camera.

According to examples, a method may further comprise, at the definition of a first proximal inclusive volume or surface approximation and a second distal inclusive volume or surface approximation, automatically defining:
a first exclusive volume between the first inclusive volume or surface approximation and the position of at least one camera; a second exclusive volume between the second inclusive volume or surface approximation and the position of at least one camera, with the exclusion of a non-excluded region between the first exclusive volume and the second exclusive volume.

According to examples, the method may be applied to a multi-camera system.

According to examples, the method may be applied to a stereo-imaging system.

According to examples, retrieving comprises selecting, for each candidate spatial position of the range or interval, whether the candidate spatial position is to be part of the restricted range of admissible candidate spatial positions.

According to an aspect there may be provided a system for localizing, in a space containing at least one determined object, an object element associated to a particular 2D representation element in a determined 2D image of the space, the system comprising:
a deriving block for deriving a range or interval of candidate spatial positions for the imaged object element on the basis of predefined positional relationships;
a restricting block for restricting the range or interval of candidate spatial positions to at least one restricted range or interval of admissible candidate spatial positions, wherein the restricting block is configured for:
limiting the range or interval of candidate spatial positions using at least one inclusive volume surrounding at least one determined object; and/or
limiting the range or interval of candidate spatial positions using at least one exclusive volume including non-admissible candidate spatial positions; and
a retrieving block configured for retrieving, among the admissible candidate spatial positions of the restricted range or interval, a most appropriate candidate spatial position on the basis of similarity metrics.

In accordance with an aspect there is provide a system, further comprising a first and a second cameras for acquiring 2D images in predefined positional relationships.

In accordance with an aspect there is provide a system, further comprising at least one movable camera for acquiring 2D images from different positions and in predefined positional relationships.

According to any one of the systems above or below, the system may further comprise a constraint definer for rendering at least one 2D image to obtain an input for defining at least one constraint.

According to any one of the systems above or below, the system may be further configured to perform examples.

According to an aspect there may be provided non-transitory storage unit including instructions which, when executed by a processor, cause the processor to perform a method above or below.

Examples, above and below may refer to multi-camera systems. Examples above and below may refer to stereoscopic systems, e.g., for 3D imaging.

Examples above and below may refer to systems with real cameras photographing a real space. In some examples, all the 2D images are uniquely real images obtained by real cameras photographic real objects.

7. OVERALL WORKFLOW

Figure 3:
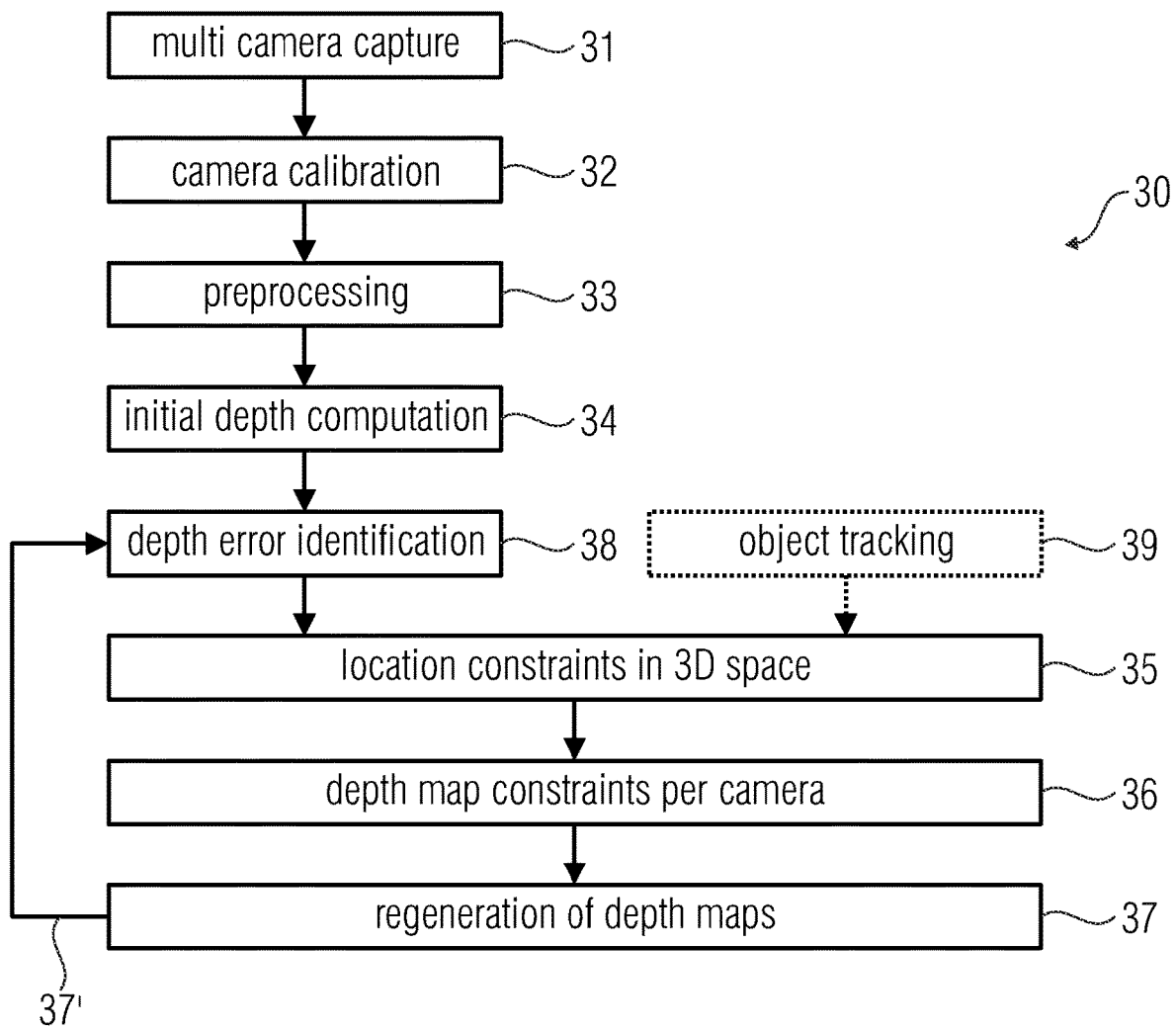
FIG. 3 shows a method according to an example (workflow for the interactive depth map improvement).

FIG. 3 depicts an overall method 30 of an interactive depth map computation and improvement (or more in general for the localization of at least one object element). At least one of the following steps may be implemented in examples according to the present disclosure.

A first step 31 may include capturing a scene (of a space) from multiple perspectives, either using an array of multiple cameras, or by moving a single camera within a scene.

A second step 32 may be the so-called camera calibration. Based on analysis of feature points within the 2D image and/or provided calibration charts, a calibration algorithm may determine for each camera view the intrinsic and the extrinsic parameters. The extrinsic camera parameters may define the position and the orientation of all cameras relative to a common coordinate system. The latter is called world coordinate system in the following. The intrinsic parameters encompass relevant internal camera parameters, such as the focal length and the pixel coordinates of the optical axis. In the following, we refer the intrinsic and extrinsic camera parameters are positional parameters or positional relationships.

A third step 33 may include preprocessing step(s), e.g. to achieve high-quality results, but that are not directly related to the interactive depth map estimation. This may include in particular color matching between the cameras to compensate for varying camera transfer curves, denoising, and elimination of lens distortions. Moreover, images whose quality is not sufficient because of too much blur or wrong exposure can be eliminated in this step 33.

A fourth step 34 may compute an initial depth map (or more in general a rough localization) for each camera view (2D image). Here, there may be no limitation for the depth computation procedure to be used. A purpose of this step 34 may be to identify (either automatically or manually) difficult scene elements, where the automatic procedure needs user assistance to deliver a correct depth map. Section 14 discusses exemplary methods to identify such depth map errors. Several techniques discussed below may operate, in some examples, by refining rough localization results obtained at step 34.

In a step 35 (e.g., fifth step), there is the possibility of generating (e.g., manually) location constraints for the scene objects in 3D space. In order to reduce the user effort, such location constraints can be limited to relevant objects identified in step 38, whose depth values from step 34 (or 37) are not correct. These constraints may be created, for example, by drawing polygons or other geometric primitives into the 3D world space using any possible 3D modelling and editing software. For example, the user may define:

- at least one inclusive volume surrounding an object (in which, therefore, it is highly probably to localize object elements); and/or
- at least one exclusive object in which the location of object elements is not to be searched; and/or
- at least one surface approximation contained within at least one determined object.

These constraints may be, for example, created or drawn or selected manually, e.g., under the aid of an automatic system. It is possible, for example, that the user defines a surface approximation and the method in turn returns an inclusive volume (see Section 12).

The underlying coordinate system used for creation of the location constraints may be the same of that used for camera calibration and localization. The geometric primitives drawn by the user give an indication where objects could be located, without needing to indicate for each and every object in the scene the precise position in 3D space. In case of video sequences, the creation of the geometric primitives can be significantly speed up by automatically tracking them over time (39). More details on the concept for location constraints are given in Section 13. Example techniques how the geometric primitives can easily be drawn are described in more detail in Section 15.

In a step 36 (e.g., sixth step), the location constraints (inclusive volume/s, exclusive volume/s, surface approximation/s, tolerance values . . . , which may be selected by the user) may be translated into depth map constraints (or localization constraints) for each camera view. In other words, there may be a restriction of the range or interval of candidate spatial positions (e.g., associated to a pixel) to at least one restricted range or interval of admissible candidate spatial positions. Such depth map constraints (or location constraints) can be expressed as disparity map constraints. Consequently, related to interactive depth or disparity map improvement, both depth and disparity maps are conceptually the same, and will be treated as such, though each of them has their very specific meaning that are not to be confused during implementation.

The constraints obtained in step 36 may limit the possible depth values (or localization estimations), hence reducing computational efforts for the analysis of the similarity metrics to be processed at step 37. Examples are discussed, for example, in Section 10. Alternatively or in addition, it is possible to limit the possible directions of the surface normal of a considered object (see Section 11). Both information may be valuable to disambiguate the problem of correspondence determination and can hence be used to regenerate the depth maps. Compared to the initial depth map computation, the procedure may search the possible depth values in a smaller set of values, and excludes others to be viable solutions. It is possible to use a similar procedure than for an initial depth map computation (e.g., that of step 34).

The step 37 may be obtained, for example, using techniques relying on similarity metrics, such as those discussed in Section 5. At least some of these methods are known in the art. However, the procedure(s) for computing and/or comparing these similarity metrics may take advantage of the use of the constraints defined at step 35.

As identified by the iteration 37' between steps 37 and 38, the method may be iterated, e.g., by regenerating at step 37 the localizations obtained by step 36, so as to identify a localization error at 38, which may be subsequently refined in new iterations of steps 35 and 36. Each iteration may refine the results obtained at the previous iteration.

A tracking step 39 may also be foreseen, e.g., for moving objects, to keep into account temporally subsequent frames: the constraints obtained for the previous frame (e.g., at instant t-1) are kept into account for obtaining the localization of the 2D representation elements (e.g., pixels) at the subsequent frame (e.g., at instant t).

Figure 35:
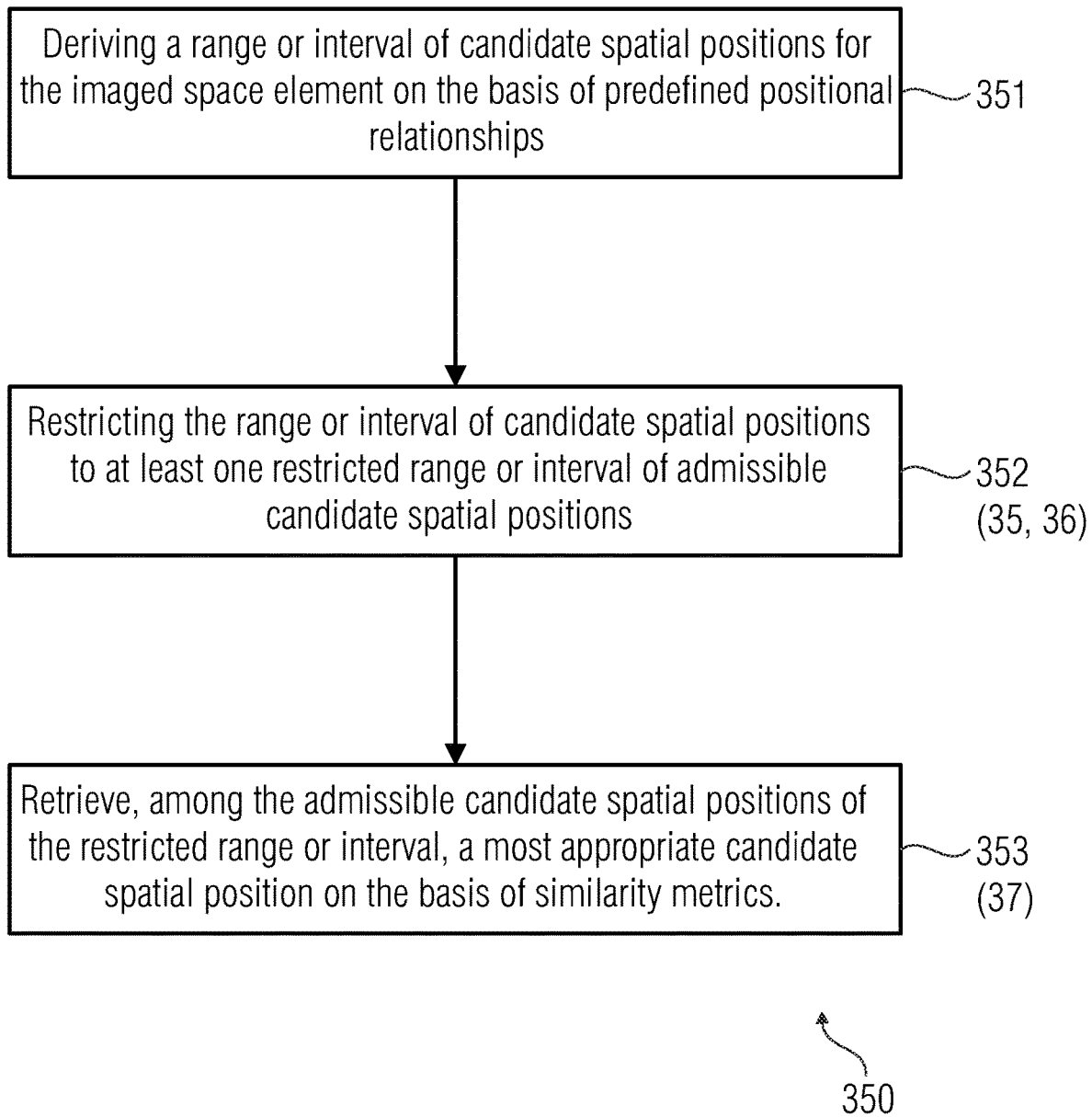

FIG. 35 shows a more general method 350 for localizing, in a space containing at least one determined object, an object element associated to a particular 2D representation element (e.g., pixel) in a determined 2D image of the space. The method may comprise:
- a step 351 of deriving a range or interval of candidate spatial positions (e.g., a ray exiting from the camera) for the imaged space element on the basis of predefined positional relationships;
- a step 352 (which may be associated to steps 35 and/or 36 of method 30) of restricting the range or interval of candidate spatial positions to at least one restricted range or interval of admissible candidate spatial positions (e.g., one or more intervals in the ray), wherein restricting includes at least one of:
  - limiting the range or interval of candidate spatial positions using at least one inclusive volume surrounding at least one determined object; and/or
  - limiting the range or interval of candidate spatial positions using at least one exclusive volume including non-admissible candidate spatial positions; and/or
  - other constraints (such as a surface approximation, a tolerance value, etc., e.g., having features discussed below);
- retrieving (step 353, which may be associated to step 37 of method 30), among the admissible candidate spatial positions of the restricted range or interval, a most appropriate candidate spatial position on the basis of similarity metrics.

In some cases, the method may be reiterated, so as to refine a rough result obtained in the previous iteration.

Figure 36:
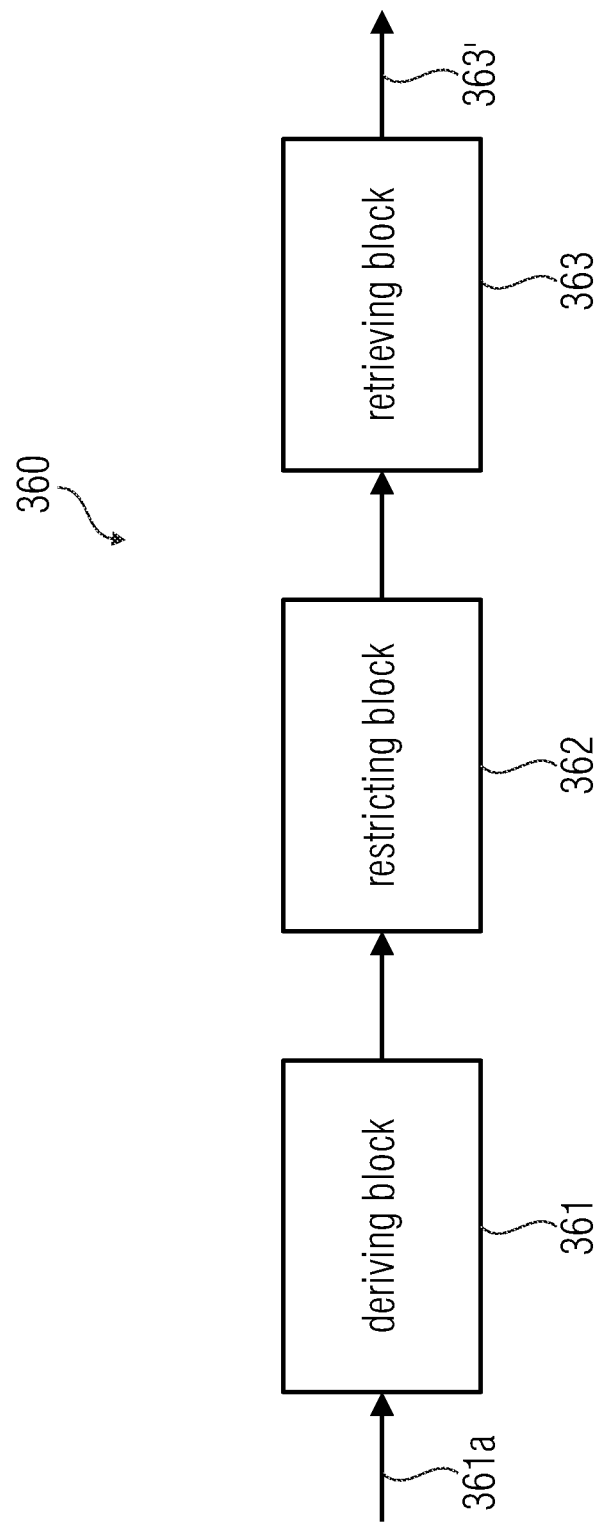

Even if the techniques above and below are mostly discussed in terms of method steps, it is to be understood that the present examples also refer to a system, such as 360 shown in FIG. 36, which is configured to perform methods such as the exemplified methods.

The system 360 (which may process at least one of the steps of method 30 or 350) may localize, in a 3D space containing at least one determined object, an object element associated to a particular 2D representation element 361a (e.g., pixel) in a determined 2D image of the space. The deriving block 361 (which may perform step 351) may be configured for deriving a range or interval of candidate spatial positions (e.g., a ray exiting from the camera) for the imaged space element on the basis of predefined positional relationships. A restricting block 362 (which may perform the step 352) may be configured for restricting the range or interval of candidate spatial positions to at least one restricted range or interval of admissible candidate spatial positions (e.g., one or more intervals in the ray), wherein the restricting block 362 may be configured for:
- limiting the range or interval of candidate spatial positions using at least one inclusive volume surrounding at least one determined object; and/or
- limiting the range or interval of candidate spatial positions using at least one exclusive volume including non-admissible candidate spatial positions; and/or
- limiting the range or interval of candidate spatial positions using other constraints (such as a surface approximation, a tolerance value, etc.);

A retrieving block 363 (which may perform the step 353 or 37) may be configured for retrieving, among the admissible candidate spatial positions of the restricted range or interval, a most appropriate candidate spatial position (363') on the basis of similarity metrics.

Figure 38:
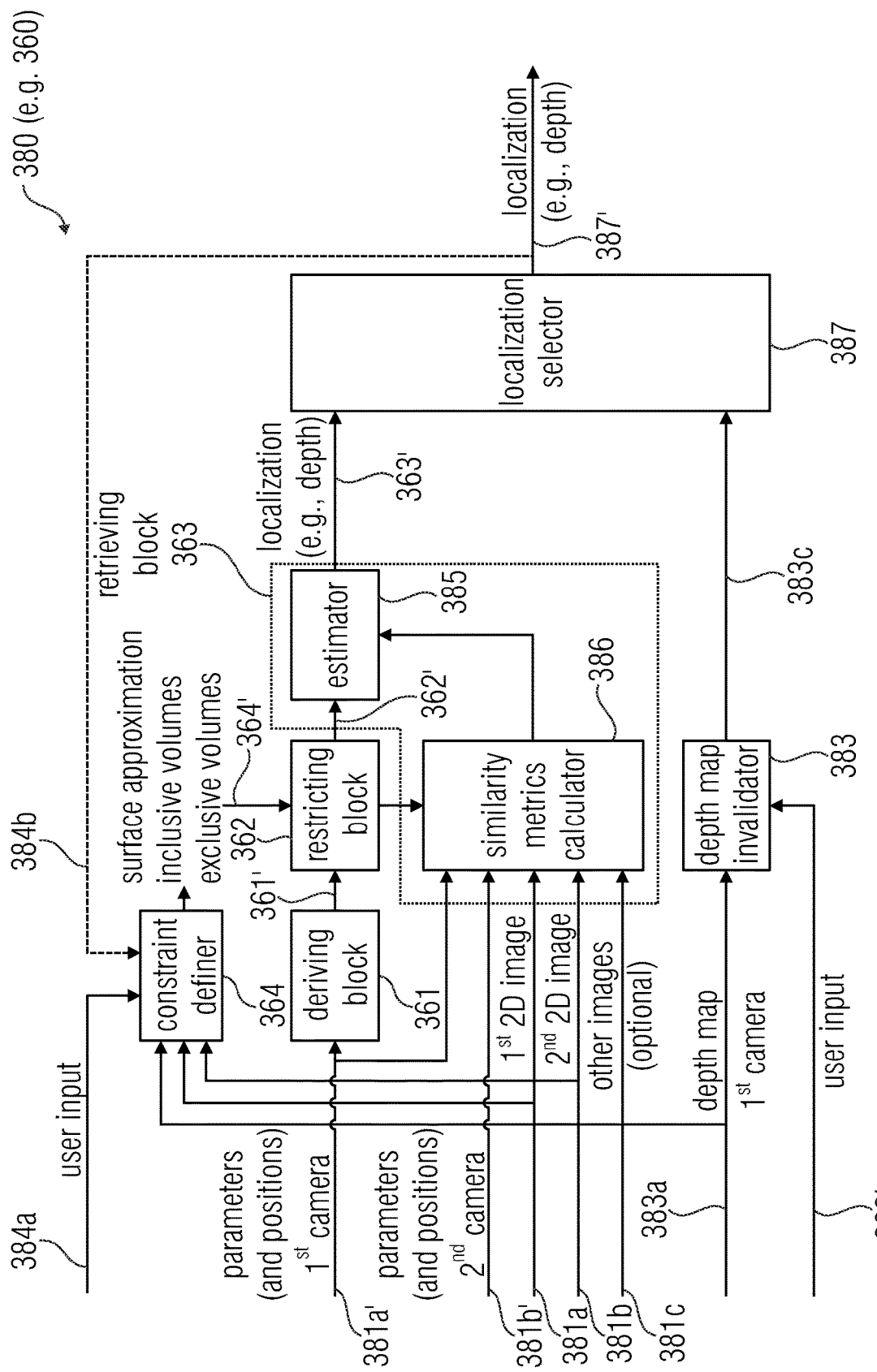

FIG. 38 shows a system 380 which may be an example of implementation of the system 360 or of another system configured to perform a technique according to the examples below or above and/or a method such as method 30 or 350. The deriving block 361, the restricting block 362, and the retrieving block 363 are shown. The system 380 may process data obtained from at least a first and a second camera (e.g., multi-camera environment, such as a stereoscopic visual system) acquiring images of the same space from different camera positions, or data obtained from one camera moving along multiple positions. A first camera position (e.g., the position of the first camera or the position of the camera at a first time instant) may be understood as the first position from which a camera provides a first 2D image 381a; the second camera position (e.g., the position of the second camera or the position of the same camera at a second time instant) may be understood as the position from which a camera provides a second 2D image 381b. The first 2D image 381a may be understood as the first image 22 of FIG. 2, and the second 2D image 381b may be understood as the second image 23 of FIG. 2. Other cameras or camera positions may optionally be used, e.g., to provide additional 2D image(s) 381c. Each 2D image may be a bitmap, for example, or a matrix-like representation comprising a plurality of pixels (or other 2D representation elements), each of which is assigned to a value, such as an intensity value, a color value (e.g., RGB), etc. The system 380 may associate each pixel of the first 2D image 381a to a particular spatial position in the imaged space (the particular spatial position being the position of an object element imaged by the pixel). In order to obtain this goal, the system 380 may make use of the second 2D image 381b and of data associated to the second camera. In particular, the system 380 may be fed by at least one of:
- positional relationships of the cameras (e.g., for each camera, the position of the optical centers $O_L$ and $O_R$ as in FIG. 2) and/or internal parameters of the cameras (e.g., focal length), which may influence the geometry of the acquisition (these data are here indicated with 381a' for the first camera and 381b' for the second camera);
- the images as acquired (e.g., bitmaps, RGB, etc.), 381a and 381b.

In particular, the deriving block 361 may be fed with the parameters 381a' for the first camera (no 2D image is strictly needed). Accordingly, the deriving block 361 may define a range of candidate spatial positions 361', which may follow, for example, a ray exiting from the camera and representing the corresponding pixel or 2D representation element. Basically, the range of candidate spatial positions 361' is simply based on geometric properties and properties internal to the first camera.

The restricting block 362 may further restrict the range of candidate spatial positions 361' to a restricted range of admissible candidate spatial positions 362'. The restricting block 362 may select only a subset of the range of candidate spatial positions 361' on the basis of constraints 364' (surface approximations, inclusive volumes, exclusive volumes, tolerances . . . ) obtained from a constraint definer 364. Hence, some candidate positions of the range 361' may be excluded in the range 362'.

The constraint definer 364 may permit a user's input 384a to control the creation of the constraints 364'. The constraint definer 364 may operate using a graphic user interface (GUI) to assist the user in defining the constraints 364'. The constraint definer 364 may be fed with the first and second 2D image 381a and 381b and, in case, by a previously obtained depth map (or other localization data) 383a (e.g., as obtained in the initial depth computation step 34 of method 30 or from a previous iteration of the method 30 or system 380). Accordingly, the user is visually guided in defining the constraints 384b. Examples are provided below (see FIGS. 30-34 and the related text).

In cases, the constraint definer 364 may also be fed with feedback 384b from previous iterations (see also the connection between steps 37 and 38 in method 30 of FIG. 3).

The restricting block 362 may therefore impose the constraints 364 which have been (e.g., graphically) introduced (as 384a) by the user, so as to define a restricted range of admissible candidate spatial positions 362'.

The positions in the restricted range of admissible candidate spatial positions 362' may therefore be analyzed by the retrieving block 363, which may implement e.g., steps 37 or 353 or other techniques discussed above and/or below.

The retrieving block 363 may comprise, in particular, an estimator 385, which may output a most appropriate candidate spatial position 363' which is the estimated localization (e.g., depth).

The retrieving block 363 may comprise a similarity metrics calculator 386, which may process similarity techniques (e.g., those discussed in Section 5 or other statistical techniques). The similarity metrics calculator 386 may be fed with:
  camera parameters (381a', 381b') associated to both the first and second (381a, 381b) camera; and
  the first and the second 2D images (381a, 381b), and, in case, additional images (e.g., 381c) and the additional camera parameters associated to the additional images.

E.g., the retrieving block 363, by analysing the similarity metrics in those pixels, which are in the second 2D image (e.g., 23 in FIG. 2), of the epi-polar line (e.g., 21) associated to a particular pixel (e.g., $X_L$) of the first 2D image (e.g., 22), may arrive at determining the spatial position (or at least a most appropriate candidate spatial position) of the object element (e.g., X) represented by the pixel (e.g., $X_L$) of the first image (e.g., 22).

An estimated localization invalidator or depth map invalidator 383 (which may be based on a user input 383b and/or which may be fed with depth values 383a or other rough-localization values, e.g., as obtained in step 34 or from a previous iteration of method 30 or system 380) may be used for validating or invalidating (383c) the provided localization (e.g., depth) 383a. As it is in general possible to obtain a confidence or reliability or unreliability value for each estimated localization 383a, the provided localization 383a may be analyzed and compared with a threshold value C0 (383b), which may have been input by the user. This threshold C0 can be different for every surface approximation. The purpose of this step may be to refine only those localizations with the new localization estimations 363', which have not been correct or reliable enough in a previous localization step (34) or a previous iteration of method 30 or system 380. In other words, localization estimations 363' impacted by the constraints 364' will only be considered for the final output 387' if the provided input values 383a are incorrect or have not sufficient confidence.

To this end, the localization selector 387 may select, on the basis of the validation/invalidation 383c of the provided depth input 383a, the obtained depth map or estimated localization 363', in case the reliability/confidence of 383a does not meet the user provided threshold C0. In addition or alternative, a new iteration may be performed: the rough or incorrect estimated localization may be fed back, as feedback 384b, to the constraint definer 364 and a new, more reliable iteration may be performed.

Otherwise, the depth (or other localization) computed from the retrieving block 363 or copied from input 383a is accepted and provided (387') as localized position associated to a particular 2D pixel of the first 2D image.

8 ANALYSIS OF TECHNICAL ISSUES SOLVED BY THE EXAMPLES

Figure 4:
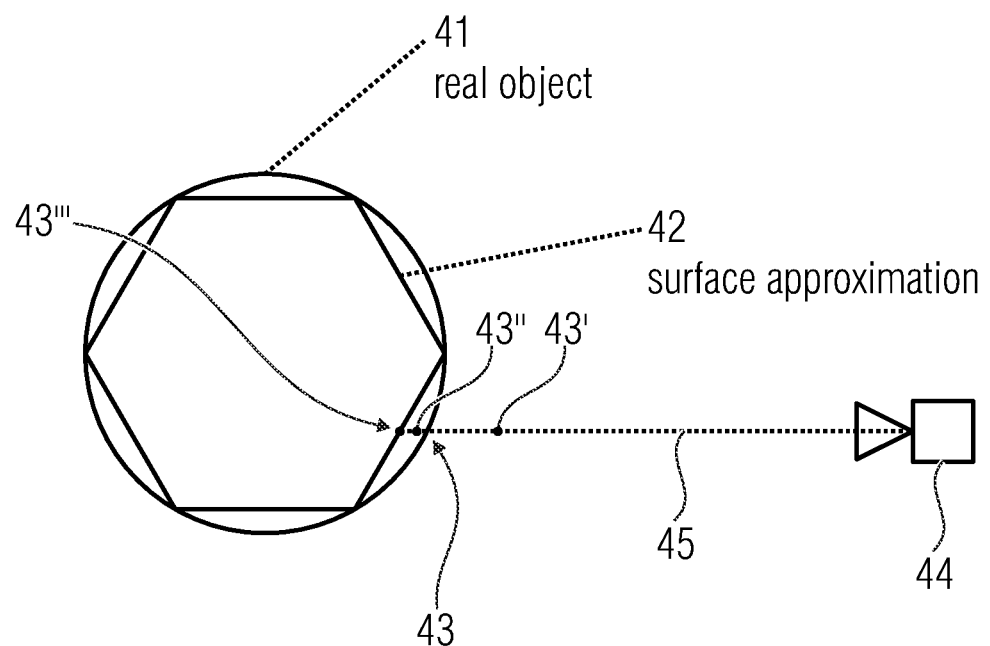
FIGS. 4-6 illustrate challenges in the technology, and in particular.

Reference [8] describes a method how to use a 3D mesh for refinement of a depth map. To this end, they compute the depth of the 3D mesh from a given camera, and use this information to update the depth map of the considered camera. FIG. 4 depicts the corresponding principle. It shows an example 3D object 41 in form of a sphere and a surface approximation 42 that has been drawn by the user. A camera 44 acquires the sphere 41, to obtain a 2D image as a matrix of pixels (or other 2D representation elements). Each pixel is associated to an object element and may be understood as representing the intersection between one ray and surface of the real object 41: for example, one pixel (representing point 43 of the real object 41) is understood to be associated to the intersection between the ray 45 and the surface of the real object 41.

However, it is not easy to recognize the real position of the point 43 in the space. From the 2D image as acquired by the camera 44, it is in particular not easy to understand where point 43 could be localized, for example, in incorrect position 43' or 43". This is the reason why some kinds of strategies need to be used for determining the real position of the imaged point (object element).

According to examples, a search for the correct imaged position may be restricted to a particular admissible range or interval of candidate spatial positions, and, only among the admissible range or interval of candidate spatial positions, similarity metrics are processed to derive the actual spatial position based on triangulation between two or more cameras.

To restrict the search of admissible candidate spatial position, a technique based on the use of a surface approximation 42 may be used. The surface approximation 42 may be drawn in form of a mesh, although alternative geometry primitives are possible.

In order to compute the admissible intervals of depth values for each pixel, it is needed to determine whether a given pixel is impacted by a surface approximation, and if so, by which part of the surface approximation. In other words, it is needed to determine which 3D point 43''' of the surface approximation 42 is pictured by the pixel. The depth of that 3D point 43''' can then be considered as a possible depth candidate of that pixel.

Finding the 3D point of the surface approximation (e.g., 43''') that is actually pictured by a pixel is possible by intersecting the ray 45 defined by the pixel and the entrance pupil of the camera 44 with the surface approximation 42. If such an intersection point 43''' exists, the pixel is considered to belong to the surface approximation 42 and hence the 3D object 41.

Hence, the range or interval of admissible candidate spatial positions for the pixel may be restricted to the proximal interval starting from point 43''' (point 43''' being the intersection between the ray 45 and the surface approximation 42).

The ray intersection is a technical concept that can be implemented in different variants. One is to intersect all geometry primitives of the scene with the ray 45 and determine those geometry primitives that have a valid intersection point. Alternatively, all surface approximations can be projected onto the camera view. Then each pixel is labelled with the surface approximation that is relevant.

Unfortunately, even when we have found the 3D point 43''' of the surface approximation 42 and its depth that corresponds to a considered pixel imaged by camera 44, we still need to deduce a possible interval of depth values that are admissible for the considered pixel. Basically, even if we have found an extremity 43''' of the range of admissible candidate spatial position, we have not limited the range of admissible candidate spatial position enough.

While reference [8] does not give any details on this step, there are a couple of pitfalls that need to be avoided and that are detailed in the following.

First of all, it has to be noted that the depth value corresponding to point 43''' cannot be directly used for the depth value of the pixel. The reason is that due to time constraints the user is not able or willing to create a very precise mesh. Consequently, the depth of point 43''' of the surface approximation 42 is not the same of that the depth of the real object in point 43. Instead, it only provides a coarse approximation. As visible in FIG. 4, the real depth (corresponding to point 43) of the real object 41 is different from the depth (corresponding to point 43''') of the 3D mesh 42. Hence, we need to devise an algorithm that translates the 3D mesh 42 into an admissible depth value (see Section 10).

Figure 40:
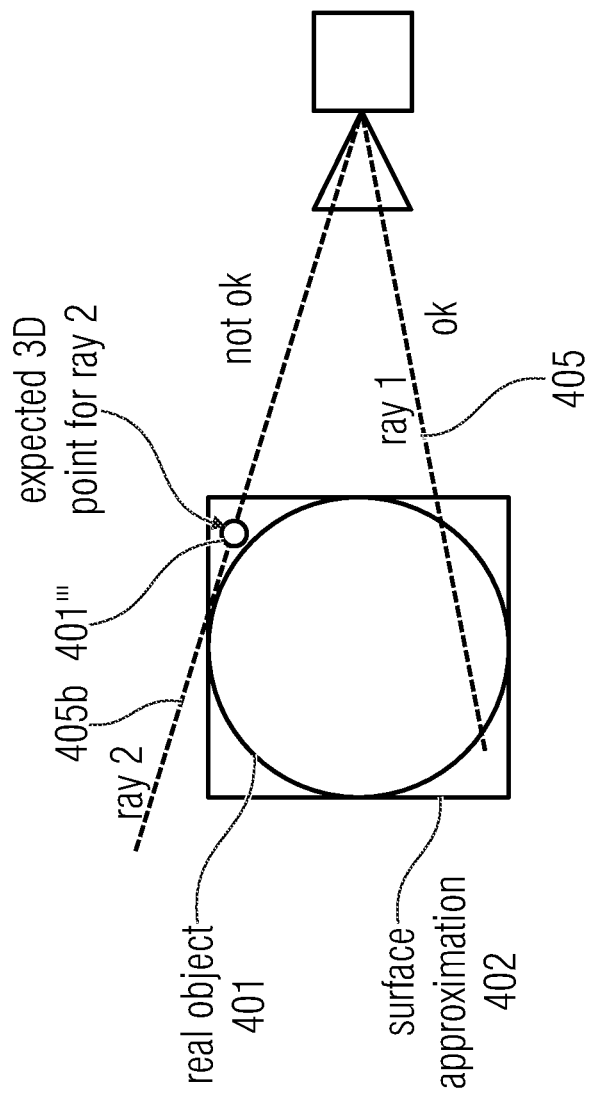
FIG. 40 shows a procedure which may be avoided.

The fact that the user only indicates an approximate surface approximation makes it advisable that the surface approximations are contained within the real object. The consequences for deviation from this rule are depicted in the FIG. 40.

In this case, the user draws a coarse surface approximation 402 for the real cylinder object 401. By these means, the object element 401''' associated with ray 2 (405*b*) is assumed to be close to the surface approximation 402, because ray 2 (405*b*) intersects the surface approximation 402. However, such a conclusion does not need to be true. By these means, wrong constraints can be imposed, which leads to artefacts in the depth map.

Consequently, for the following it is advised that the surface approximations are contained within an object. A user may deviate from this rule, and depending on the camera positions, the results obtained will still be correct, though the risk of wrong depth values increases. In other words, while the drawings and discussions in the following assume that surface approximations are situated within an object, the same approaches can be applied with small modifications if this does not hold.

Figure 5:
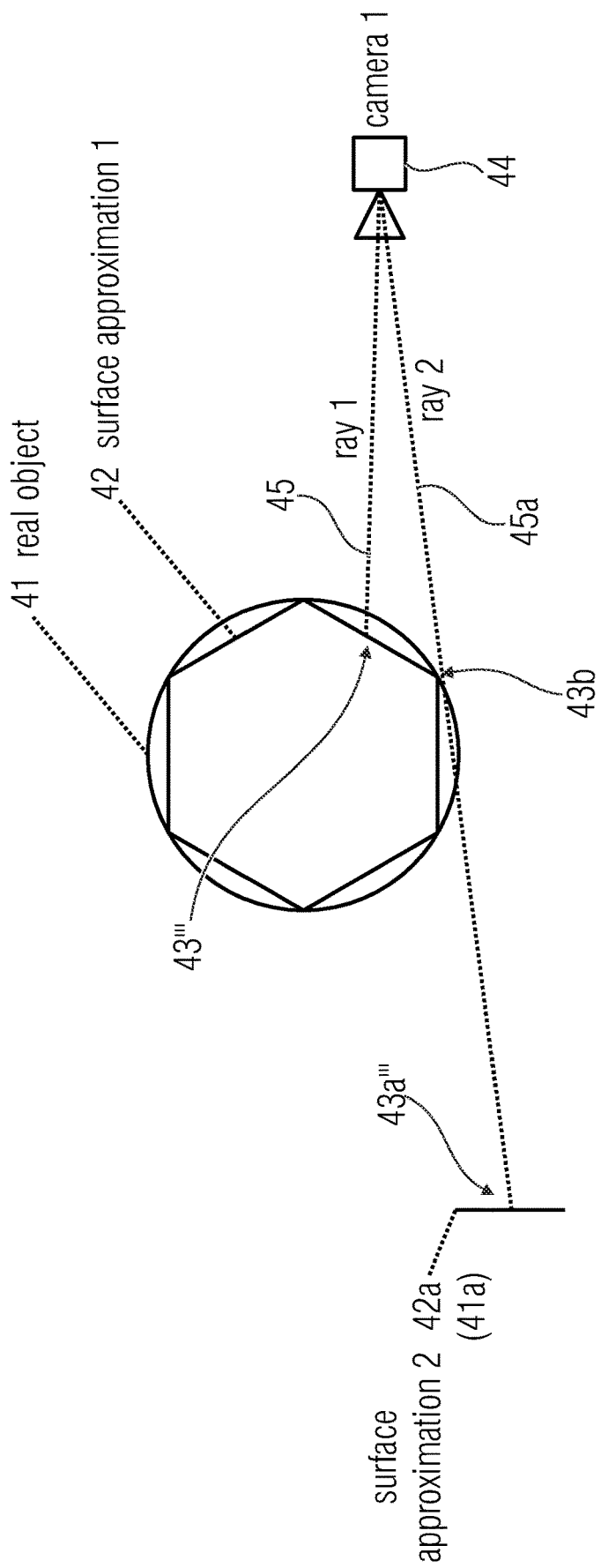

But even when the surface approximations are contained within an object, there are still resulting challenges from the fact that they only coarsely represent the object. One of those are competing constraints as shown in FIG. 5. FIG. 5 depicts an example of competing surface approximations. The scene consists of two 3D objects, namely a sphere (labelled real object 41) and a plane as a second object 41, not visible in the figure. Both of the 3D objects 41 and 41*a* are represented by corresponding surface approximations 42 and 42*a*.

In the 2D image obtained from camera 1 (44), the pixel associated to ray 1 (45) may be localized as being in the first real object 41 by virtue of the intersection with the surface approximation 42, which correctly limits the range of the admissible spatial positions to the positions in the interval in ray 1 (45) at the right of point 43'''.

However, there is the problem of correctly localizing the pixel associated to ray 2 (45*a*), which actually represents the element 43*b* (intersection between the circumference of the real object 41 with the ray 45*a*). A priori it would not be possible to arrive at the correct conclusion. In fact, ray 2 (45*a*) does not intersect the surface approximation 1 (42), but it does intersect the surface approximation 2 (42*a*) at point 43*a*'''. Therefore, the mere use of the surface approximations leads to restrict the range or interval of candidate spatial positions to incorrectly localize the pixel obtained from ray 2 (45*a*) in correspondence to the plane 41*a* (second object), and not to the actual position of the element 43*b*.

Reason for these pitfalls is that the surface approximation 1 (42) only roughly describes the sphere 41. Consequently, ray 2 (45*a*) does not intersect with the surface approximation 1 (41), leading to the error of incorrectly localizing the element 43*b* in correspondence to point 43*a*'''.

Without surface approximation 2 (42*a*), pixel 2 belonging to ray 2 (45*a*) would be unconstrained. Depending on the depth estimation algorithm and the similarity metrics used, it might be assigned to the correct depth, because its neighbor pixels will have the correct depth of the sphere, at the price of an extremely high computation effort (as the similarity metrics of all the positions swept in the ray 2 (45*a*) should be compared, enormously increasing the process). However, with the surface approximation 2 (42*a*) in place, pixel 2 would be enforced to belong to the plane 41*a*. As a consequence, the derived admissible depth range would be wrong, and hence also the computed depth value would be incorrect.

Consequently, we need to come up with a concept how to avoid wrong depth values caused by competing depth constraints.

Figure 6:
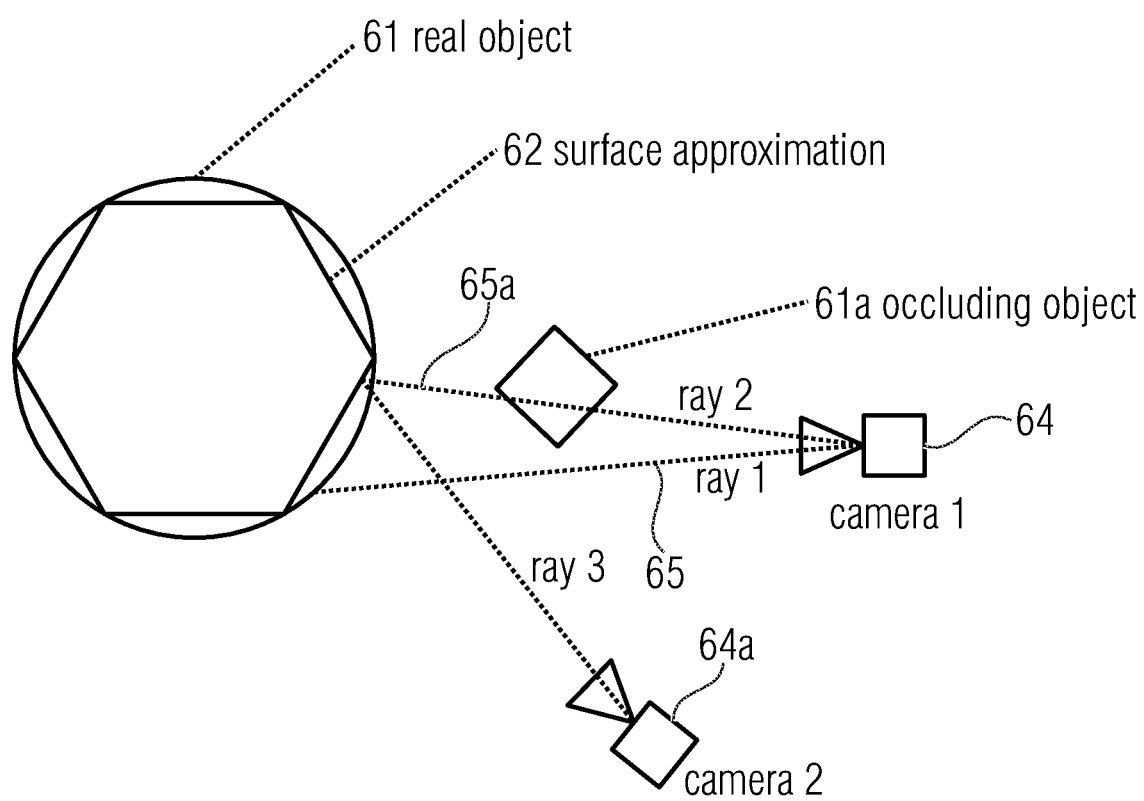

Another issue has been identified, which regards the occlusions. Occlusions need to be considered in a specific way to lead to correct depth values. This is not considered in reference [8]. FIG. 6 shows a real object (cylinder) 61 that is described by a hexagonal surface approximation 62 and is imaged by camera 1 (64) and camera 2 (64*a*), in known positional relationship with each other. However, for one of the two camera positions, the cylinder object 61 is occluded by another object 61*a* drawn as a diamond, the occluding object lacking any surface approximation.

This situation has the following consequences: While the pixel associated to ray 1 (65) will be correctly identified to belong to the surface approximation 62, the pixel associated to ray 2 (65*a*) will not be correctly identified: the pixel associated to ray 2 (65*a*) will be associated to the object 61 only by virtue of the intersection with the surface approximation 62 for the object 61 and of the absence of any surface approximation for the occluding object 61*a*.

Consequently, the admissible depth ranges for ray 2 (65*a*) will be close to the cylinder 61 instead of the diamond 62. Consequently, the automatically computed depth values will be wrong.

One way to solve this situation would be to create another surface approximation of the diamond as well. But this results in the need to manually create precise 3D reconstructions for all objects in the scene, which is to avoid because it is too time consuming.

In general terms, with or without the use of surface approximations, the techniques according to conventional technology may be prone to errors (by incorrectly assigning pixels to false objects) or may need the processing of similarity metrics in a too extended range of candidate spatial positions.

Therefore, techniques are needed for reducing the computational effort and/or for increasing the reliability of the localization.

9. INCLUSIVE VOLUMES FOR INTERACTIVE DEPTH MAP IMPROVEMENT

Above and below, reference is often made to "pixels" for brevity, even if the techniques may be generalized to "2D representation elements".

Above and below, reference is often made to "rays" for brevity, even if the techniques may be generalized to "ranges or intervals of candidate spatial positions". A range or interval of candidate spatial positions may extend or be developed, for example, along a ray exiting from the nodal point of the camera with respect to the determined 2D image. Theoretically, under the mathematical point of view a pixel is ideally associated to a ray (e.g., 24 in FIG. 2): the pixel ($X_L$ in FIG. 2) could be associated to a range or interval of candidate spatial positions which could be understood as a conical or truncated-conical volume exiting from the nodal point ($O_L$ In FIG. 2) towards infinite. However, in the following, the "range or interval of candidate spatial positions" is mainly discussed as a "ray", keeping in mind that its meaning may be easily generalized.

The "range or interval of candidate spatial positions" may be restricted to more limited "range(s) or interval(s) of admissible candidate spatial positions" on the basis of particular constraints discussed below (hence excluding some spatial positions which are considered inadmissible, e.g., by visual analysis of a human user or by an automatic determination method). For example, inadmissible spatial positions (e.g., those which are evidently incorrect at human eye) may be excluded, so as to reduce the computational efforts when retrieving.

Here, reference is often made to "depth" or "depth map", wherein both of them may be generalized to the concept of "localization". Depth maps may be stored as disparity maps, where the disparity is proportional to the multiplicative inverse of the depth.

Here, reference to "object element" may be understood as "a part of an object which is imaged by (associated to) the corresponding 2D representation element" (e.g., pixel). The "object element" may be understood, in some cases, as a small surficial element of an opaque solid element. Often, the discussed techniques have the purpose of localizing, in the space, the object element. By putting together localizations of multiple object elements, for example, the shape of a real object may be reconstructed.

Examples discussed above and below may refer to methods for localizing object elements. An object element of at least one object may be localized. In some cases, if there are two objects (distinct from each other) in the same imaged space, there is the possibility of determining whether an object element is associated to a first or a second object. In some examples, a previously obtained depth map (or otherwise a rough localization) may be refined, e.g., by localizing an object element with increased reliability than in the previously obtained depth map.

In the examples below and above, reference is often made to positional relationships (e.g., for each camera, the position of the optical centers $O_L$ and $O_R$ as in FIG. 2). It may be understood that the "positional relationships" also encompass all camera parameters, both the external camera parameters (e.g., camera's position, orientation, etc.) as well as internal camera parameters (e.g., focal length, which may influence the geometry of the acquisition, as usual in the epi-polar geometry). These parameters (which may be a priori known) may also be used for the operations for localization and depth map estimation.

When analyzing the similarity metrics (e.g., at step 37 and/or 353 or block 363) for a first determined image (e.g., 22), a second 2D image (e.g., 22) may be taken into consideration (e.g., by analyzing the pixels in the epi-polar line 21 of FIG. 2). The second 2D image (22) may be acquired by a second camera, or by the same camera in a different position (under the hypothesis that the imaged object has not been moved). FIGS. 7, 8, 9, 10, 13, 29, etc. only show one single camera for conciseness, but it shall be understood that the computation of similarity metrics (37, 353) will be carried out by making use of a second 2D image obtained with a different non-shown camera or by the same camera from a different position (as in FIG. 2) (the different positions have a known positional relationship, i.e., internal and external parameters of the camera(s) are known).

It is also noted that in subsequent examples (e.g., FIGS. 11, 12, 12a, 27, 37, etc.) two cameras are shown. It is possible that the two cameras are those used for analysing the similarity metrics (e.g., at step 37 and/or 353) in the epi-polar geometry (as in FIG. 2), but this is not strictly needed: there may be other (not shown) additional cameras that may be used for analyzing the similarity metrics.

In the examples above and below, reference is often made to "objects", in the sense that they may be in a plural number. However, while in some cases they may be understood as being distinct and separate from each other, it may be that they are structurally connected to each other (e.g., by being made of the same material, or by being linked to each other, etc.) It may be understood that, in some cases, "multiple objects" may therefore refer to "multiple portions" of the same object, hence giving to the word "object" a broad meaning. Surface approximations and/or inclusive volumes and/or exclusive volumes may be therefore associated to different parts of the a single object (each part being an object itself).

9.1 Principles

Problems such as those explained in Section 8 can be solved by complementing the surface approximations (e.g., in form of 3D meshes) by the implementation of inclusive volumes. In more detail, the two geometry primitives may be described as follows.

Figure 7:
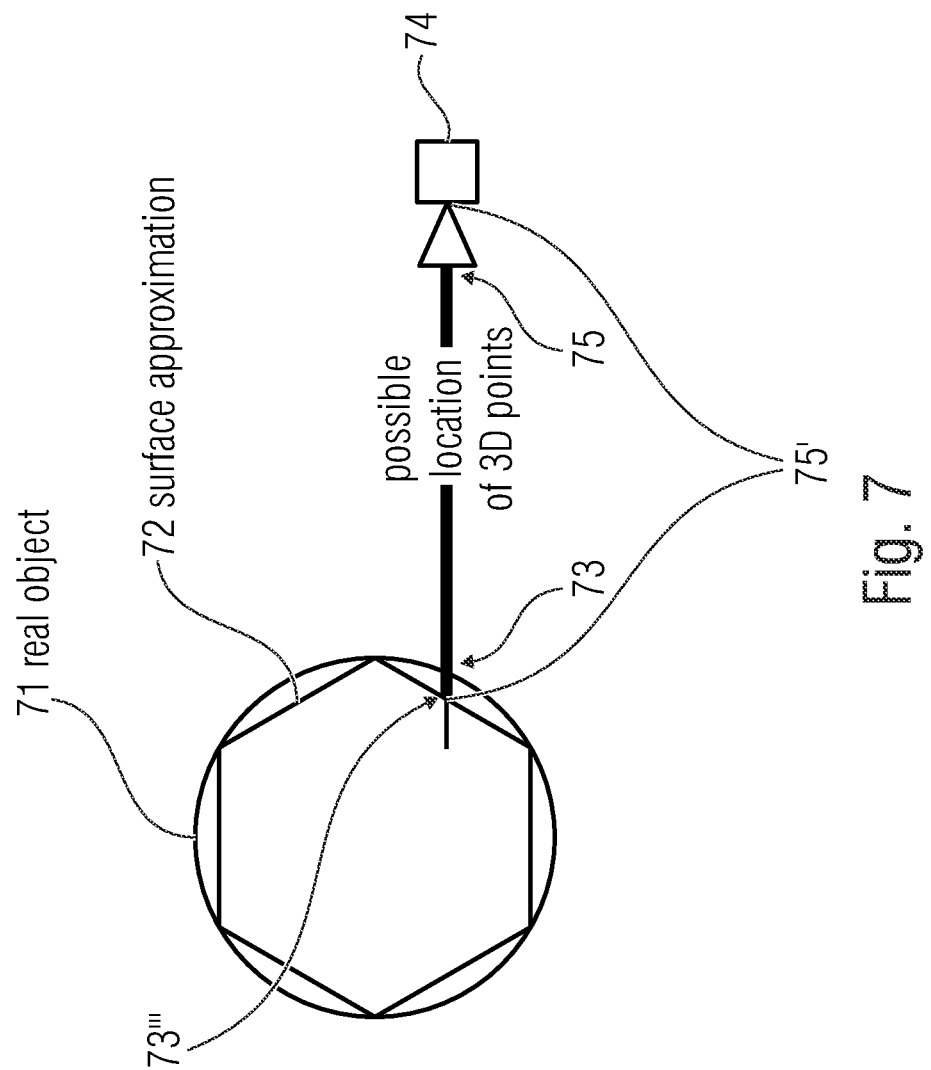

Reference is now made to FIG. 7. In case a ray 75 (or another range or interval of candidate positions) associated to a pixel (or another 2D representation element) intersects with a surface approximation 72, this may indicate that the corresponding 3D point 73 is situated between the position of the camera 74 and the intersection point 73''' of the pixel ray 75 with the surface approximation 71.

Without additional information, the 3D point (object element) 73 can be located in the interval 75', along the ray 75 between the point 73''' (intersection point of the ray 75 with the surface approximation 72) and the position of the camera 74. This may result to be not restrictive enough: the similarity metrics will have to be processed for the whole length of the segment. According to examples provided here, we introduce methods to further reduce the admissible depth values, hence increasing the reliability and/or reducing the computational efforts. Hence, one objective which we pursue is that of processing the similarity metrics in a more restricted range than the range 75'. In some examples, this objective may be attained by using constraint-based techniques.

A constraint-based technique may be that of adding inclusive volumes. Inclusive volumes may be closed volumes. They may be understood in such a way: A closed volume separates the space into two or more disjunctive subspaces, such that there doesn't exist any path from one subspace into another one without traversing a surface of the closed volume. Inclusive volumes indicate the possible existence of a 3D point (object element) in the enclosed volume. In other words, if a ray intersects an inclusive volume, it defines possible 3D location points as depicted in FIG. 8.

Figure 8:
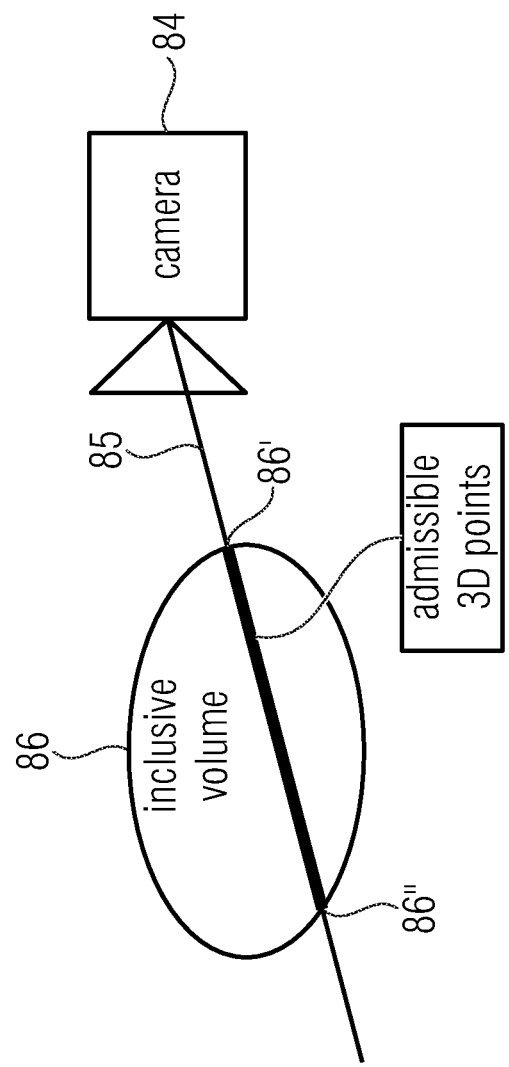

FIG. 8 shows an inclusive volume 86 constraining a ray 85 between a proximal extremity 86' and a distal extremity 86".

According to examples, outside the inclusive volume 86, no localization on ray 85 is possible (and no analysis of the similarity metrics will be attempted in step 37 or 353 or block 363). According to examples, localization on ray 85 is possible only within the at least one inclusive volume 86. Notably, an inclusive volume may be generated automatically (e.g., from a surface approximation) and/or manually (e.g., by the user) and/or semi-automatically (e.g., by a user with the aid of a computing system).

Figure 9:
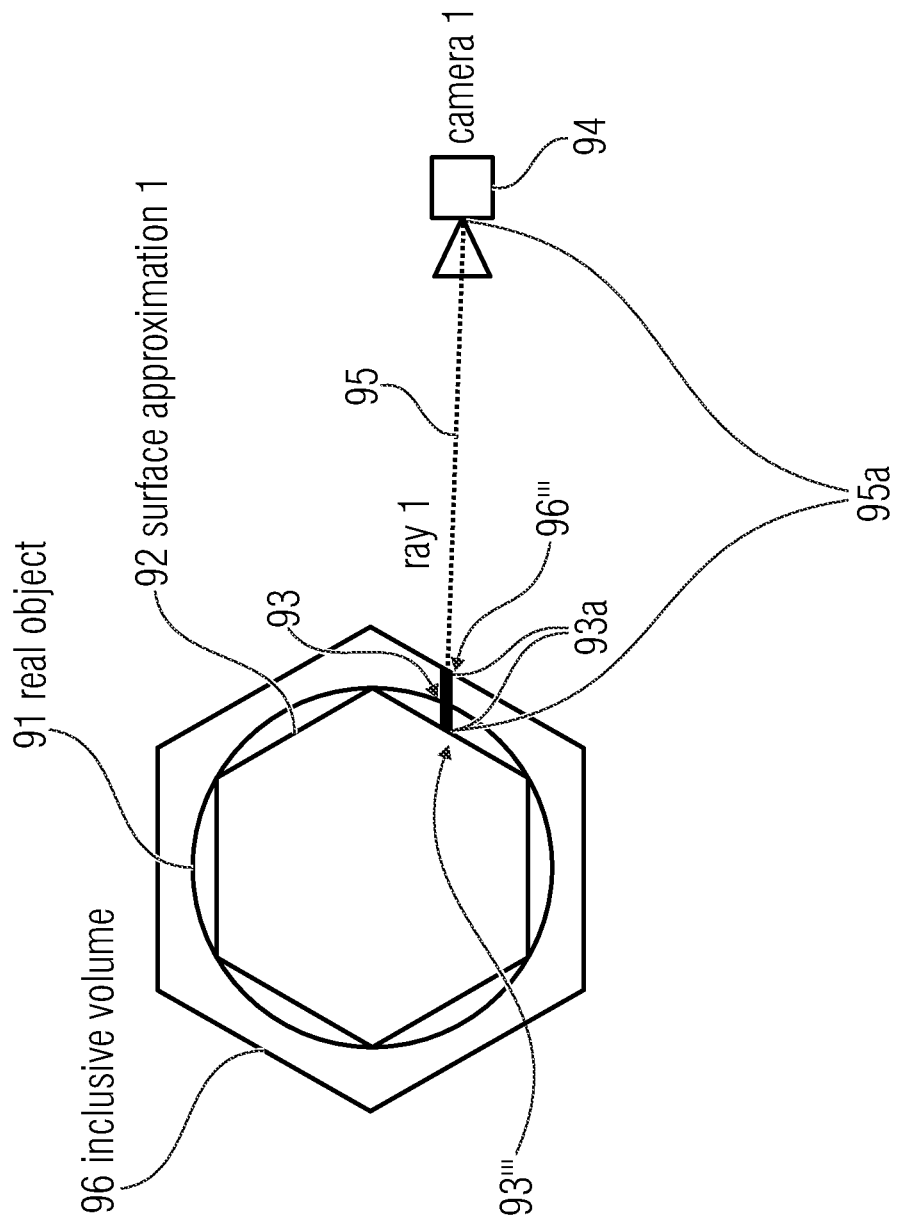

An example is provided in FIG. 9. Here, a real object 91 is imaged by a camera 94. Through a ray 1 (95), a particular pixel (or more in general 2D representation element) represents the object element 93 (which is at the intersection between the surface of the object 91 and the ray 1 (95)). We intend to localize the object element 93 with high reliability and low computational effort.

A surface approximation 1 (92) may be defined (e.g., by the user) so that each point of the surface approximation 1 (92) is contained within the object 91. An inclusive volume 96 may be defined (e.g., by the user) so that the inclusive volume 96 surrounds the real object 91.

At first, a range or interval of candidate spatial positions is derived: this range may be developed along the ray 1 (95) and contain, therefore, a big quantity of candidate positions.

Further (e.g., at step 36 in FIG. 3 or step 352 or block 362), the range or interval of candidate spatial positions may be restricted to a restricted range or interval of admissible candidate spatial positions, e.g., a segment 93a. The segment 93a may have a first, proximal extremity 96''' (e.g., the intersection between the ray 95, and the inclusive volume 96) and a second, distal extremity 93''' (e.g., the intersection between the ray 95, and the surface approximation 92). The comparison between the segment 93a (used with this technique) and the segment 95a (which would be used without the definition of the inclusive volume 96) permits to appreciate the advantages of the present technique with respect to conventional technology.

Finally (e.g., at step 37 or 353 or block 363), similarity metrics may be computed only within the segment 93a (restricted range or interval of admissible candidate spatial positions), and the object element 93 may be more easily and more reliably localized (hence excluding inadmissible positions, such as those between the camera position and point 96'''), without making excessive use of computational resources. The similarity metrics may be used, for example, as explained with reference to FIG. 2.

In a variant, the surface approximation 1 (92) may be avoided. In that case, the similarity metrics would be computed along the whole segment defined between the two intersections of ray 95 with the inclusive volume 96, notwithstanding decreasing the computational effort with respect to segment 95a (as in conventional technology).

Inclusive volumes can be in general terms used in at least two ways:

They can surround a surface approximation. In this function they restrict the admissible 3D points and hence depth values allowed by a surface approximation alone. This is depicted in FIG. 9. The surface approximation 1 (92) specifies that all 3D points (admissible candidate positions) are to be situated between the camera 94 and the intersection point 93''' of the pixel ray 95 with the surface approximation 1 (92). The inclusive volume 96 on the other hand specifies that all points (admissible candidate positions) are to be situated within the inclusive volume 96. As a consequence, only the bold locations of segment 93a in FIG. 9 are admissible.

Inclusive volumes can surround occluding objects. This is shown, for example, in FIG. 10 (see the subsequent section). The hexagonal surface approximations and inclusive volumes bound the possible locations of the cylindrical real object. The inclusive volume around the diamond finally informs the depth estimation procedure that there may be also 3D points in the surrounding inclusive volumes. The admissible depth values are hence formed by two disjoint intervals, each defined by one inclusive volume.

Instead of surrounding surface approximations with inclusive volumes to define admissible depth ranges, it is also possible to obtain the restricted range or interval of admissible spatial positions at least partially implicitly (e.g., without that the user needs to actually drain an inclusive volume). More details of such an approach will be explained in Section 10.2. A precise procedure how to translate inclusive volumes and surface approximations into admissible depth ranges is given in Section 10.

It may be noted that the at least one restricted range or interval of admissible candidate spatial positions may be a non-continuous range, and may include a plurality of distinct and/or disjointed restricted ranges (e.g., one for each object and/or one of each inclusive volume).

9.2 Treatment of Occluding Objects by Means of Inclusive Volumes

Figure 10:
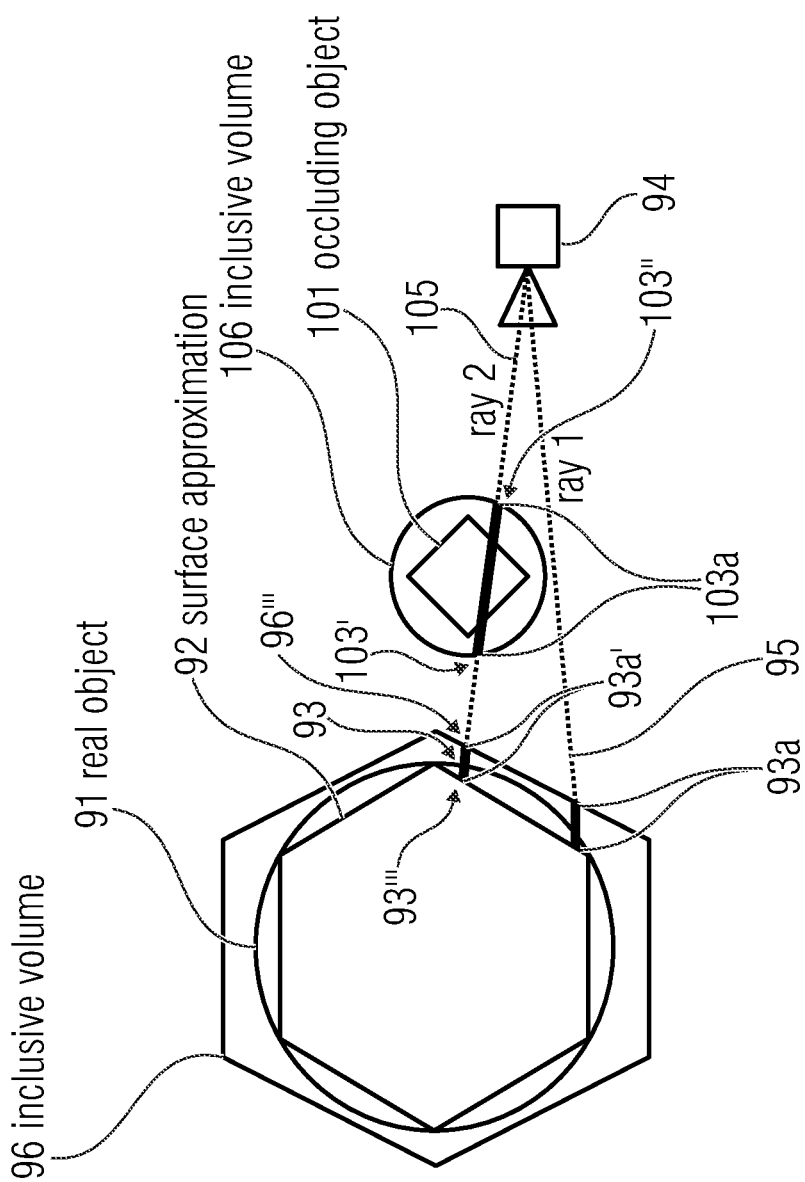

Reference may be made to FIG. 10. Here, a first real object 91 is imaged by a camera 94. However, a second real object 101 is present in foreground (occluding object). It is intended to localize the element represented by a pixel (or more in general 2D representation element) associated to a ray 2 (105): it is a priori not known whether the element is an element of the real object 91 or of the real occluding object 101. In particular, localizing an imaged element may imply to determine whether the element pertains to which of the real objects 91 and 101.

For the pixel associated to ray 1 (95), reference can be made to the example of FIG. 9, so as to arrive at the conclusion that the imaged object element is to be retrieved within the interval 93a.

However, for the pixel associated to ray 2 (105), it is a priori not easy to localize the imaged object element. To fulfil such a purpose, a technique such as the following one may be used.

A surface approximation 92 may be defined (e.g., by the user) so that each point of the surface approximation 92 is contained within the real object 91. A first inclusive volume 96 may be defined (e.g., by the user) so that the first inclusive volume 96 surrounds the real object 91. A second inclusive volume 106 may be defined (e.g., by the user) so that the inclusive volume 106 surrounds the second object 101.

At first, a range or interval of candidate spatial positions is derived: this range may be developed along the ray 2 (105) and contain, therefore, a big quantity of candidate positions (between the camera position and infinite).

Further (e.g., at blocks 35 and 36 in method 30 of FIG. 3 and/or 352 in method 350 of FIG. 35), the range or interval of candidate spatial positions may be further restricted to at least one restricted range or interval of admissible candidate spatial positions. The at least one restricted range or interval of admissible candidate spatial positions (which may therefore exclude spatial positions held inadmissible) may comprise:

a segment 93a' between the extremities 93''' and 96''' (like in the example of FIG. 9);

a segment 103a between the extremities 103' and 103'' (e.g., intersections between the ray 105 and the inclusive volume 106).

Finally (e.g., at step 37 in FIG. 3 or 353 in FIG. 35 or block 362), similarity metrics may be computed only within the at least one restricted range or interval of admissible candidate spatial positions (segments 93a' and 103a), so as to localize (e.g., by retrieving a depth of) the object element imaged by the pixel particular pixel and/or to determine whether the imaged object element pertains to the first object 91 or to the second object 101.

It is noted that, a priori, an automatic system (e.g., block 362) does not know the position of the object element which is actually imaged with ray 2 (105): this is defined by the spatial configuration of the objects 91 and 101 (and in particular by the object's extension in the dimension entering into the paper in FIG. 10). Anyway, the correct element will be retrieved by using similarity metrics (e.g., as in FIG. 2 above).

Generalizing the procedure, it may be stated that it is possible to restrict the range or interval of candidate spatial positions to:

at least one first restricted range or interval of admissible candidate spatial positions (e.g., segment 93a for ray 1; segment 93a' for ray 2) associated to the first determined object (e.g., 91); and a at least one second restricted range or interval of admissible candidate spatial positions (e.g., void for ray 1; segment 103a for ray 2) associated to the second determined object (e.g., 101), wherein restricting includes defining the at least one inclusive volume (e.g., 96) as a first inclusive volume surrounding the first determined object (91) (and a second inclusive volume (e.g., 106) surrounding the second determined object (e.g., 106)), to limit the at least one first (and/or second) range or interval of candidate spatial positions (e.g., 93a', 103a); and determining whether the particular 2D representation element is associated to the first determined object (e.g., 91) or is associated to the second determined object (e.g., 96).

The determination may be based, for example, on similarity metrics, e.g., as discussed with respect to FIG. 2 and/or with other techniques (e.g., see below).

In addition or in alternative, in some examples it is also possible to make use of other observations. For example, in the case of ray 1 (95), on the basis of the observation that the intersection between ray 1 (95) and the second inclusive volume 106 is void, it is possible to conclude that ray 1 (95) only pertains to the first object 91. Notably, the last conclusion does not strictly need to take into consideration similarity metrics and may therefore be performed in the restricting step 352, for example.

In other words, FIG. 10 shows a real object (cylinder) 91 that is described by a hexagonal surface approximation 92. For the considered camera view, however, the cylinder object 92 is occluded by another object 101 drawn as a diamond.

This has the following consequences when considering surface approximation 1 (92) only: While the pixel associated to ray 1 (95) will be correctly identified to belong to the surface approximation 92, the pixel associated to ray 2 (105) will not, and will hence lead to artefacts in the depth map, when no appropriate countermeasures are done.

One could think that one way to solve this situation would be to create another surface approximation of the diamond as well. But in the end, this results in the need to manually create precise 3D reconstructions for all objects in the scene, which is to avoid because it is too time consuming.

To solve this problem, as explained above, our technique introduces in addition to the surface approximations described above so-called inclusive volume(s) 96 and/or 106. An inclusive volume 96 or 106 can again be drawn in form of meshes or any other geometry primitive.

Inclusive volumes may be defined to be a rough hull around an object and indicate the possibility that a 3D point (object element) may be situated in an inclusive volume (e.g., 96, 106 . . . ). This does not mean that there needs to be 3D point (object element) in such an inclusive volume. It only may (the decision of generating an inclusive volume may be left to the user). In order to avoid ambiguities for different camera positions (not shown in FIG. 10), an inclusive volume may be a closed volume, which has an external surface but no borders (no external edges). A closed volume, when placed under water, has one side of each surface which needs to stay dry.

The use of surface approximations (e.g., 92), inclusive volumes (e.g., 96, 106), or their combination, thus permits to define more complex depth map ranges consisting of a set of possibly disjunctive depth map intervals (e.g., 93a' and 103a). The automatic depth map processing (e.g., at retrieving step 353 or 37 or block 363) hence still can profit from a reduced search space, while properly handling occluding objects.

A user is not requested to draw an inclusive volume around each object in the scene. In case the depth can be reliably estimated for the occluding object, no inclusive volume has to be drawn. More details can be found in Section 10.

With reference to FIG. 10, there may be the variant according to which no surface approximation 92 is defined for the object 91. In that case, for ray 2 (105), the restricted ranges or intervals of admissible candidate spatial positions would be formed by:

the segment having as extremities both the intersections of ray 105 and the inclusive volume 96 (instead of segment 93a'); and the segment 103a.

For ray 1 (95), the restricted range or interval of admissible candidate spatial positions would be formed by the segment having as extremities both the intersections of ray 1 (95) and the inclusive volume 96 (instead of segment 93*a*).

There may be the variant according to which a first surface approximation is defined for the object 91 and a second surface approximation is defined for the object 101. In that case, for ray 2 (105), the restricted range or interval of admissible candidate spatial positions would be formed by one little segment between the inclusive volume 106 and the second surface approximation associated to the object 101. This is because, after having found the intersection of ray 2 (105) with the surface approximation of object 101, there would not be the necessity of comparing metrics comparisons for the object 91, which is occluded by the object 101.

9.3 Using Inclusive Volumes to Solve Competing Constraints

Figure 11:
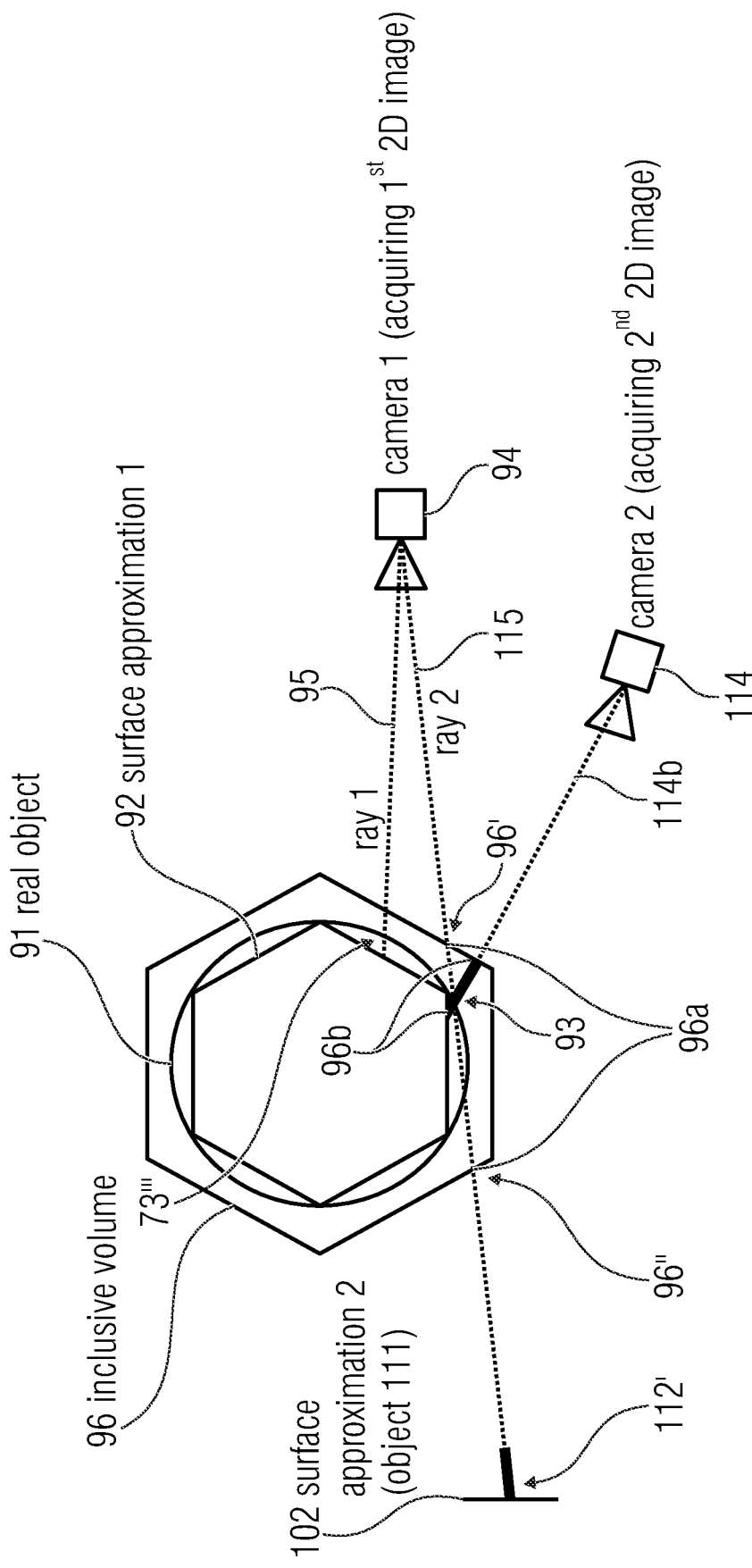

Surface approximations can in general compete against each other, which leads to potentially wrong results. To this end, this section elaborates a concept how this can be avoided. An example is shown by FIG. 11. Here, a first real object 91 could be in foreground and a second real object 111 could be in background with respect to camera 1 (94). The first object may be surrounded by an inclusive volume 96 and may contain therein a surface approximation 1 (92). The second object 111 (not shown) may contain a surface approximation 2 (114).

Here, the pixel (or other 2D representation element) associated to ray 1 (95) may be treated as in FIG. 9.

The pixel (or other 2D representation element) associated to ray 2 (115) may be subjected to the issue discussed above for FIG. 5 for ray 45*a* (Section 8). The real object element 93 is imaged, but it is in principle not easy to recognize its position. However, it is possible to make use of the following technique.

At first (e.g., at 351), a range or interval of candidate spatial positions is derived: this range may be developed along the ray 2 (115) and contain, therefore, a big quantity of candidate positions.

Further (e.g., at 35 and 36 and/or at 352 and/or at block 362), the range or interval of candidate spatial positions may be restricted to a restricted range(s) or interval(s) of admissible candidate spatial positions. Here, the restricted ranges or intervals of admissible candidate spatial positions may comprise:

a first restricted range or interval of admissible candidate spatial positions formed by a segment 96*a* between the extremities 96' and 96" (e.g., intersections between the inclusive volume 96 and the ray 115);

a second restricted range or interval of admissible candidate spatial positions formed by a point or a segment 112' (e.g., intersection between the ray 105 and the surface approximation 112). Alternatively, the surface approximation 112 can be surrounded by another inclusive volume to lead to a complete second depth segment.

(The restricted range 112' may be defined as one single point or as a tolerance interval in accordance to the particular example or the user's selections. Below, some examples for the use of tolerances are discussed. For the discussion in this part, it is simply noted that the restricted range 112' also contains candidate spatial positions).

Finally (e.g., at step 37 or 353 or 363), similarity metrics may be computed, but only within the segment 96*a* and the point or the segment 112', so as to localize the object element imaged by the particular pixel and/or to determine whether the imaged object element pertains to the first object 91 or to the second object 111 (hence, excluding some positions which are recognized as inadmissible). By restricting the range or interval of candidate spatial positions to restricted ranges or intervals of admissible candidate spatial positions (here formed by two distinct restricted ranges, i.e., segment 96*a* and point or segment 112'), an extremely easier and less calculation-power-demanding localization of the imaged object element 93 may be operated.

In general terms, it is possible to restrict the range or interval of candidate spatial positions to:

at least one first restricted range or interval of admissible candidate spatial positions (e.g., 96*a*) associated to the first determined object (e.g., 91); and at least one second restricted range or interval of admissible candidate spatial positions (e.g., 112') associated to the second determined object (e.g., 111), wherein restricting (e.g., 352) includes defining the at least one inclusive volume (e.g., 96) as a first inclusive volume surrounding the first determined object (e.g., 91), to limit the at least one first range or interval of candidate spatial positions (e.g., 96*a* and 103*a*); and wherein retrieving (e.g., 353) includes determining whether the particular 2D representation element is associated to the first determined object (e.g., 91) or is associated to the second determined object (e.g., 101, 111).

(The first and second restricted range or interval of admissible candidate spatial positions may be distinct and/or disjoint from each other).

Localization information (e.g., depth information) taken from the camera 2 (114) may be obtained, e.g., to confirm that the element which is actually imaged is the object element 93. Notably, the information taken from the camera 2 (114) may be or comprise information previously obtained (e.g. at a previous iteration, from a retrieving step (37, 353) performed for the object element 93). The information from the camera 2 (114) may also make use of pre-defined positional relationships between the cameras 1 and 2 (94 and 114).

On the basis of the information from the camera 2 (114), it is possible to localize, for the 2D image obtained from the camera 1 (94), the 2D representation element 93 within the segment 96*a* and/or to associate the 2D representation element 93 to the object 91. Hence, when comparing the similarity metrics in the 2D image acquired from the camera 1 (94), the positions 112" will be a priory excluded, hence saving computational costs.

In other words, when we exploit the multi-camera nature of our problem, we can create an even more powerful constraint. To this end, assume that the object (e.g., sphere) 91 is photographed by the second camera 2 (114). Camera 2 (114) has the advantage that the ray 114*b* for the object point 93 which is represented by ray 2 (115) of camera 1 (94) only hits the surface approximation 92 (and not the surface approximation 112). It is possible to compute the depth for camera 2 (114), and then derive that for ray 2 (94) only a depth representing the object 91 is viable. The latter may be processed, for example, at block 383 and/or 387.

With this procedure, during the subsequent analysis of the similarity metrics (e.g., step 37 or 353), it is possible to avoid to compute the similarity metrics for 112' when analyzing the first 2D image from camera 1 (94), hence reducing the computations.

In general terms, camera-consistency operations may be performed.

If the cameras 94 and 114 operate consistently (e.g., they output compatible localizations), hence the localized positions of the object element 93 as provided by both iterations of the method are coherent and are the same (e.g., within a predetermined tolerance).

If the cameras 94 and 114 do not operate consistently (e.g., they output incompatible localizations), it is possible to invalidate the localization (e.g., by the invalidator 383). In examples, it is possible to increase precision and/or to reduce tolerance and/or to request the user to increase the number of constraints (e.g., to increase the number of inclusive volumes, exclusive volumes, surface approximations) and/or to increase the precision (e.g., by reducing the tolerances or by redrawing the inclusive volumes, exclusive volumes, surface approximations more precisely).

In some cases, however, it is possible to automatically infer the correct position of the imaged object element 114. For example, if in FIG. 11 the object element 93 imaged through ray 1 (115) by camera 1 (94) is (e.g. at 37 or 353) incorrectly retrieved in the range 112', and the same object element 93 imaged through ray 114*b* by camera 2 (114) is (e.g. at 37 or 353) correctly retrieved in the interval 96*b* by camera 2 (114), it is possible to validate the position provided for camera 2 (114) by virtue of the fact that a smaller number (one: 96*b*) of restricted ranges or intervals of admissible candidate positions has been found with respect to the number of restricted ranges or intervals of admissible candidate positions (two: 112' and 96*a*) obtained for camera 1 (94). Therefore, it is the position provided for camera 2 is assumed to be more precise than that provided for camera 1 (94).

In alternative, it is possible to automatically infer the correct position of the imaged object element 93 by analyzing the confidence value calculated for each position. The estimated localization with highest confidence value may be the one chosen as final localization (e.g., 387').

Figure 46:
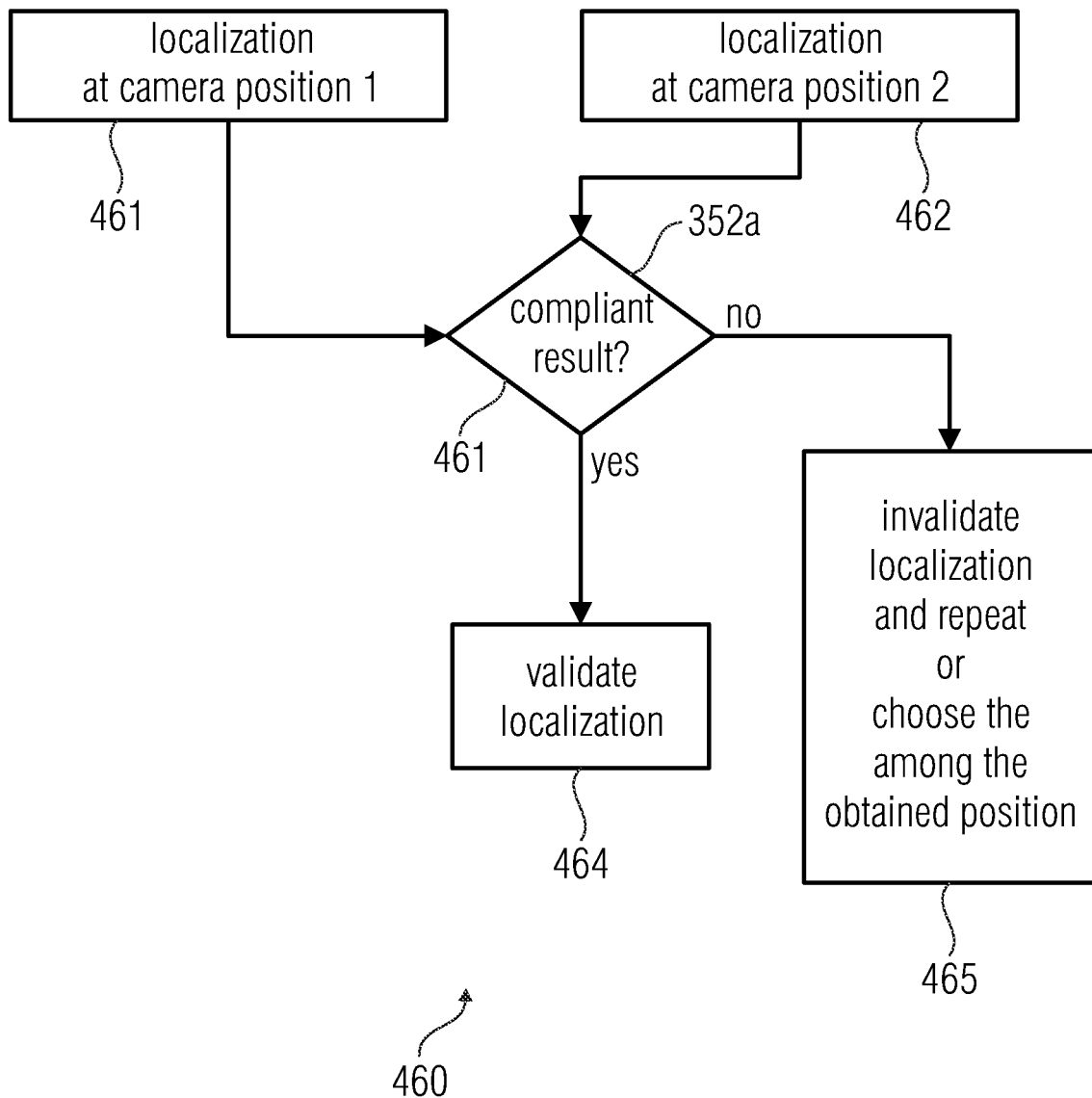

FIG. 46 shows a method 460 that may be used. At step 461, a first localization may be performed (e.g., using camera 1 (94)). At step 462, a second localization may be performed (e.g., using camera 2 (114)). At step 463, it is checked whether the first and the second localization provide the same or at least a compliant result. In case of same or compliant result, the localization is validated at step 464. In case of non-compliant result, the localization may be, according to specific example:
- invalidated, so as to output an error message; and/or
- invalidated, so as to reinitiate a new iteration; and/or
- analyzed, so as to choose the one of the two localizations on the basis of their confidence and/or reliability.

According to the examples, it is possible to base the confidence or reliability, at least on one of:
- the distance between the localized position and the camera position, and is increased for a closer distance;
- the number of objects or inclusive volumes or restricted ranges of admissible spatial positions, so as to increase the confidence value if, in the range or interval of admissible spatial candidate positions, where there are found a fewer number of objects or inclusive volumes or restricted ranges of admissible spatial positions;
- metrics on the confidence value, etc.

9.4 Properly Handling Planar Surface Approximations

So far, most surface approximations have enclosed a volume. This is in general very beneficial, in case the cameras have arbitrary viewing positions and for instance surround an object. The reason is that surface approximations surrounding a volume result in a correct depth indication wherever the camera is located. However, closed surface approximations are more cumbersome to draw than just planar ones.

Figure 12:
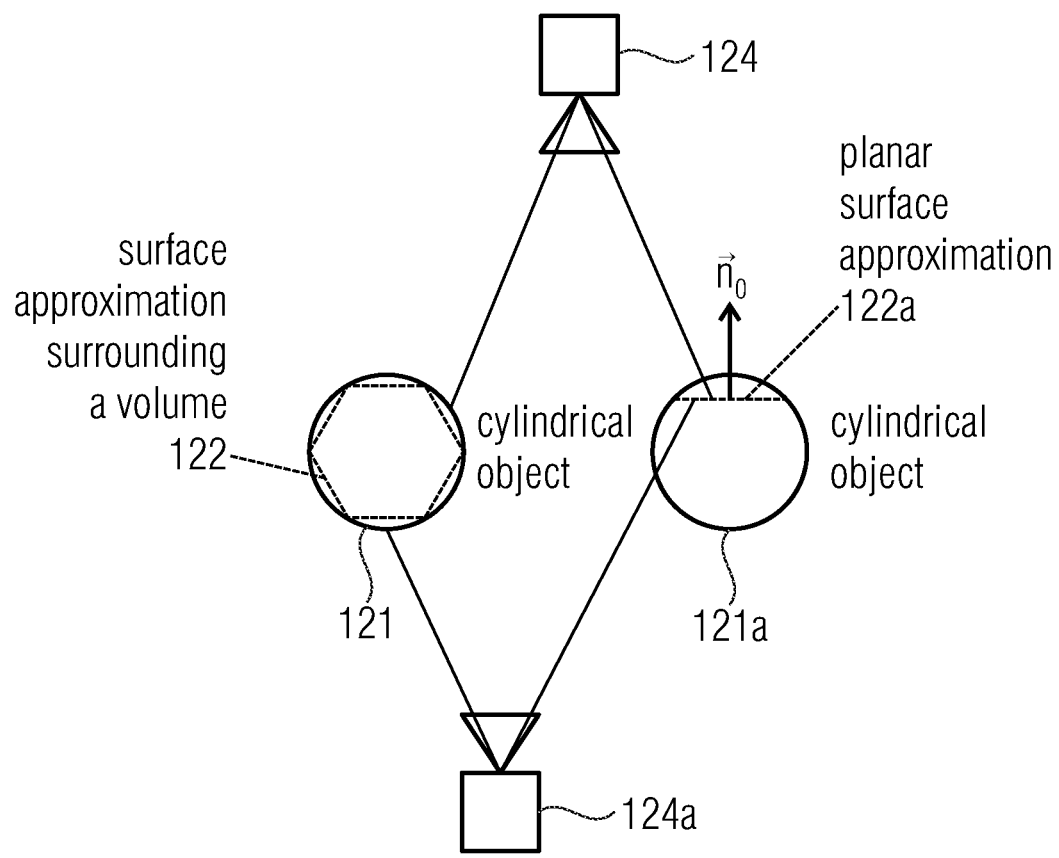

FIG. 12 depicts an example for a planar surface approximation. The scene consists of two cylindrical objects 121 and 121*a*. The object 121 is approximated by a surface approximation 122 that surrounds a volume. The cylinder 121*a* is only approximated at one side, using a simple plane as surface approximation 122*a*. In other words, the surface approximation 122*a* does not build a closed volume, and is thus called planar surface approximation in the following.

If we use closed volumes for surface approximations like 122 as advocated so far, this gives a correct indication of the estimated depth for all possible camera positions. In order to achieve the same for the planar surface approximation 122*a*, we may slightly need to extend the claimed approach as discussed in the following.

Figure 12A:
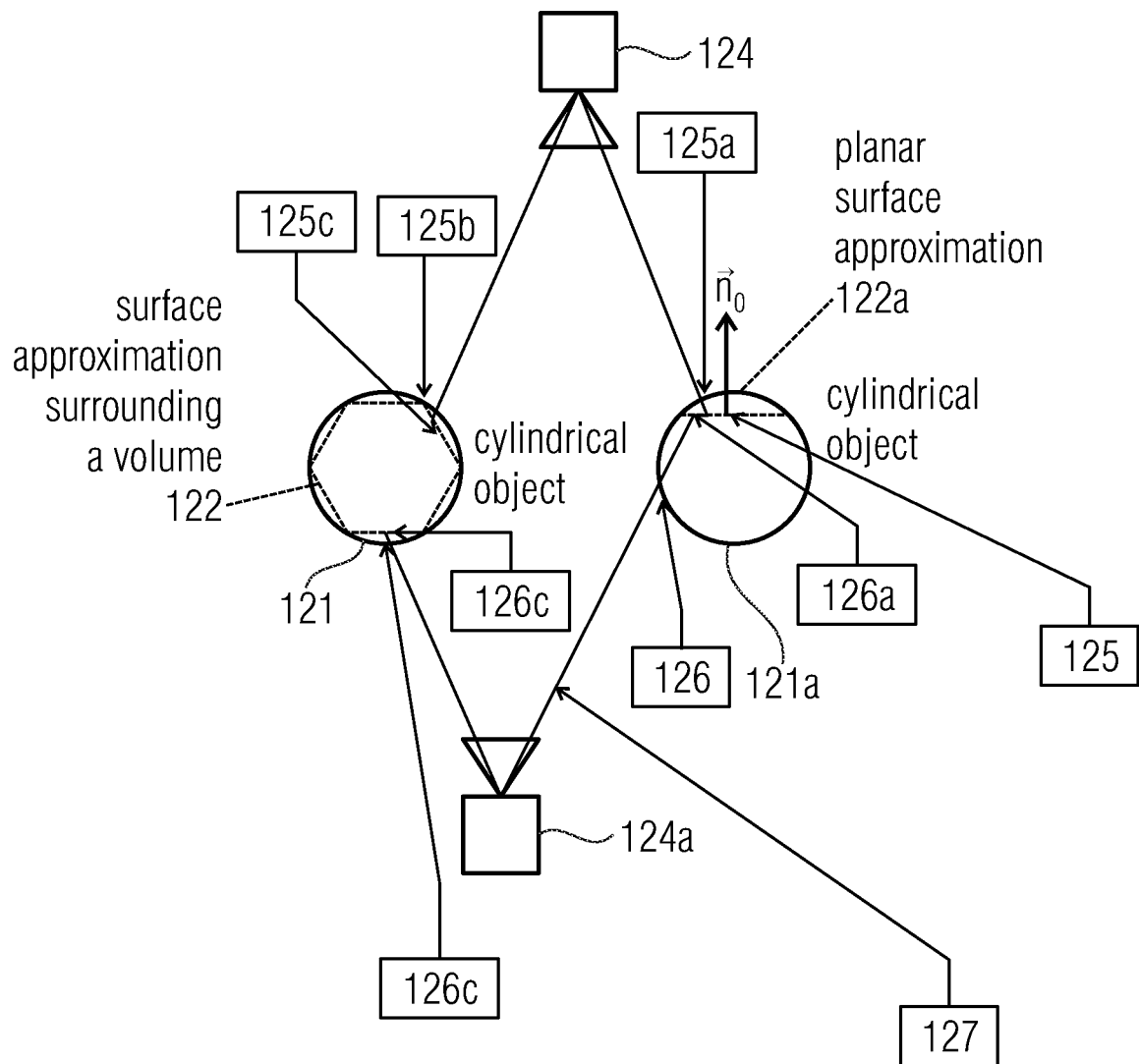

The explanation is based on FIG. 12*a*. For instance, point 125 of the surface approximation 122*a* seen by camera 124 is close to the real object element 125*a*. Consequently, the constraints of the surface approximation 122*a* will conclude in a correct candidate spatial position for the object element 125*a* relative to camera 124. This, however, is not true for object element 126 when considering camera 124*a*. In fact, the ray 127 intersects with the planar surface approximation in point 126*a*. According to concepts described above, point 126*a* could be considered as the approximate candidate spatial position for object element 126, captured by ray 127 (or at least, by restricting the range or interval of candidate spatial positions to a restricted range or interval of admissible candidate spatial positions constituted by the interval between point 126*a* and the position of the camera 124*a*, there would arise the risk, when subsequently analyzing the metrics (e.g., at step 37 or 353 or block 363), of arriving at the erroneous conclusion to localize point 126 in a different, incorrect position). But this conclusion is in principle not advantageous, because point 126*a* is very far from object element 126, such that it is likely that the surface approximation 122*a* results in a wrong constraint on the admissible candidate spatial positions for point 126. The underlying reason is that a planar surface approximation can mainly represent a constraint for "one side" of the object. We hence may distinguish, whether a ray (or another range of candidate spatial positions) hits the surface approximation at the most advantageous side. Fortunately, this can be achieved by assigning the normal vector $\vec{n}_0$ towards the object surface it is approximating (e.g., the top part of the surface of the cylinder 121*a*), hence obtaining a simple but effective technique. Then, in examples, the depth approximation is only taken into account when the dot product between the normal and the ray is negative (see Section 10).

By these definitions, it is possible to support both enclosing surface approximations, and planar surface approximations. While the first one is more versatile, the latter is easier to draw.

Figure 47:
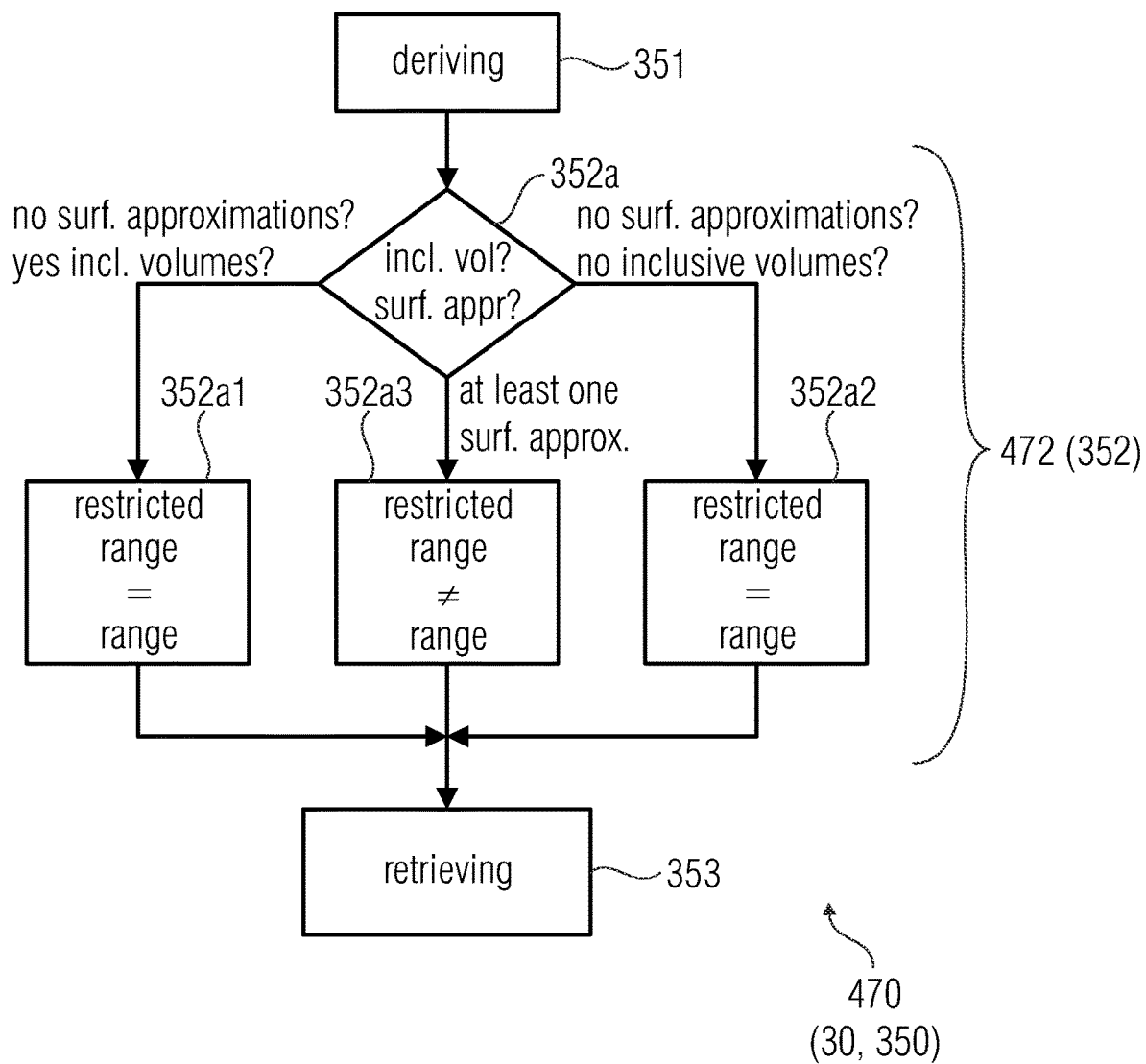

10 DEPTH MAP (LOCALIZATION) GENERATION AND/OR REFINEMENT BASED ON SURFACE APPROXIMATIONS AND INCLUSIVE VOLUMES 10.1 Example of Procedure Reference may now be made to FIG. 47, showing a method 470 which may be an example method 30 or 350 or an operation scheme for the system 360, for example. As may be seen deriving 351 and retrieving 353 may be as any of the examples above and/or below. Reference is made to step 472, which may implement step 352 or may be operated by block 362, for example.

Surface approximations and inclusive volumes and other kinds of constraints can be used to limit the possible depth values (or other forms of localizing the imaged object elements). By these means, they disambiguate the determination of correspondences and thus increase the resulting quality.

The admissible depth range for a pixel (or more in general an object element associated to a 2D representation element of a 2D image) may be determined by all surface approximations and all inclusive volumes that intersect the ray (or more in general the range or interval of candidate spatial positions) associated to this pixel. Depending on the scene and the surface approximations drawn by the user (step 352a), the following scenarios can occur:

1. A pixel ray does not intersect with any surface approximation or any inclusive volume (i.e., the restricted range of admissible candidate spatial position would result to be void). In this case (step 352a1), we consider all depth values possible for this pixel and no additional constraint on the depth estimation follows. In other words, we set the restricted range of admissible candidate spatial positions (362') to equal the range of admissible candidate spatial positions (361').

2. A pixel ray only intersects with inclusive volumes, but with no surface approximation (i.e., the restricted range of admissible candidate spatial position is only restricted by inclusive volumes, but not by surface approximations). In this case (352a2), one could imagine to only allow the corresponding object to be situated within one of the inclusive volumes. This, however, is critical, because inclusive volumes typically exceed the object boundaries that they are describing in order to avoid the need to precisely specify the shape of an object. Hence, only if all 3D objects are surrounded by some inclusive volume, such an approach would be fail-safe. In all the other cases, it is better to not impose any constraint on the depth estimation when no surface approximation is involved. This means that we consider all depth values possible for this pixel and no additional constraint on the depth estimation follows. In other words, we set the restricted range of admissible candidate spatial positions (362') to equal the range of admissible candidate spatial positions (361').

3. A pixel ray intersects with a surface approximation and one or more inclusive volumes (hence, the restricted range of admissible candidate spatial position may be restricted by inclusive volumes as well as by surface approximations). In this case (352a3), the admissible depth range (which is a proper subset of the original range) can be constraint as explained below.

4. A fourth possibility where a ray only intersects a surface approximation will be discussed in section 10.2 (but anyway leads to 352a3).

For every pixel impacted by the surface approximation, the system computes the possible locations of the 3D points (object elements) in the 3D space. To this end, consider the scenario depicted in FIG. 13. Inclusive volumes can intersect each other in examples. They even may intersect a surface approximation. Furthermore, the surface approximation can enclose a volume, but does not need to. FIG. 13 shows a camera 134 which acquires a 2D image. In FIG. 13, a ray 135 is depicted. Inclusive volumes 136a-136f are depicted (e.g., previously defined, e.g., manually by the user, e.g. by using the constraint definer 384). A surface approximation 132, contained within the inclusive volume 136d is also present. The surface approximation and the inclusive volumes provide constraints for restricting the range or interval of candidate spatial positions. For example, point 135' (in the ray 135) is outside the restricted range or interval of admissible candidate spatial positions 137, as point 135' is not close to a surface approximation or within any inclusive volume or 353 or block 363: point 135' will therefore not be analyzed when comparing the similarity metrics (e.g., at step 37). To the contrary, point 135" is inside the restricted range or interval of admissible candidate spatial positions 137, as point 135" is within the inclusive volume 136c: point 135" will therefore be analyzed when comparing the similarity metrics.

Basically, when restricting (e.g., steps 35, 36, 352) it is possible to sweep a path from a proximal position corresponding to the camera 134 towards a distal position (e.g., the path corresponding to the ray 135). Intersections (e.g., I3-I6, I9-I13) with inclusive volumes and/or exclusive volumes may define extremities of ranges or intervals of admissible candidate positions. According to examples, when a surface approximation is encountered (e.g., in correspondence to point I7), the restricting step may be stopped: therefore, even if further inclusive volumes 136e, 136f are present beyond the surface approximation 132, the further inclusive volumes 136e, 136f are excluded. This is due to the consideration that the camera is not capable of imaging anything in a more distal position than point I7: positions associated to points I8-I13 are visually covered by the object associated to the surface approximation 132 and cannot be physically imaged.

In addition or alternative, also negative positions (e.g., points I0, I1, I2) that can be theoretically associated to ray 135 may be excluded, as they cannot be physically acquired by the camera 134.

In order to define the procedure to compute the admissible depth value ranges, at least some of the following assumptions may apply:

Each surface approximation is surrounded by an inclusive volume. The admissible depth ranges related to a surface approximation are defined by the space between the surface approximation and the inclusive volume. Section 10.2 will present an approach in case a surface approximation is not surrounded by an inclusive volume.

Let N be the number of intersection points found with any surface approximation and any inclusive volume.

The intersection points are ordered according to their depth to the camera, starting with the most negative depth value first.

Let r be the vector describing the ray direction from the camera entrance pupil for the considered pixel.

Let depth_min be a global parameter that defines the minimum depth an object can have from the camera.

Let depth_max be a global parameter that defines the maximum depth an object can have from the camera (can be infinity)

The normal vectors of the inclusive volumes are pointing to the outside of the volume.

For planar surface approximations, the normal vector is pointing into the direction for which it can deliver a correct depth range constraint (see Section 9.4).

Then for each pixel, the following procedure can be used to compute the set of depth candidates.

```
1    // Start with an empty set of depths
2    DepthSet = EmptySet
3    lastDepth = −Infinity
4    numValidDepths = 0
5    foundSurfaceApproximation = False
6    for j=1:N
7      // Get normal of intersection point I(j)
8      n = getNormal(I(j))
9      // Get depth of intersection point I(j) for considered camera
10     depth = getDepth(I(j))
11     if (I(j) is surface approximation)
12       if (depth <= 0) or (n*r >= 0)
13         //Ignore, because either the surface is located on the wrong
14   side
15         //of the camera, or
16         //it represents different object pixels seen by the camera.
17         continue
18       else
19         if (numValidDepths > 0)
20           // The admissible depth range is computed from
21           // that inclusive volume, which
22           // - surrounds the considered surface approximation facade,
23   and
24           // - which is the most distant to the given surface
25   approximation
26           // Add interval [max(lastDepth,depth_min), depth]
27           // to allowed depth value set
28           DepthSet = DepthSet + [max(lastDepth,depth_min)), depth]
29           foundSurfaceApproximation = True
30           // Stop processing here, because no further depths are
31   allowed
32           break
33         else
34           // There is no corresponding inclusive volume
35           // for the current surface approximation
36           // Hence, lastDepth must be computed by other means.
37           // One example for the functionality of the function
38           // getLastDepth( ) is given in Section 10.2
39           DepthSet = DepthSet + [max(getLastDepth( ),min_depth), depth]
40         end if
41       end if
42     else
43       // I(j) defines an inclusive volume
44       if (n*r<0)
45         // ray is entering an inclusive volume
46         if (numValidDepths) == 0
47           // A new range of allowed depths is started
48           lastDepth = depth
49         end if
50         numValidDepths++
51       else
52         // ray is exiting an inclusive volume
53         assert(numValidDepths > 0)
54         numValidDepths - -
55         if (numValidDepths == 0) and (depth > 0)
56           // A range of allowed depths is terminated
57           DepthSet = DepthSet+ [max(lastDepth,depth_min)), depth]
58         end if
59       end if
60     end if
61   end for
62
63   if (N < 1)
64     // no intersections
65     DepthSet = [depth_min, depth_max)]
66   elif (not foundSurfaceApproximation)
67     // if we want to be conservative, we allow all depth.
68     // This is done by overwriting the depth set
69     // constructed from the inclusive volumes.
70     // If we want to be more aggressive, this line can be commented.
71     DepthSet = [debth_min, depth_max)]
72   end if
```

The procedure may be understood as finding the closest surface approximation for a given camera, since this defines the maximum possible distance for a 3D point. Moreover, it traverses all inclusive volumes to determine possible depth ranges. If there is no inclusive volume surrounding the surface approximation, the depth range may be computed by some other means (see for example Section 10.2).

By these means, we have hence a reduced search space for depth estimation (restricted range or interval of admissible spatial positions), which reduces ambiguity and hence increases quality of the computed depths. The actual depth search (e.g., at step 37 or 353) can be performed in different manners. Examples include the following approaches:

The depth that shows the minimum matching costs in the allowed depth range is chosen Before computing the minimum, the matching costs are weighted by the difference to the depth of the intersection of the pixel ray with the surface approximation.

In order to be more robust against occluders and not needing to enclose all objects by inclusive volumes, the user can provide an additional threshold C0 (see also Section 16.1), which may be analyzed at block 383 and/or 387, for example. In this case, all depths available before starting the interactive depth map improvement are kept when their confidence is larger than the provided threshold, and not modified based on the surface approximations. Such an approach involves that the depth map procedure outputs for each pixel a so-called confidence [17], which defines how certain the procedure is about the selected depth values. Low confidence values mean that the probability of a wrong depth value is huge, and hence the depth values are not reliable. By these means, occluders whose depths can be easily estimated can be detected automatically. Consequently, they do not need to be modelled explicitly.

Note 1: Instead of requesting the normals of the inclusive volumes to point outside (or inside), we can also count how often a surface of an inclusive volume has been intersected. For the first intersection, we enter the volume, for the second intersection, we leave it, for the third intersection, we re-enter it etc.

Note 2: In case the user decides to not place the surface approximation within the object, the search range in lines (25) and (35) may be extended as described in the following section.

10.2 Derivation of Admissible Depth Ranges for Surface Approximations not Being Surrounded by an Inclusive Volume The procedure defined in 10.1 may be used to compute an admissible depth range of a surface approximation from an inclusive volume surrounding it. This however is not an imperative constraint. Instead, it is also possible to compute the admissible depth ranges by other means, incorporated in the function get LastDepth( ) in Section 10.1. In the following, we exemplarily define such a functionality that can be implemented by get LastDepth( ).

To this end it may be possible to assume that the normal vectors of the surface approximation point towards the outside of the volume. This can be either manually ensured by the user, or automatic procedures can be applied in case the surface approximation represents a closed volume. Moreover, the user may define a tolerance value $t_0$ that may essentially define the possible distance of an object 3D point (object element) from the surface approximation in the 3D space.

Figure 14:
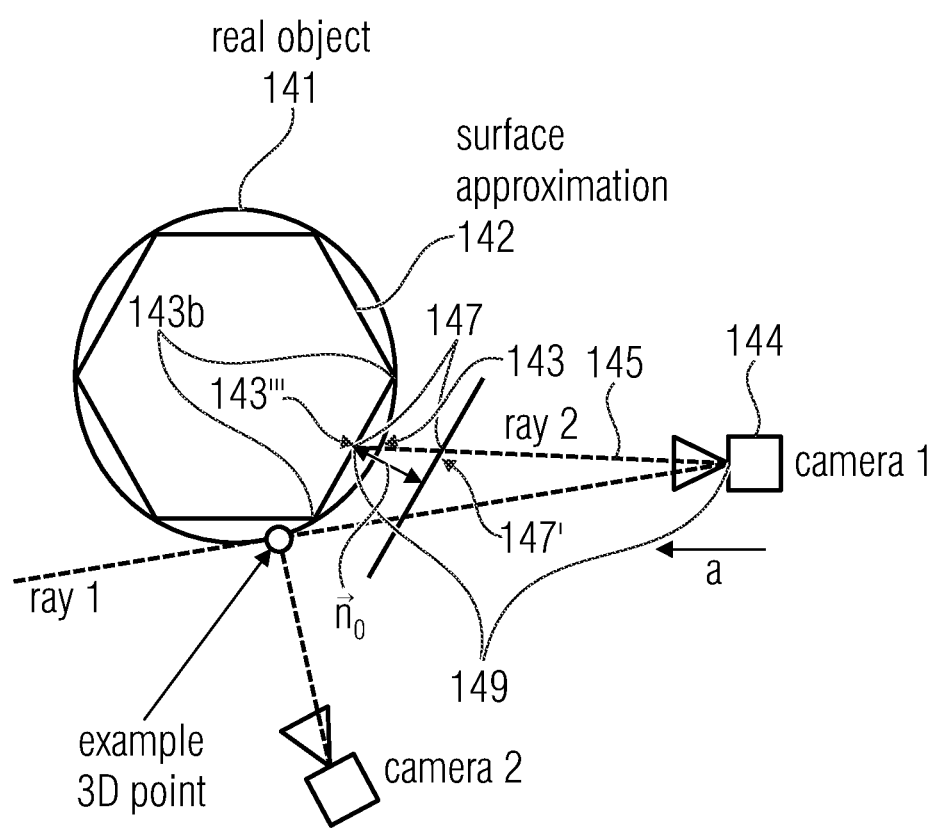

FIG. 14 shows a situation in which the object element 143 of a real object 141 is imaged by the camera 1 (144) through a ray 2 (145), to generate a pixel in a 2D image. For roughly describing the real object 141, a surface approximation 142 may be defined (e.g., by the user) so as to lie internally to the real object 141. The position of the object element 143 is to be determined. The intersection between the ray 2 (145) and the surface approximation 142 is indicated by 143''', and may be used, for example, as a first extremity of the restricted range or interval of admissible candidate positions for retrieving the position of the imaged object element 143 (which will be, subsequently, retrieved using the similarity metrics, e.g., at step 353 or 37). A second extremity of the restricted range or interval of admissible candidate positions is to be found. In this case, however, no inclusive volume has been selected (or created or defined) by a user.

It is notwithstanding possible to find other constraints so as to limit the range or interval of admissible candidate positions. This possibility may be embodied by the technique below, which keeps into consideration the normal $\vec{n}_0$ to the surface approximation 142 at the intersection 143'''. A value which keeps the normal $\vec{n}_0$ into account (e.g., scaled by a tolerance value $t_0$) may be used for determining the restricted range or interval of admissible candidate positions as interval 147 between the point 143''' (intersection between the surface approximation 142 and the ray 2, 145) and point 147'. In other words, in order to determine which pixel (or other 2D representation element) is influenced by the surface approximation 142, it is possible to intersect a ray 2 (145) (or another range or interval of candidate positions) defined by the pixel and the nodal point of the camera 1 (144) with the surface approximation 142. For every pixel whose associated ray intersects a surface approximation, it is possible to compute the possible locations of the 3D points in the 3D space. Those possible locations depend on the tolerance value (e.g., provided by the user).

Let $t_0$ be the tolerance value (e.g., provided by the user). It may specify the maximum admissible distance of the 3D point to be found (e.g., point 143) from a plane 143b that is defined by the intersection 143''' of the pixel ray 145 with the surface approximation 142 and the normal vector $\vec{n}_0$ of the surface approximation 142 in this intersection point 143'''. Since by definition the surface approximation 142 never exceeds the real object 141, and since the normal vector $\vec{n}_0$ of the surface approximation 142 is assumed to point towards the outside of the 3D object volume, a single positive number may be sufficient to specify this tolerance $t_0$ of the 3D point location 143 relative to the surface approximation 142. In principle, in some examples a secondary negative value can be provided by the user to indicate that the real object point 143 could also be situated behind the surface approximation 142. By these means, placement errors of the surface approximation in the 3D space can be compensated.

$\vec{n}_0$ is the normal vector of the surface approximation 142 in the point where the pixel ray 1 (145) intersects with the surface approximation 142. Moreover, let vector $\vec{\alpha}$ define the optical axis of the considered camera 144, pointing from the camera 144 to the scene (object 141). Then the tolerance value $t_0$ provided by the user can be translated into a depth tolerance for the given camera by computing:

$$\Delta d = t_0 \cdot \min\left\{ \frac{\|\vec{n}_0\| \cdot \|\vec{a}\|}{|\vec{a} \cdot \vec{n}_0|}, \frac{1}{\cos\phi_{max}} \right\}$$

$\|\vec{g}\|$ is the norm (or length) of a general vector $\vec{g}$, $|g|$ is the absolute value of a general scalar g, and $\vec{\alpha} \cdot \vec{n}_0$ is the scalar product between the vectors $\vec{\alpha}$ and $\vec{n}_0$ (the modulus of the scalar product may be $\|\vec{\alpha}\| \|\vec{n}_0\| \cos \phi$). The parameter $\phi_{max}$ (e.g., defined by the user) may (optionally) allow limiting the possible 3D point locations in case the angle $\phi$ between $\vec{n}_0$ and $\vec{\alpha}$ gets large.

Let D be the depth of the intersection point 143''' of the ray 145 with the surface approximation 142 relative to the camera coordinate system (e.g., depth D is the length of segment 149). Then the allowed depth values are $$[D-\Delta d, D] \quad (1)$$

$D-\Delta d$ may be the value returned by the function get LastDepth( ) in Section 10.1. Hence, $\Delta d$ may be the length of the restricted range of admissible candidate positions 147 (between points 143''' and 147').

For $\phi_{max}=0$, $\Delta d=t_0$. It is also possible to repeat this procedure iteratively. At the first iteration, the tolerance $t_0$ is chosen at a first, high value. Then, the process is performed at steps 35 and 36 or 352, and then at steps 37 or 353. Subsequently, a localization error is computed for at least some localized points (e.g., by block 383). If the localization error is over a predetermined threshold, a new iteration may be performed, in which a lower tolerance $t_0$ is chosen. The process may be repeated so as to arrive minimize the localization error.

The interval $[D-\Delta d, D]$ (indicated with 147 in FIG. 14) may represent the restricted range of admissible candidate positions among which, by using the similarity metrics, the object element 143 will be actually localized.

In general terms, there is defined a method for localizing, in a space containing at least one determined object 141, an object element 143 associated to a particular 2D representation element in a 2D image of the space, the method comprising:

deriving a range or interval of candidate spatial positions (e.g., 145) for the imaged space element on the basis of predefined positional relationships;

restricting the range or interval of candidate spatial positions to at least one restricted range or interval of admissible candidate spatial positions (147), wherein restricting includes defining at least one surface approximation (142) and one tolerance interval (147), so as to limit the at least one range or interval of candidate spatial positions to a restricted range or interval of candidate spatial positions defined by the tolerance interval (147), (wherein the at least one surface approximation may be, in examples, contained within the determined object), wherein the tolerance interval (147) has:

a distal extremity (143''') defined by the at least one surface approximation (142); and a proximal extremity (147') defined on the basis of a tolerance interval; and retrieving, among the admissible candidate spatial positions of the restricted range or interval (147), a most appropriate candidate spatial position (143) on the basis of similarity metrics.

Note: In case the user decides to not place surface approximations within an object, the allowed depth ranges in equation (1) may be extended as follows:

$$[D-\Delta d, D+\Delta d_2] \quad (2)$$

$\Delta d_2$ is computed in the same way than $\Delta d$, whereas the parameter $t_0$ is replaced by a second parameter $t_1$. This value $\Delta d_2$ can then also be used in the procedure described in section 10.1 in lines (25) and (35). In other words, line (25) is replaced by DepthSet=DepthSet+[max(lastDepth,depth_min)), depth+$\Delta d_2$], and line (35) is replaced by DepthSet=DepthSet+[max(getLastDepth( ),min_depth),depth+$\Delta d_2$]

10.3 User Assisted Depth Estimation

In the following, we describe a more detailed example how an interactive depth map estimation and improvement can be performed:

1. Identify erroneous depth regions of a precomputed depth map (34) (see Section 14)
2. Create a surface approximations for regions whose depth values are difficult to estimate
3. Either create manually or automatically an inclusive volume, or set threshold $t_0$ to infinity
4. Set a depth map confidence (reliability) threshold C0 and eliminate all depth values of the precomputed depth map (34) whose confidence value is smaller than C0 and which are impacted by a surface approximation (ray intersects the surface approximation). Set the threshold C0 in such a way that all erroneous depth values disappear for all regions covered by surface approximations. It is to be noted that C0 can be defined differently for every surface approximation (see for example Section 16.1).
5. For all surface approximations that have not been surrounded by an inclusive value, reduce threshold $t_0$ (which can be defined per surface approximation) until all depth values covered by the surface approximation are correct. If this is not possible, refine the surface approximation.
6. For all surface approximations that have been surrounded by an inclusive volume, identify still erroneous depth values and refine the surface approximation and the inclusive volumes appropriately.
7. Identify wrong depth values in occluders
8. Create inclusive volumes for them. If this is not sufficient, create additional surface approximations for them.
9. In case this leads to new depth errors in the 3D object covered by the surface approximations, refine the inclusive volumes to precise surface approximations for the occluders.

10.4 Multi-Camera Consistency

Previous sections have discussed how to restrict the admissible depth values for a certain pixel of a certain camera view. To this end, a ray intersection (e.g., 93''', 96''', 103', 103'', 143''', I0-I13, etc.) has determined the range which is relevant for the considered pixel of the considered camera. While such an approach can already significantly reduce the amount of admissible depth values, and hence increase the quality of the resulting depth map, this can be further improved by taking into account that correspondence determination not only relies on a single but on multiple cameras and that the depth maps of different cameras need to be consistent. In the following, we list methods how such a multi-camera analysis can further improve the depth map computation.

10.4.1 Multi-Camera Consistency Based on Pre-Computed Depth Values

FIG. 11 exemplifies a situation where a pre-computed depth for camera 2 (114) can simplify the depth computation for camera 1 (94). To this end, consider ray 2 (115) in FIG. 11. Based on the surface approximations and inclusive volumes only, it could represent both object 91 and object 111.

Now let's assume that the depth value for ray 114*b* has already been determined using one of the methods described above or below (or with another technique). E.g., after step 37 or 353, the obtained spatial position for ray 114b is point 93. It has to be noted that point 93 is not situated on the surface approximation 92, but on the real object 91, and has hence a certain distance to the surface approximation 92.

In a next step, we consider ray 2 (115) of camera 1 (94) and aim to compute its depth as well. Without the knowledge of the depth computed for ray 114b, there are two admissible restricted ranges of candidate spatial positions (112', 96a). Let's suppose that the automatic determination (e.g., at 37, 353, 363 . . . ) fails to derive the real object (91) which ray 2 (115) intersects and that a point in the range 112' is incorrectly obtained as most appropriate spatial position. This, however, means that the pixel or 2D representation element associated to ray 2 (115) has been assigned two different spatial positions, namely 93 (from ray 114b) and one position in 112' (from ray 115), because the position of the object element 93 (from ray 114b) and the position in 112' (from ray 115) are meant at being imaged by the same 2D representation element (incompatible positions). However, it is not possible that one 2D representation element is associated to different spatial positions. Consequently, it can be understood automatically (e.g., by the invalidator 383), that the depth computation failed (invalidated).

In order to solve this situation, different techniques are possible. One technique may comprise choosing for ray 2 (115) the closest spatial position 93. In other words, the automatically computed depth value for ray 2 (115) of camera 1 (94) may be overwritten with the spatial position for camera 2 (114), ray 114b.

Instead of searching the full depth range (115) when computing the spatial position for ray 2 (115), it is also possible to only search in the range between the camera 1 (94) and the point 93, when the spatial candidate position for ray 114b has been determined reliably before. By these means, significant amounts of computation time can be saved.

Figure 41:
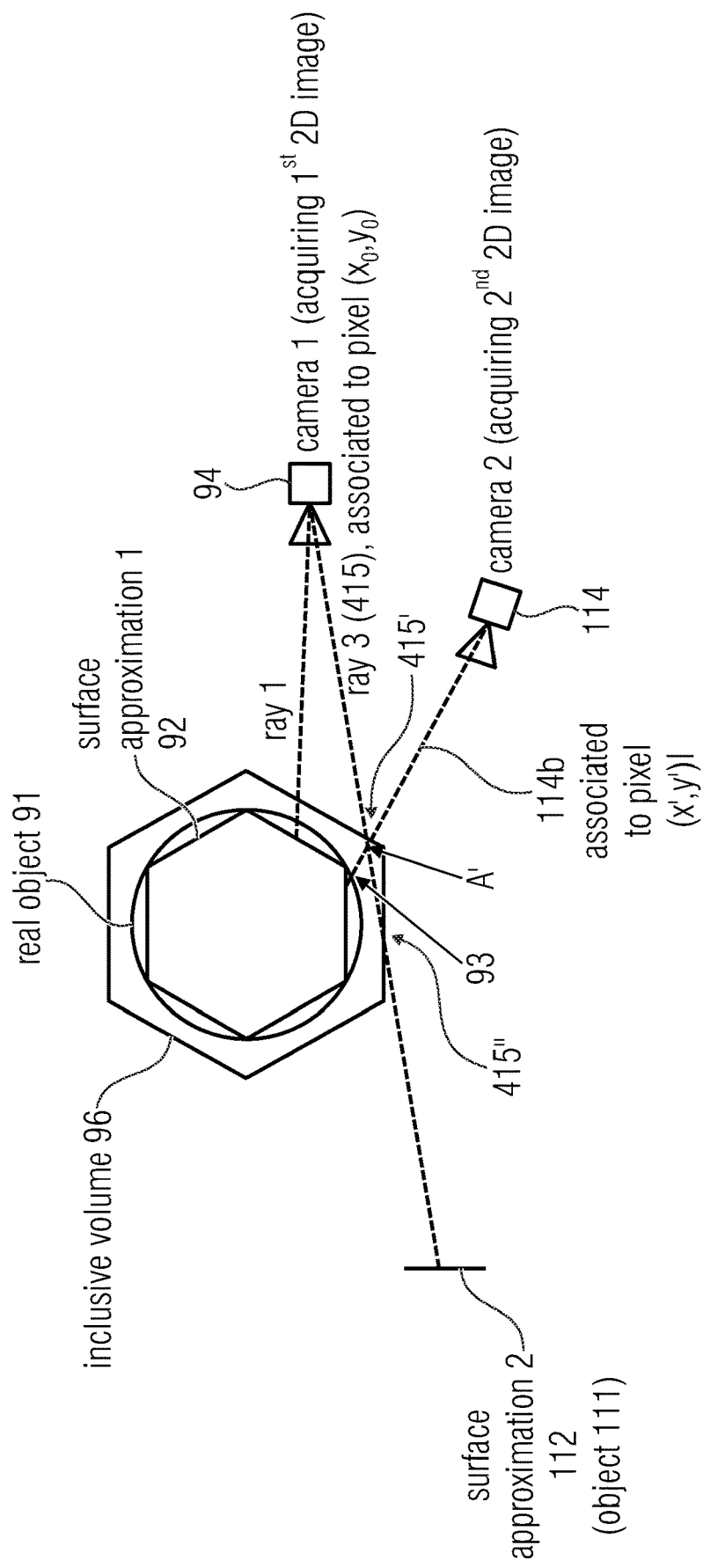
FIGS. 41 and 42 show examples.

A slightly different situation is shown in the FIG. 41. Let's assume that the depth for ray 114b has been computed to match with spatial candidate position 93. Let's now consider ray 3 (415). A priori, the situation is the same than for FIG. 11. Based on the inclusive volume 96 and the surface approximation 92 only, ray 3 (415) could either depict the real object 91, or the object 111. Hence, there arises the possibility (at step 37 or 353) of incorrectly localizing a pixel in spatial position A' (Ray 3 (415) does not intersect the real object 91 and hence depicts object 111).

Knowing however (e.g., on the basis of a previous processing, e.g., based on method 30 or 350 performed for ray 114 and the camera 2, 114) that ray 114b depicts object element 93 (and no element at spatial position A'), it is possible to automatically conclude that spatial position A' is not admissible for ray 3 (415), because an hypothetical element in spatial position A' would occlude object element 93 for camera 2. In other words, as soon as the depth value for spatial position A' seen by camera 2 (114b) is smaller than the depth value for point 93 by at least a certain predefined threshold, spatial position A' can be excluded for ray 3 (415) of camera 1 (94).

10.4.2 Multi-Camera Based Consistency Based on Admissible Spatial Candidate Positions The previous section has described how the knowledge of a depth value computed from one restricted range of spatial positions (e.g., 96b) can reduce the range of admissible candidate spatial positions for another camera (e.g., 94).

But even without the knowledge of such a computed depth value, the mere existence of inclusive volumes applied for one camera can limit the admissible candidate spatial positions for another camera.

Figure 42:
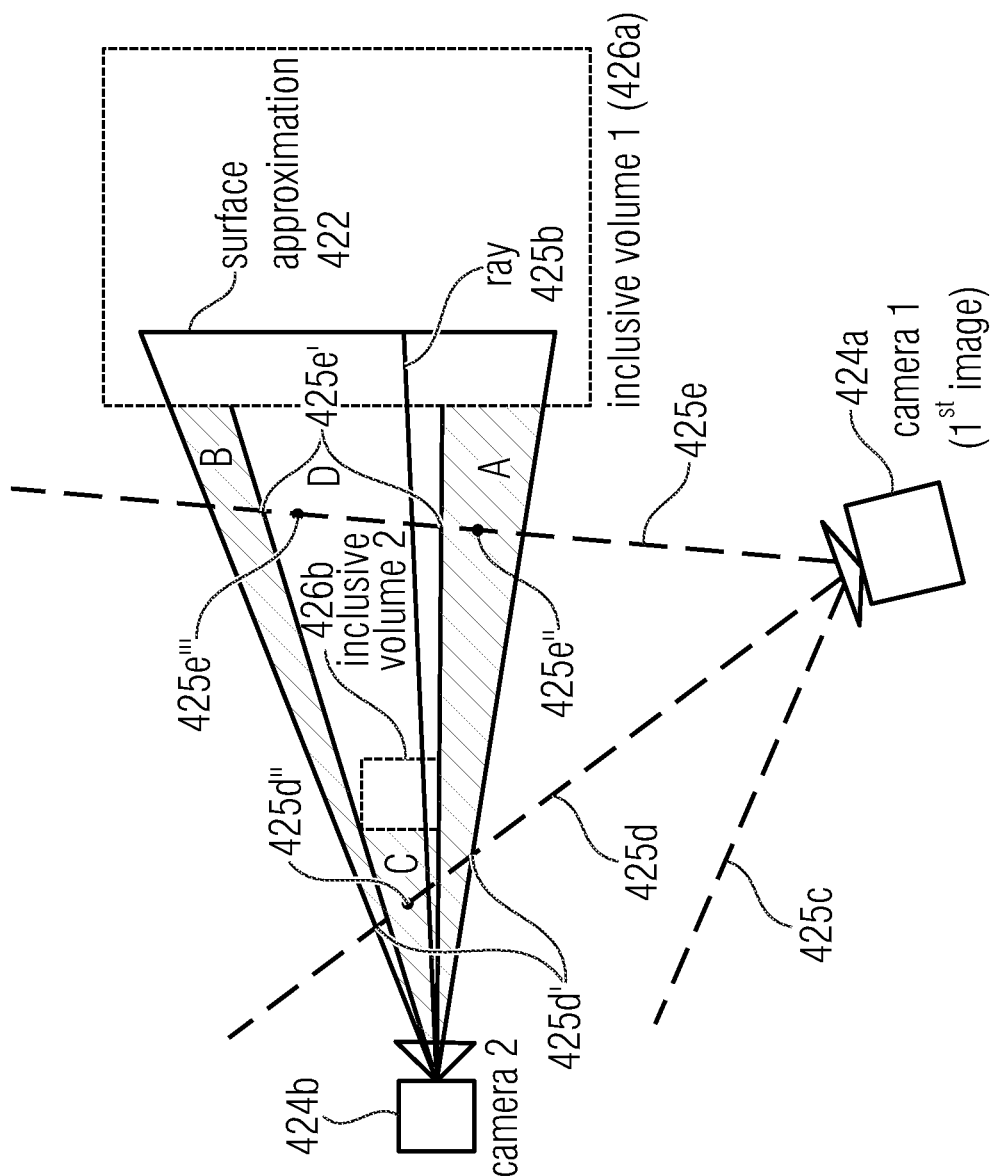

This is depicted in the FIG. 42. The existence of two inclusive volumes and a surface approximation may be taken into consideration in some examples. Consider now a ray 425b from camera 2 (424b) directed towards the surface approximation 422. Let's suppose that no reliable depth (or other kind of localization) for ray 425b has been computed beforehand. Then for every ray intersecting the surface approximation 422, admissible spatial candidate positions are located within the intersected inclusive volumes 426a and 426b.

This, however, implies that no object can be situated in the zones indicated by the letters A, B and C. The reason is the following:

If there were an object in one of the zones A, B or C, this object would be visible in camera 2 (424b). At the same time the object would be situated outside of the inclusive volume 1 (426a) and inclusive volume 2 (426b). This, by definition, is not allowed as we stated that no reliable depth could be computed and hence all objects need to be located within the inclusive volumes. Consequently, it is possible to automatically exclude any object in zones A, B and C. This fact can be subsequently exploited for any other camera such as camera 1 (424a). Basically, exclusive volumes (with inadmissible candidate positions to be excluded from the restricted range for camera 1) are obtained from zones A, B and C.

When an object is located in zone D (behind the inclusive volume 2 (426b), even though in foreground with respect to the inclusive volume 1 (426a)), this object does not cause any contradiction, because that object is not be visible in camera 2 (424b). Consequently, there is the possibility of an object for which the user has not drawn any inclusive volume. It is possible to define a strategy to permit the presence of objects from zone D. In particular, it is possible to carry out a method comprising, at the definition of a first proximal inclusive volume (426b) or surface approximation and a second distal inclusive volume or surface approximation (422, 426a), automatically defining:
  a first exclusive volume (C) between the first inclusive volume (426b) or surface approximation and the position of at least one camera (424b); and
  a second exclusive volume (A, B) between the second inclusive volume (426a) or surface approximation (422) and the position of at least one camera (424b), with the exclusion of a non-excluded region (volume D) between the first exclusive volume (C) and the second exclusive volume (A, B).

Basically, volume D, which for camera 2 (424b) is obstructed by the inclusive volume 426b, could actually host an object, and therefore cannot be really an exclusive volume. The area D may be formed by positions, between the inclusive volume 2 (426b) and the inclusive volume 1 (426a) or surface approximation 422, of ranges or intervals of candidate positions (e.g., rays) which are more distant to camera 2 (424b) than the inclusive volume 2 (426b) but closer than inclusive volume 1 (426a) or surface approximation 422. The positions of region D are therefore intermediate positions between constraints.

Figure 45:
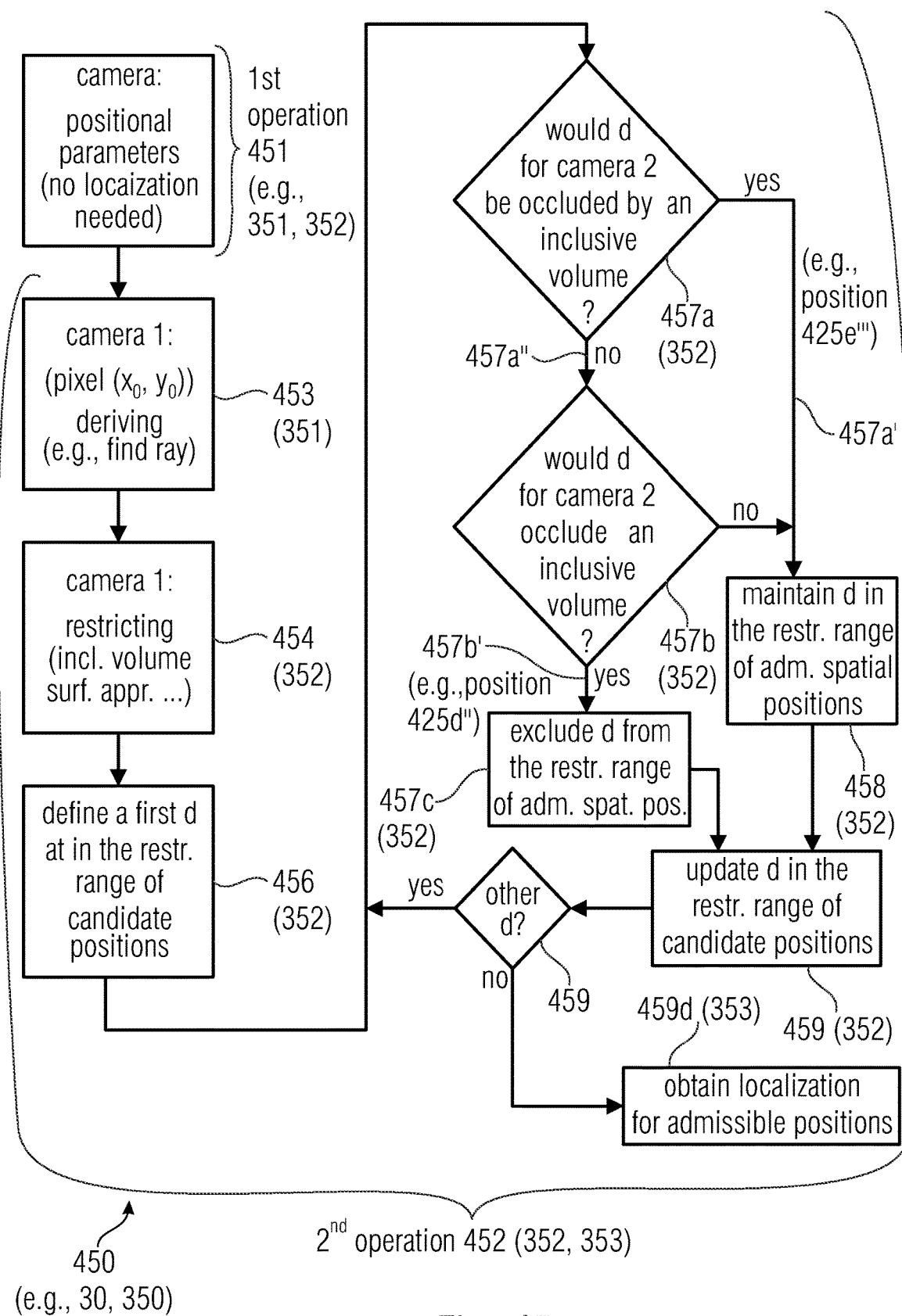

Another example may be provided by FIG. 45, showing method 450 which may be related, in some cases, to the example of FIG. 42.

The method 450 (which may be an example of one of the methods 30 and 350) may comprise a first operation (451), in which positional parameters associated to a second camera position (424b) are obtained (it is strictly not needed that an image is actually acquired). We note that inclusive volumes (e.g., 426a, 426b) may have been defined (e.g., by a user).

It is subsequently intended to perform the method (e.g., 30, 350) of obtaining localizations of object elements with a first 2D image, e.g., acquired by the camera 1 (424a), which is in predetermined positional relationship with camera 2 (424b). For this purpose, a second operation 452 (which may be understood as implementing method 350, for example) may be used. Therefore, the second operation 452 may encompass the steps 353 and 353, for example.

For each 2D representation element (e.g., pixel) of the first 2D image, a ray (range of candidate spatial positions) is defined. In FIG. 42, rays 425c, 425d, 425e are shown, each associated to a particular pixel (which may be identified, every time with (x0, y0)) of the 2D image acquired by the camera 1 (424a).

We see from FIG. 42 that positions in the segment 425d' (e.g., position 425d'') in ray 425d (those within the volumes A, B, C) would occlude the inclusive volumes 426a and 426b in the second 2D image. Therefore, even no constraint is predefined, it is notwithstanding possible to exclude the positions in 425d' from the restricted range of admissible spatial candidate.

We also see from FIG. 42 that positions in the segment 425e' (e.g., position 425e''') in ray 425e (those within the volume D) would be occluded by the inclusive volume 426b in the second 2D image. Therefore, even if at step different constraints (not shown in FIG. 42) are predefined, it is notwithstanding possible to include the positions in 425e' in the restricted range of admissible spatial candidate.

This may be obtained with the second operation 452 of method 450. At step 453 (which may implement step 351), for a generic pixel (x0, y0), a corresponding ray (which may be associated to any of rays 425c-425e) may be associated.

At step 454 (which may implement at least one substep of step 352) the ray is restricted to a restricted range or interval of admissible candidate spatial positions.

It is now searched a technique for, notwithstanding, further restricting the positions in the ray to subsequently only process (at 37 or 353) candidate positions which are admissible. Therefore, it is possible to exclude spatial positions from the restricted range of admissible spatial positions by taking into consideration the inclusive volumes 426a and 426b already provided (e.g., by the user) for the second camera position.

The cycle between steps 456 and 459 (embodying step 352, for example) may therefore be iterated. Here, for each ray 425c-425e, a candidate spatial position (here indicated as a depth d) is swept from a proximal position to camera 1 (424a) towards a distal position (e.g., infinite).

At step 456, a first candidate d, in the admissible range or interval of admissible spatial candidate positions, is chosen.

At step 457a, it is analysed, on the basis of the positional parameters obtained at the first operation (451), whether the candidate spatial position d (associated, for example to a candidate spatial position, such as position 425d'', in ray 425d, or 425e''' in ray 425e) would be occluded by at least one inclusive volume (426a) in the second 2D image, so as, in case of determination of possible occlusion (457a'). For example, for camera 1 (424b), the position 425e''' is behind the inclusive volume 426b (in other terms, a ray exiting from camera 2(424b) intersects the inclusive volume 426b before intersecting the position 425e'''; or, for a ray exiting from camera 2(424b) and associated to position 425e''', the inclusive volume 426b is between camera 2 (424b) and the 425e'''). In this case (transition 457a'), at step 458 a position such as the position 425e''' (or the associated depth d) is maintained in the restricted range of admissible candidate spatial positions (the similarity metrics will therefore be actually evaluated at retrieving step 353 or 459d for the position 425e''').

If at step 457a it is recognized that, on the basis of the positional parameters obtained at the first operation (451), the at least one candidate spatial position d cannot be occluded by at least one inclusive volume (transition 457a''), it is analysed (at step 457b) whether, on the basis of the positional parameters obtained at the first operation (451), the at least one candidate spatial position (depth d) would occlude at least one inclusive volume (426b) in the second 2D image. This may occur for the candidate spatial position 425d'', which (in case of being subsequently recognized, at step 37 or 353, as the most advantageous candidate spatial position) would occlude the inclusive volume 426b (in other terms, a ray exiting from camera 2 (424b) intersects the inclusive volume 426b after intersecting the position 425d''; or, for a ray exiting from camera 2(424b) and associated to position 425d'', the candidate position 425d'' is between the position of camera 2 (424b) and the inclusive volume 426b). In this case, with transition 457b' and step 457c, the candidate position (e.g., 425d'') is excluded from the restricted range of admissible spatial positions, and the similarity metrics will subsequently (at step 353 or 459d) not be evaluated.

At step 459, a new candidate position is updated (e.g., a new d, more distal with respect to, even if close to, the previous one, is chosen) and a new iteration starts.

When it is recognized (at 459) that there are no possible candidate positions (e.g. d reaches a maximum threshold which approximates "infinite" or reaches a surface approximation) in the restricted range, then the final localization is performed at 458d (which may be understood as embodying step 353). Here, only those candidate positions are taken into account, for which the similarity metrics have been measured in 458.

10.4.3 Procedure for Multi-Camera Consistency Aware Depth Computation

The following procedure describes in more detail, how multi-camera consistency can be used when computing depth values for a given camera. In the following, without loss of generality, this camera is called "camera 1".

```
1  // Initialize all matching costs to infinity
2  matchingCosts(: , : , :) = infinity
3  Compute the restricted range of admissible depth candidates
4  (candidate spatial positions) by considering all surface
5  approximations and inclusive volumes from the perspective of camera
6  1
7  // Iterate over all these admissible depth candidates
8  for all admissible depth candidates d of considered pixel (x0, y0)
9  in camera 1 (94, 424a) in increasing order
```

```
10    // Please note that the depth d is expressed relative to the
11 coordinate system
12    // of camera 1.
13    // It is very important that in each iteration,
14    // the value for the depth candidate d gets larger.
15    // Otherwise the described procedure would not work.
16    // Iterate over all camera pairs
17    // It is important that the iteration over the cameras is the
18 inner loop.
19    for all other cameras c (424b, 114) taken into account for depth
20 computation
21        // Compute the pixel (x',y') in camera c, that matches to pixel
22 (x0,y0)
23        // in case the object visible in (x0,y0) would have depth d
24        // Compute also the corresponding depth d' relative to the
25        // coordinate system of camera c
26        // The function correspondingPixel exploits the
27        // predefined positional relationships
28        // The value "1" defines camera 1
29        (x' ,y' ,d' )=correspondingPixel(x0,y0,1,c,d)
30        //Check whether pixel (x' ,y' ) in camera c has already an
31 assigned depth
32        //whose confidence is large enough such that it is considered to
33 be reliable
34        if exist depth D' for pixel (x',y' ) in camera c
35            if (d' < D' − ΔD$_1$)
36                // this is the second case described in section 10.4.1 (Fig.
37 41)
38                // ΔD$_1$ is a predefined threshold by which the two depth
39 values
40                // need to deviate to consider to occlusion too significant,
41                // and hence to forbid depth candidate d for camera 1
42                // Depth candidate d is not possible in camera 1
43                matchingCosts(x0,y0,d) = infinity
44            else
45                // Compute actual matching costs
46                // between pixel (x0,y0) in camera 1
47                // and pixel (x' ,y' ) in camera c
48                // and assign them as matching costs for camera 1
49                matchingCosts(x0,y0,d) =
50 computeMatchingCosts(x0,y0,1,x' ,y' ,c)
51            end if
52            if (d' <= D' + ΔD$_2$) and (d' >= D' − ΔD$_1$)
53                // This is the first case described in section 10.4.1 (Fig.
54 11)
55                // The points defined by depth d' and D' are considered to
56 be the same
57                // in camera c
58                // ΔD$_2$ is a predefined threshold
59                // Hence, all larger values for d are not allowed.
60                // Stop iterating over further depth candidates by exiting
61 all for loops
62                break all
63            end if
64        else
65            // no reliable depth for pixel (x' ,y' ) in camera c existing
66            // we can only consider the inclusive volumes and
67            // surface approximations.
68            if depth d' admissible for pixel (x' ,y' ) in camera c
69                // the point identified by (x' ,y' ,d' ) is contained in an
70                //inclusive volume or within the tolerance range of a
71 surface
72                // approximation.
73                // Compute actual matching costs between pixel (x0,y0) and
74 (x,y)
75                // for camera 1
76                matchingCosts(x0,y0,d) =
77 computeMatchingCosts(x0,y0,1,x' ,y' ,c)
78            elif d' < smallest admissible depth for pixel (x' ,y' ) in
79 camera c
80                // This is the case described in section 10.4.2.
81                // The admissible depth values are defined by the inclusive
82 volumes
83                // and/or the tolerance ranges of the surface
84 approximations.
85                // Depth candidate not admissible for camera 1
86                matchingCosts(x0,y0,d) = infinity
87            else
```

-continued

```
88         // Could be an occlusion that has not been indicated by the
89  user
90         //Conservative approach :
91         matchingCosts(x0,y0,d) = computeMatchingCosts(x0,y0,x,y)
92         // More aggressive approach :
93         // matchingCosts(x0,y0,d) = infinity
94       end if
95     end if
96   end for
97 end for
```

In order to be able to handle all concepts elaborated in sections 10.4.1 and 10.4.2, the procedure iterates over all depth candidates d in increasing order. By these means it is possible to stop accepting further depth candidates as soon as the first situation described in section 10.4.1. is encountered, where an already located object would occlude the object of the considered camera 1 (94).

Next the procedure may essentially translate the candidate spatial position defined by the depth candidate d for camera 1 (94, 424*a*) into a depth candidate d' for a second camera c. Moreover, it computes the pixel coordinates (x', y') in which the candidate spatial position would be visible in the second camera c (camera c may be the camera acquiring 2D image for which a localization has already been performed; examples of camera c may be, for example, camera 2 (114) in FIG. 11 and camera 2 (424*b*) in FIG. 42).

Based on the available pixel coordinates (x', y') for camera c, it is then checked whether previously a depth candidate D' has been computed for camera c (424*b*, 114) and pixel (x', y') which is reliable enough to impact the depth computation for camera 1 (94, 424*a*). Different heuristics are possible to this end. In a simplest case, the depth candidate D' may only be accepted when its confidence or reliability value is large enough, or when its unreliability value is small enough. It may however also been checked, in how far the number of depth candidates to be checked for pixel (x', y') in camera c is smaller than the number of depth candidates for pixel (x0, y0) in camera 1 (94, 424*a*). By these means, depth candidate D' for (x', y') may be considered as more reliable than a depth candidate d for (x0, y0) in camera 1 (94, 424*a*). Consequently, the procedure may allow that the depth candidate D' for pixel (x', y') impacts depth candidate selection for pixel (x0, y0).

Based on the decision, whether there is a reliable depth candidate D' or not, the procedure then either considers the scenarios discussed in section 10.4.1 or 10.4.2. Lines (28)-(34) consider the case, where the new object for camera 1 (94, 424*a*) defined by pixel (x0, y0) and depth d would occlude the already existing object defined for camera c (424*b*, 114) by (x', y') and depth D'. Since this is not allowed, the depth candidate is rejected. Lines (42)-(50), on the other hand, consider the situation where the new object in camera 1 defined by pixel (x0, y0) and depth d would be occluded by an already known object in camera 2 (424*b*, 114). Again this is not allowed, and hence all larger depth candidates are rejected.

Lines 55*ff* finally are related to section 10.4.2.

It has to be noted that in the procedure above retrieving and restricting are performed in an interleaved fashion. In particular, after a first restricting step in lines (3)-(5), the remaining lines perform an additional restriction in lines 34, 49, 67 and compute the similarity metrics in lines 40, 61, 71. It has to be understood that this does not impact the claimed subject. In other words, whether restricting and interleaving is computed in a sequential, an interleaved or even a parallel matter will lead to the same outcome, and are hence subject to the claimed matter.

Nevertheless, for sake of clarity, the following algorithm shows the same concept performing only the additional restricting step.

```
1  // Compute the restricted range of candidate spatial positions
2  // by considering all inclusive and exclusive volumes
3  // as well as all surface approximations from the perspective of
4  // camera 1
5  isDepthCandidateAllowed = getAllowedDepthCandidates( )
6  noFurtherDepthAllowed = false
7  // Iterate over all these admissible depth candidates
8  for all depth candidates d of considered pixel (x0, y0) in camera 1
9  (94, 424a) in increasing order
10    if noFurtherDepthAllowed == true
11      isDepthCandidateAllowed(d) = false
12    end if
13    If isDepthCandidateAllowed(d) == false
14      //Depth candidate already exluded
15      continue
16    end if
17    // Iterate over all camera pairs
18    // It is important that the iteration over the cameras is the
19  inner loop.
20    for all other cameras c (424b, 114) taken into account for depth
21  computation
22      // Compute the pixel (x' ,y' ) in camera c, that matches to pixel
23  (x0,y0)
24      // in case the object visible in (x0,y0) would have depth d
25      // Compute also the corresponding depth d' relative to the
26      // coordinate system of camera c
27      (x' ,y' ,d' )=correspondingPixel(x0,y0,1,c,d)
28      //Check whether pixel (x' ,y' ) in camera c has already an
29  assigned depth
30      //whose confidence is large enough such that it is considered to
31  be reliable
32      if exist depth D' for pixel (x' ,y' ) in camera c
33        if (d' < D' − ΔD₁)
34          // this is the second case described in section 10.4.1 (Fig.
35  41)
36          // ΔD₁ is a predefined threshold by which the two depth
37  values
38          // need to deviate to consider to occlusion too significant,
39          // and hence to forbid depth candidate d for camera 1
40          // Depth candidate d is not possible in camera 1
41          isDepthCandidateAllowed(d)=false
42        end if
43        if (d' <= D' + ΔD₂) and (d' >= D' − ΔD₁)
44          // This is the first case described in section 10.4.1 (Fig.
45  11)
46          // The points defined by depth d' and D' are considered to
47  be the same
48          // in camera c
49          // ΔD₂ is a predefined threshold
50          // Hence, all larger values for d are not allowed.
51          // Stop iterating over further depth candidates by exiting
52  all for loops
53          noFurtherDepthAllowed=true
54        end if
55        else
```

```
56        // no reliable depth for pixel (x' ,y' ) in camera c existing
57        // we can only consider the inclusive volumes and
58        // surface approximations.
59        if d' < smallest admissible depth for pixel (x' ,y' ) in camera
60   c
61             // This is the case described in section 10.4.2.
62             // The admissible depth values are defined by the inclusive
63   volumes
64             // and/or the tolerance ranges of the surface
65   approximations.
66             //Depth candidate not admissible for camera 1
67             isDepthCandidateAllowed(d)=false
68        end if
69      end if
70    end for
71 end for
```

Figure 43:
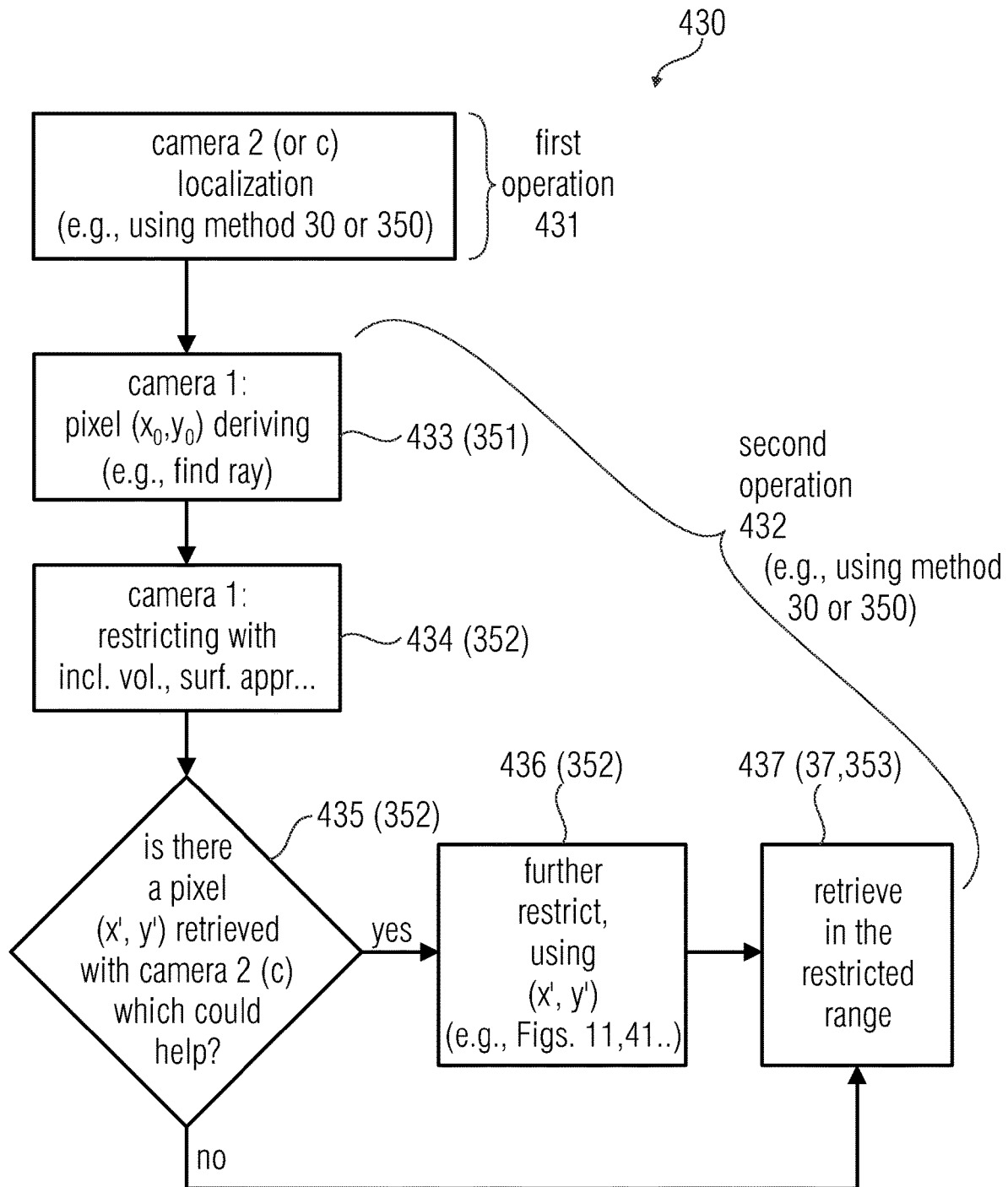
FIGS. 43-47 show methods according to examples.

Another example is provided by FIG. 43 (reference can be also made to FIGS. 11 and 41). FIG. 43 shows a method 430 including:

as a first operation (431), localizing (e.g., with any method, including method 30 or 350) a plurality of 2D representation elements for a second 2D image (e.g., acquired by camera 2 (114) in FIG. 11 or 41, camera c in the code above . . . ), as a second, subsequent operation (432):
performing, for a first 2D image (e.g., acquired by camera 1 (94) in FIGS. 11 and 41, or "camera 1" in the code above) a deriving step (351, 433) and a restricting step (352, 434) for a 2D representation element (e.g., a pixel associate to ray 115 or 415), so as to obtain at least one restricted range or interval of admissible candidate spatial positions (FIG. 11: segments 96a and 112'; FIG. 41: the segment having as extremities the intersections of ray 3 (415) with the inclusive volume 96);
finding (352, 435), among the previously localized 2D representation elements of the second 2D image, an element ((x', y') in the code) which corresponds to a candidate spatial position (e.g., (x0, y0) in the code, and the positions in the restricted ranges 96a, 112', etc.) of the first determined 2D representation element;
further restricting (352, 436) the restricted range or interval of admissible candidate spatial positions (in FIG. 11: by excluding the segment 112' and/or by stopping at the position 93; in FIG. 41: by further excluding the position A' from the restricted range or interval of admissible candidate spatial positions);
retrieving (353, 437), within the further restricted range or interval of admissible candidate spatial positions, a most appropriate candidate spatial position for the determined 2D representation element (e.g., (x0, y0) in the code) of a first determined 2D image.

With reference to the example of FIG. 11: After having performed, as the first operation (431), the localizations for the second 2D image acquired by camera 2 (114) and having retrieved, among others, the correct position of the object element 93 (associated to a particular pixel (x', y') and ray 114b), it is now time to perform the second operation (432) for localizing positions associated to pixels of a first determined 2D image acquired by the camera 1 (94). Ray 2 (115) (associated to a pixel (x0, y0)) is examined. At first, a deriving step (351, 433) and a restricting step (352, 434) are performed, to arrive at restricted ranges or intervals of candidate spatial positions formed by segments 96a and 112'. Several depths d are swept (e.g., form the proximal extremity 96' the distal extremity 96b, with the intention of subsequently sweep the interval 112'). However, when arriving at the position of the object element 93, at step 435 it is searched whether a pixel from the second 2D image is associated to position of element 93. The pixel (x', y'), from the second 2D image (acquired from camera 2 (114)) is found to correspond to the position of object 93. As the pixel (x', y') is found to correspond to position 93 (e.g., within a predetermined tolerance threshold), it is concluded that also pixel (x0, y0) of the first image (camera 1 (94)) is associated to the same position (93). Therefore, at 436, the restricted range or interval of admissible spatial positions is actually further restricted (as, with respect to the camera 1 (94), the positions more distal than the positions of object element 93 are excluded from the restricted range or interval of admissible spatial positions), and at 437 the position of the object element 93 may be associated to the pixel (x0, y0) of the second image after a corresponding retrieving step.

With reference to the example of FIG. 41: After having performed, as the first operation (431), the localizations for the second 2D image acquired by camera 2 (114) and having retrieved, among others, the correct position of the object element 93 (associated to a particular pixel (x', y') and ray 114b, it is now time, at the second operation (436), to find the positions for camera 1. The at least one restricted range or interval of candidate spatial positions is restricted (352, 434) to the segment between the intersections of ray 3 (415) with the inclusive volume 96. For pixel (x0, y0) associated to ray 3 (415), several depths d are taken into consideration, e.g., by sweeping from a proximal extremity 415' towards a distal extremity 415". When the depth d is associated to position A', at step 435 it is searched whether a pixel (x', y') is associated to position A'. The pixel (x', y'), from the second 2D image (acquired from camera 2 (114)) is found to correspond to the position A'. However, the pixel (x', y') has already been associated, at the first operation 431, to position 93, which is more distant than position A' in the range of candidate spatial position (ray 114b) associated to the pixel (x', y'). Therefore, at step 436 (e.g., 352), it may be automatically understood that for pixel (x0, y0) (associated to ray 3 (415)) the position A' is not admissible. Hence, at step 436, the position A' is excluded from the restricted range of admissible candidate spatial positions and will not be computed in step 437 (e.g., 37, 353).

11. LIMITATION OF THE ADMISSIBLE SURFACE NORMAL FOR DEPTH ESTIMATION

While Section 10 has been devoted to the limitation of the admissible depth values for a given pixel, surface approximations also allow to impose constraints on the surface normal. Such a constraint can be used in addition to the range limitations discussed in Section 10, which is the advantageous approach. However, imposing constraints on the normals is also possible without restricting the possible depth values.

11.1 Problem Formulation

Computation of depths involves the computation of some matching costs and/or similarity metrics for different depth candidates (e.g., at step 37). However, because of noise in the image, it is not sufficient to consider the matching costs for a single pixel, but for a whole region situated around a pixel of interest. This region is also called integration window, because to compute the similarity metrics for the pixel of interest, the matching costs for all pixels situated within this region or integration window are aggregated or accumulated. In many cases it is assumed that all those pixels in a region have the same depth when computing the aggregated matching costs.

Figure 15:
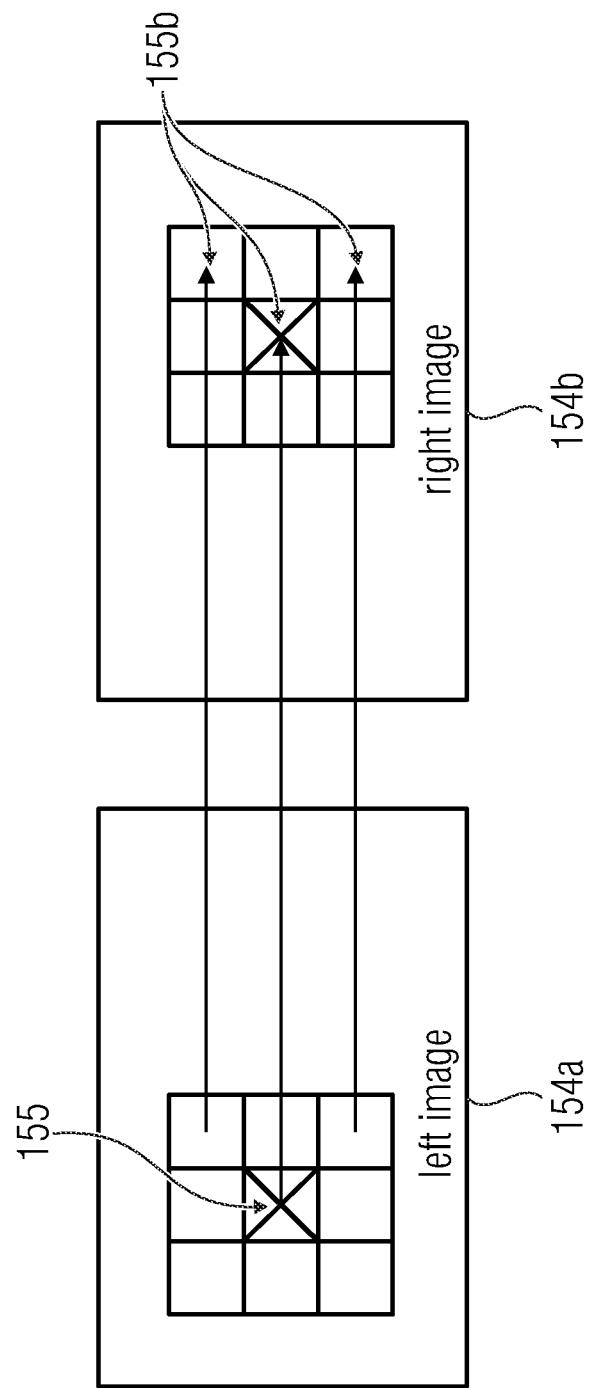

FIG. 15 exemplifies this approach assuming that the depth for the crossed pixel 155 in the left image 154a shall be computed. To this end, its pixel value is compared with each possible correspondence candidate in the right image 154b. Comparing a single pixel value however leads to very noisy depth maps, because the pixel color is impacted by all kinds of noise sources. As remedy, it is typically assumed that the neighboring pixels 155b will have a similar depth. Consequently, each neighboring pixel in the left image is compared to the corresponding neighboring pixel in the right image. Then the matching costs of all pixels are aggregated (summed up), and then assigned as matching costs for the crossed pixel in the left image. The number of pixels whose matching costs are aggregated is defined by the size of the aggregation window. Such an approach delivers good results if the surfaces of the objects in the scene are approximately fronto-parallel to the camera. If not, then the assumption that all neighboring pixels have approximately the same depth is simply not accurate and can cause a pollution of the matching cost minimum: To achieve the minimum matching costs, it is involved to determine corresponding pixels based on their real depth value. Otherwise a pixel is compared with its wrong counter-part, increasing the resulting matching costs. The latter increases the risk that a wrong minimum will be selected for the depth computation.

Figure 16:
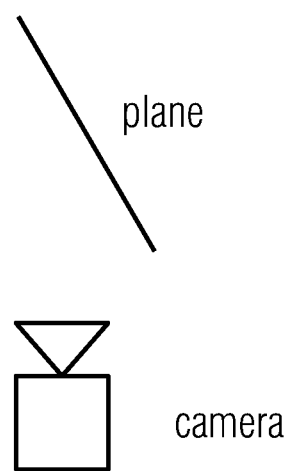

The situation can be improved by approximating the surface of an object by a plane whose normal can have an arbitrary orientation [9]. This is particularly beneficial for surfaces that are strongly slanted relative to the optical axis of the camera as depicted in FIG. 16. In such a case, it is possible to determine for each pixel in the left aggregation window (e.g., 154a) a more accurate counterpart in the right image (e.g., 154b) by taking the position and the normal into account. In other words, given a depth candidate (or other candidate localization, e.g., as processed in step 37, 353, etc. and/or by block 363) for the pixel (or other 2D representation element) whose depth value shall be computed and an associated normal vector, it is possible to compute for all other pixels in the integration window, where they would be located in 3D space, supposing the assumed surface plane. Having this 3D location for every pixel then allows to compute the correct correspondence in the right image. While on the one hand, such an approach decreases the minimum achievable matching costs and thus leads to superior depth map quality, on the other hand it tremendously increases the search space for each pixel. This may involve applying a technique in order to avoid searching all possible normal and depth value combinations. Instead, selected depth and normal combinations are evaluated concerning their matching costs. From all the evaluated depth and normal combinations, the one leading to minimum local or global matching cost is selected as depth value and surface normal for a given pixel. Such heuristics might however fail, leading to wrong depth values.

11.2 Normal Aware Depth Estimation Using User Provided Constraints

A method to overcome the difficulties described in Section 11.1 is to reduce the search space by using the information given through the surface approximations drawn by the user. In more detail, the normal of the surface approximation can be considered as an estimate for the normal of the object surface. Consequently, instead of investigating all possible normal vectors, only the normal vectors being close to this normal estimate need to be investigated. As a consequence, the problem of correspondence determination is disambiguated and leads to a superior depth map quality.

In order to achieve these benefits, we perform the following steps:

1. The user draws (or otherwise defines or select) a rough approximation of a surface. This surface approximation can for instance be composed of meshes to be compatible with existing 3D graphics software. By these means, every point on the surface approximation has an associated normal vector. In case the surface approximation is a mesh, the normal vector can for instance be simply the normal vector of the corresponding triangle of the mesh. Since the normal vectors essentially define the orientation of a plane, the normal vectors $\vec{n}$ and $-\vec{n}$ are equivalent. Hence, the orientation of the normal vector can be defined based on some other constraints as for instance imposed in Sections 9.4 and 10.

2. The user specifies (or otherwise inputs) a tolerance by which the actual normal vectors of the real object surface can deviate from the normal estimate derived from the surface approximation. This tolerance may be indicated by means of a maximum inclination angle $\theta_{max}$ relative to a coordinate system where the normal vector represents the z-axis (depth axis). Moreover, the tolerance angle can be different for surface approximations and inclusive volumes.

3. For every pixel in a camera view for which the depth shall be estimated, a ray is intersected with all surface approximations and inclusive volumes provided by the user. In case such an intersection exists, the normal vector of this surface approximation or inclusive volume at the intersection point is considered as an estimate for the normal vector of the surface object.

4. Optionally, it is possible to limit the range of admissible depth values as described in Sections 10 and 13.

5. The automatic depth estimation procedure then considers the normal estimate, e.g. as explained in Section 11.3.

In order to avoid imposing wrong normals, the surface approximation could be constrained as only being situated inside the object and not exceed it. Competing constraints can be mitigated by defining inclusive volumes in the same way as discussed in Section 9.3. In case the ray intersects both a surface approximation and an inclusive volume, multiple normal candidates can be taken into account.

This can be seen by means of ray 2 (115) in FIG. 11. As explained in previous sections, ray 2 may picture an object element of object 111 or an object element of object 91. For the two possibilities, the expected normal vectors are quite different. In case the object element would belong to object 111, the normal vector would be orthogonal to the surface approximation 112. In case the object element would belong to object 91, the normal vector would be orthogonal to the sphere (91) surface in point 93. Consequently, for each restricted range of candidate spatial positions defined by a corresponding inclusive volume, a different normal vector $\vec{n}_0$ can be selected and taken into account.

For planar surface approximations (see Section 9.4), the constraint on the normal vector should only be applied if the dot product with the intersecting ray is negative.

11.3 Usage of Normal Information Cost Aggregation with Plane Hypothesis

It is here explained a method for localizing an object element by using similarity metrics. In this method, the normal $\vec{n}_0$ vector of the surface approximation (or inclusive volume) in the intersection point is used.

The normal estimate for a pixel region can be used when aggregating the matching costs of several pixels. Let $(x_0, y_0)$ be the pixel in a camera 1 for which the depth value should be computed. Then the aggregation of the matching costs can be performed in the following manner $$c_{sum}(d, \vec{n}) = \sum_{(x,y) \in N(x_0, y_0)} c(x, y, D(x_0, y_0, x, y, d, \vec{n})) \qquad (3)$$

d is the depth candidate and $\vec{n}$ is the normal vector candidate for which the similarity metric (matching costs) shall be computed. The vector $\vec{n}$ is typically similar to the normal vector $\vec{n}_0$ of the surface approximation or inclusive volume (96) in the intersection (96') with the candidate spatial positions 115 of the considered pixel $(x_0, y_0)$ (see Section 11.4). During the retrieving step, several values for d and $\vec{n}$ are tested.

$N(x_0, y_0)$ contains all pixels whose matching costs are to be aggregated for computation of the depth of pixel $(x_0, y_0)$. $c(x, y, d)$ represents the matching costs for pixel $(x, y)$ and depth candidate d. The sum symbol in equation (3) can represent a sum, but also a more general aggregation function.

$D(x_0, y_0, x, y, d, \vec{n})$ is a function that computes a depth candidate for pixel $(x, y)$ based on the depth candidate d for pixel $(x_0, y_0)$ under the assumption of a planar surface represented by normal vector $\vec{n}$. To this end, consider a plane that is located in the 3D space. Such a plane can be described by the following equation:

$$\begin{bmatrix} X \\ Y \\ Z \end{bmatrix} \cdot \vec{n} = b \qquad (4)$$

Figure 17:
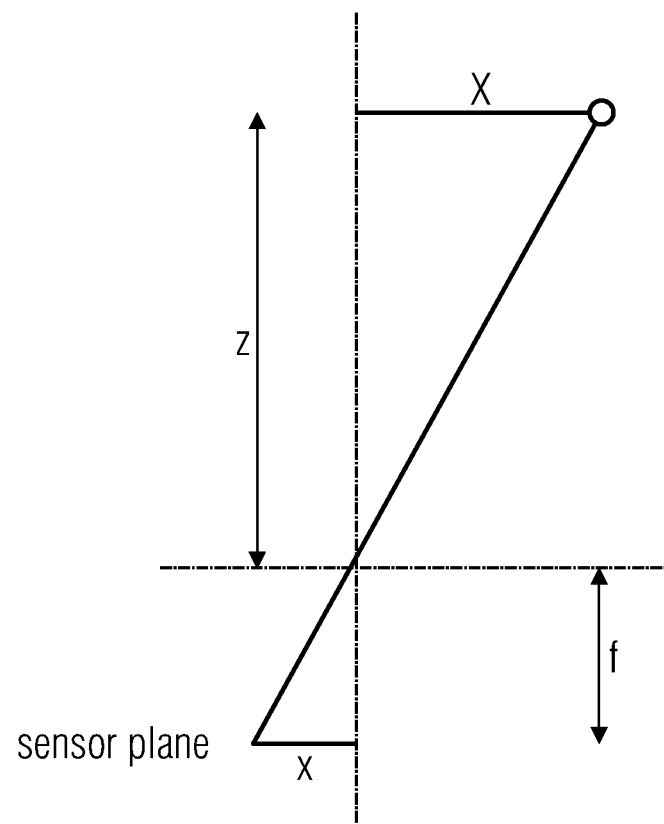

Without lack of generality, let $\vec{n}$ be expressed in the coordinate system of the camera, for which the depth values should be computed. Then there exists an easy relation between a 3D point $(X, Y, Z)$ expressed in the camera coordinate system and the corresponding pixel $(x, y)$ as depicted in FIG. 17:

$$\begin{bmatrix} u \\ v \\ w \end{bmatrix} = K \cdot \begin{bmatrix} X \\ Y \\ Z \end{bmatrix} = \begin{bmatrix} f & s & pp_x \\ 0 & f & pp_y \\ 0 & 0 & 1 \end{bmatrix} \cdot \begin{bmatrix} X \\ Y \\ Z \end{bmatrix}, \begin{bmatrix} x \\ y \end{bmatrix} = \begin{bmatrix} \frac{u}{w} \\ \frac{v}{w} \end{bmatrix} = \begin{bmatrix} \frac{u}{Z} \\ \frac{v}{Z} \end{bmatrix} \qquad (5)$$

K is the so-called intrinsic camera matrix (and may be included in the camera parameters), f the focal length of the camera, $pp_x$ and $pp_y$ the position of the principal point and s a pixel shearing factor.

Combining equations (4) and (5) leads to $$\vec{n} \cdot K^{-1} \cdot \begin{bmatrix} x \\ y \\ 1 \end{bmatrix} \cdot Z = b \Leftrightarrow \frac{1}{Z} = \frac{1}{b} \cdot \vec{n} \cdot K^{-1} \cdot \begin{bmatrix} x \\ y \\ 1 \end{bmatrix}$$

Given that $Z = D(x_0, y_0, x, y, d)$ and that $D(x_0, y_0, x_0, y_0, d) = d$, b can be computed as follows $$b = \vec{n} \cdot K^{-1} \cdot \begin{bmatrix} x_0 \\ y_0 \\ 1 \end{bmatrix} \cdot d$$

Consequently, the depth candidate for pixel $(x, y)$ can be determined by $$\frac{1}{D(x_0, y_0, x, y, d, \vec{n})} = \frac{1}{d} \cdot \frac{\vec{n} \cdot K^{-1} \cdot \begin{bmatrix} x \\ y \\ 1 \end{bmatrix}}{\vec{n} \cdot K^{-1} \cdot \begin{bmatrix} x_0 \\ y_0 \\ 1 \end{bmatrix}} \qquad (6)$$

In other words, the disparity being proportional to one over the depth is a linear function in x and y.

By these means, we are able to compute a depth candidate D for each pixel $(x, y)$ in a first camera and for each depth candidate d and for each normal candidate $(\vec{n})$. Having such a depth candidate allows computing the corresponding matching pixel $(x', y')$ in a second camera. The matching costs or similarity metrics can then be updated by comparing the value of pixel $(x, y)$ in the first camera with the value of the pixel $(x', y')$ in the second camera. Instead of the value, derived quantities such as the census transform can be used. Since $(x', y')$ might not be an integer coordinate, an interpolation might be performed before the comparison.11.4 Usage of normal information in depth estimation with plane hypothesis Based on those relations of Section 11.3, there are two possible approaches to include the normal information provided by the user, such that the correspondence determination gets disambiguated and the resulting depth map quality gets larger. In a simple case, the normal vector $\vec{n}_0$ derived from the user-generated surface approximation is assumed to be correct. In this case, the depth candidates $D(x_0, y_0, x, y, d, \vec{n})$ for each pixel $(x, y)$ are directly computed from equation (6) by setting $\vec{n} = \vec{n}_0$ to the normal vector of the user provided surface approximation. It is not recommended to use this approach for inclusive volumes, since the normal vector in the intersection between the pixel ray and the inclusive volume might be quite different than the normal vector in the intersection point between the pixel ray and the real object.

In a more advanced case, the depth estimation procedure (e.g., at step 37 or 353) searches for the best possible normal vector in a range defined by the normal vector $\vec{n}_0$ derived from the surface approximation or inclusive volume and some tolerance values. These tolerance values can be indicated by a maximum inclination angle $\theta_{max}$. This angle can be different depending on which surface approximation or which inclusive volume the ray of a pixel has intersected.

Let $\vec{n}_0$ be the normal vector defined by the surface approximation or the inclusive volume. Then the set of admissible normal vectors is defined as follows:

$$\vec{n} \in \left\{ \begin{pmatrix} \sin\theta \cdot \cos\phi \\ \sin\theta \cdot \sin\phi \\ \cos\theta \end{pmatrix} \mid 0 \leq \theta \leq \theta_{max}, 0 \leq \phi \leq 2\pi \right\}$$

$\theta$ is the inclination angle around the normal vector $\vec{n}_0$ (i.e., for $\theta=0$, $\vec{n}=\vec{n}_0$), and $\theta_{max}$ is a predetermined threshold (maximum inclination angle with respect to $\vec{n}_0$). $\phi$ is the azimuth angle whose possible values are set to $[0, 2\pi]$ in order to cover all possible normal vectors that deviate from the normal vector of the surface approximation by the angle $\phi$. The obtained vector $\vec{n}$ is interpreted relative to a orthonormal coordinate system, whose third axis (z) is parallel to $\vec{n}_0$, and whose other two axes (x, y) are orthogonal to $\vec{n}_0$. The translation into the coordinate system used for vector $\vec{n}_0$ can be obtained by the following matrix-vector multiplication:

$$\begin{pmatrix} \vec{b}_1 & \vec{b}_2 & \dfrac{\vec{n}_0}{\|\vec{n}_0\|} \end{pmatrix} \cdot \vec{n}$$

Each of the vectors $\vec{b}_1$, $\vec{b}_2$ and $\vec{n}_0$ is a column vector, whereas $\vec{b}_1$ and $\vec{b}_2$ are computed as follows:

$$\vec{b}_1 = \begin{cases} \dfrac{\vec{n}_0 \times \begin{pmatrix} 1 \\ 0 \\ 0 \end{pmatrix}}{\left\| \vec{n}_0 \times \begin{pmatrix} 1 \\ 0 \\ 0 \end{pmatrix} \right\|} & \text{if } \dfrac{\vec{n}_0}{\|\vec{n}_0\|} \neq \begin{pmatrix} 1 \\ 0 \\ 0 \end{pmatrix} \\ \begin{pmatrix} 0 \\ 1 \\ 0 \end{pmatrix} & \text{otherwise} \end{cases}$$

$$\vec{b}_2 = \dfrac{\vec{n}_0}{\|\vec{n}_0\|} \times \vec{b}_1$$

Since this set contains an infinite number of vectors, a subset of angles may be tested. This subset may be defined randomly. For example, for each tested vector $\vec{n}$ and for each depth candidate d to test, equation (6) can be used to compute the depth candidates for all pixels in the aggregation window and to compute the matching costs. Then normal depth computation procedures can then be used to decide about the depth for each pixel by minimizing either the local or the global matching costs. In a simple case, for each pixel the normal vector $\vec{n}$ and depth candidate d with the smallest matching costs is selected (winner takes all strategy). Alternative, global optimization strategies can be applied, penalizing depth discontinuities.

In this context is important to take into account that inclusive volumes are meant at being only a very rough approximation of the underlying object, except when they are automatically computed from a surface approximation (see Section 12). In case the inclusive volume is only a very rough approximation, its tolerance angle should be set to a much larger value than for surface approximations.

This can again be seen in FIG. 11. Although the inclusive volume 96 is a rather precise approximation of the sphere (real object 91), the normal vector in the intersection (93) between ray 2 (115) and the real object (91) differs quite a bit from the normal vector in the intersection (96') between ray 2 (115) and the inclusive volume (96). Unfortunately, only the latter is known during the restricting step and will be assigned to vector $\vec{n}_0$. Consequently, in order to include the normal vector $\vec{n}$ of the surface of the real object (91,93) into the set of normal candidates, a rather large tolerance angle between the determined normal vector $\vec{n}_0$. In the intersection between ray 2 (115) and the inclusive volume (96) and admissible candidate normal vectors $\vec{n}$ need to be allowed.

Figure 48:
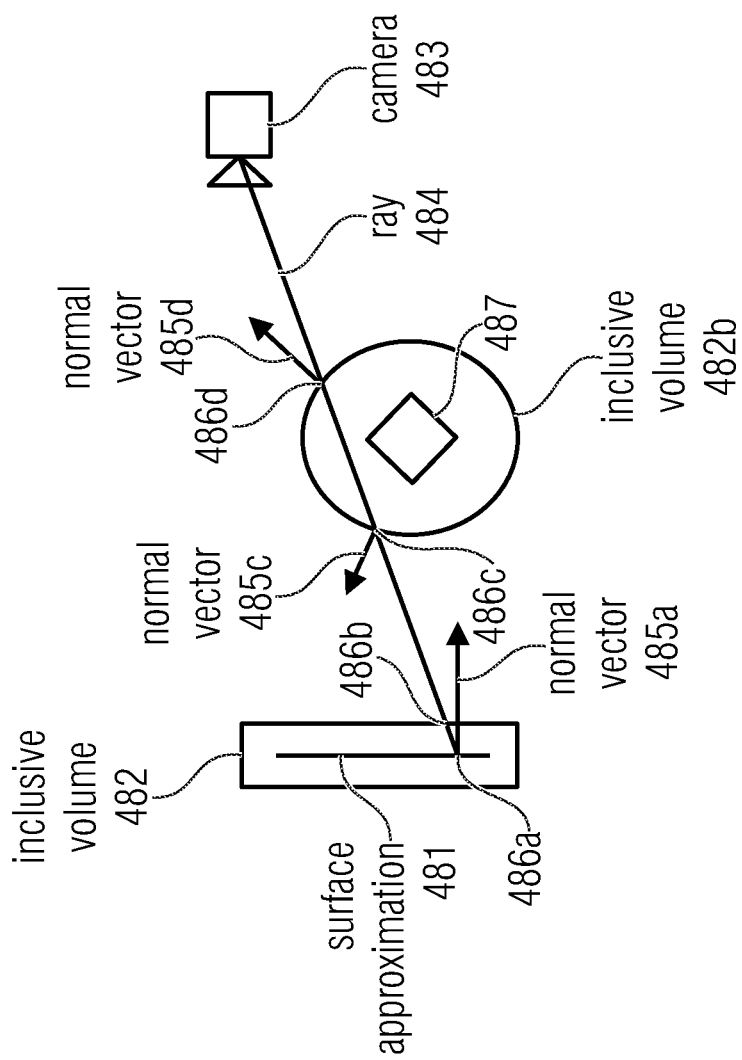
FIG. 48 shows an example.

In other words, every interval of spatial candidate positions can have its own associated normal vector $\vec{n}_0$. In case a ray intersects with a surface approximation, then in the interval of spatial candidate positions bound by this surface approximation, the normal vector of the surface approximation in the intersection point with the ray may be considered as the candidate normal vector $\vec{n}_0$. For example, with reference to FIG. 48, for all candidate spatial positions located between points 486a and 486b, the normal vector $\vec{n}_0$ is chosen to correspond to vector 485a, because a surface approximation typically is a rather precise representation of the object surface. On the other hand, the inclusive volume 482b is only a very coarse approximation for the contained object 487. Moreover, the interval of candidate spatial positions between 486c and 486d does not contain any surface approximation. Consequently, the normal vectors can only be estimated very coarsely, and a large tolerance angle $\theta_{max}$ is recommended. In some examples, $\theta_{max}$ might even be set to 180°, meaning that the normal vectors of the surface approximation are not limited at all. In other examples, different techniques might be used to try to interpolate a best possible normal estimate. For instance, in case of FIG. 48, for each candidate spatial position $\vec{p}$ between 486d and 486c, the associated normal vector $\vec{n}_0(\vec{p})$ might be estimated as follows:

$$\vec{n}_0(\vec{p}) = \vec{n}_{485c} \cdot \dfrac{\|\vec{p} - \vec{p}_{486d}\|}{\|\vec{p}_{486d} - \vec{p}_{486c}\|} + \vec{n}_{485d} \cdot \dfrac{\|\vec{p} - \vec{p}_{486c}\|}{\|\vec{p}_{486d} - \vec{p}_{486c}\|}$$

with $\vec{p}$ the considered candidate spatial position $\vec{n}_0(\vec{p})$ the normal vector associated to the considered candidate spatial position $\vec{p}$ $\vec{p}_{486d}$ the intersection point 486d $\vec{p}_{486c}$ the intersection point 486c $\vec{n}_{485c}$ the normal vector 485c of the inclusive volume in the intersection point 486c $\vec{n}_{485d}$ the normal vector 485d of the inclusive volume in the intersection point 486d In case a ray does not intersect any surface approximation, no normal candidate is available and the depth estimator behaves as usual.

Figure 44:
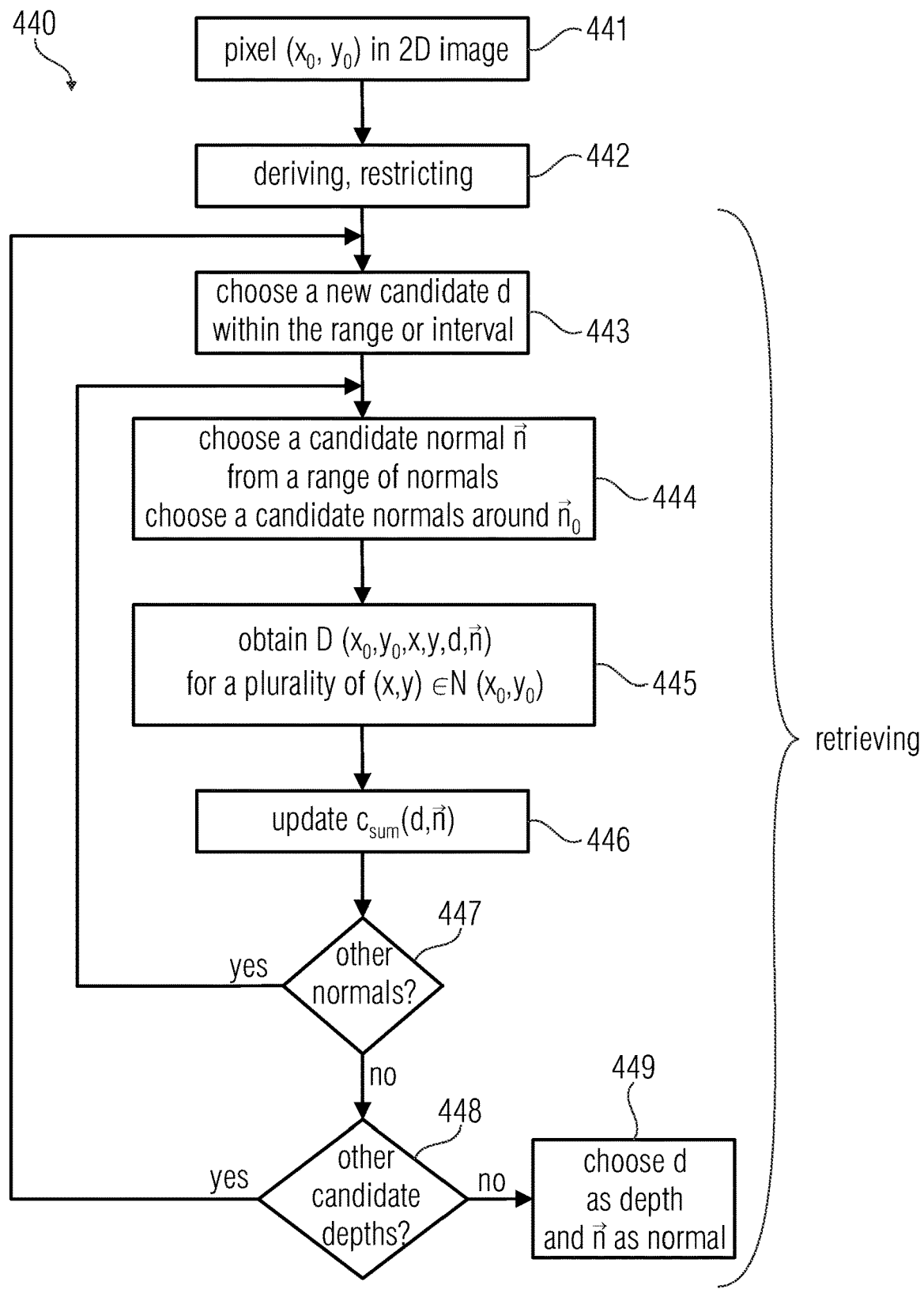

A method 440 is shown in FIG. 44. At step 441, a pixel (x0, y0) is considered in a first image (e.g., associated to ray 2 (145)). Hence, at step 442, a deriving step as 352 and a restricting step as 353 permit to restrict the range or interval of candidate spatial positions (which was initially ray 2 (145)) to the restricted range or interval of admissible candidate spatial positions 149 (e.g., between a first proximal extremity, i.e., the camera position, and a second distal extremity, i.e. the intersection between the ray 2 (145) and the surface approximation 142). Then at 443, a new candidate depth d is chosen within the range or interval of admissible candidate spatial positions 149. A vector $\vec{n}_0$, normal to the surface approximation 142 is found. At 444, a candidate vector $\vec{n}$ is chosen among candidate vectors $\vec{n}$ (which with $\vec{n}_0$ form an angle within a predetermined angle tolerance). Then, a depth candidate $D(x_0, y_0, x, y, d, \vec{n})$ is obtained at 445 (e.g., using formula (7)). Then, $c_{sum}(d, \vec{n})$ is updated at 446. At 447 it is verified if there are other candidate vectors $\vec{n}$ to be processed (if yes, a new candidate vector $\vec{n}$ is chosen at 444). At 448, it is verified if there are other candidate depths d to be processed (if yes, a new candidate depth is chosen at 443). At the conclusion, at 449, the sums $c_{sum}(d, \vec{n})$ may be compared, so as to choose the depth d and the normal $\vec{n}$ associated to the minimum $c_{sum}(d, \vec{n})$.

12 AUTOMATIC CREATION OF INCLUSIVE VOLUMES FROM SURFACE APPROXIMATIONS

This method gives some examples how to derive inclusive volumes from surface approximations in order to solve competing surface approximations and define the admissible depth range. It is to be noted that all the presented methods are just examples, and other methods are possible as well.

Figure 18:
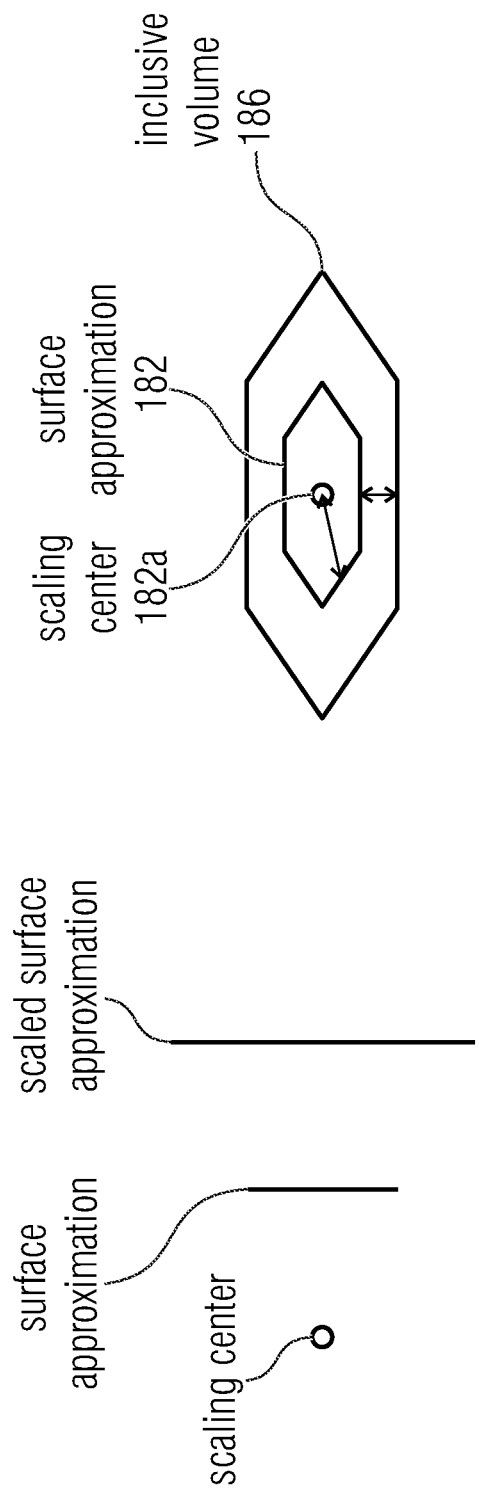

12.1 Computation of Inclusive Volumes by Scaling of Closed Volume Surface Approximations With reference to FIG. 18, an inclusive volume 186 such as at least some of those above and below can be generated from a surface approximation 186 by scaling the surface approximation 186 relative to a scaling center 182a. For each control point (vertex) of the mesh, a vector $\vec{\eta}$ between this control point and the scaling center is computed and lengthened by a constant factor to compute the new position of the control point:

$$\vec{\eta}' = k \cdot \vec{\eta}$$

While very simple, a feature of this method is that the distance between corresponding surface elements is not constant, but depends on the distance to the scaling center 182a. For very complex surface approximations, the generated scaled volume intersects with the surface approximation, which is in general not desired.

12.2 Computation of Inclusive Volumes from Planar Surface Approximations

The simple method described in Section 12.1 works particularly well when the surface approximation 186 is a closed volume. A closed volume may be understood as a mesh or a structure, where each edge of all mesh elements (like triangles) has an even number of neighbor mesh elements.

Figure 19:
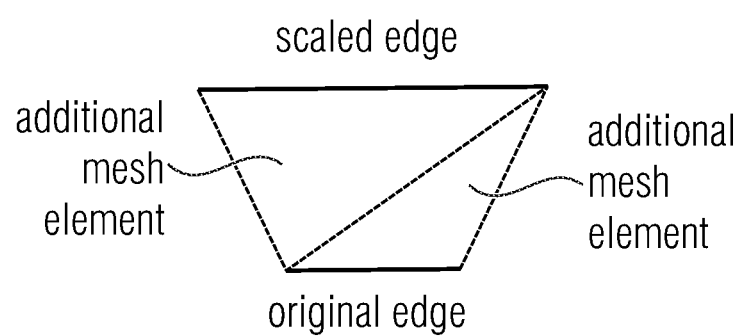

In case this property is not fulfilled, the method needs to be slightly varied. Then for all edges that are only connected to one mesh element, additional mesh elements need to be inserted that connect them with the original edge as illustrated in FIG. 19.

12.3 Mesh Shift and Insertion of New Control Points and Mesh Elements

While the methods discussed in Sections 12.1 and 12.2 are simple to implement, they are in general not to be applied in general due to inherent limitations. Consequently, in the following, a more advanced method is described.

Figure 20:
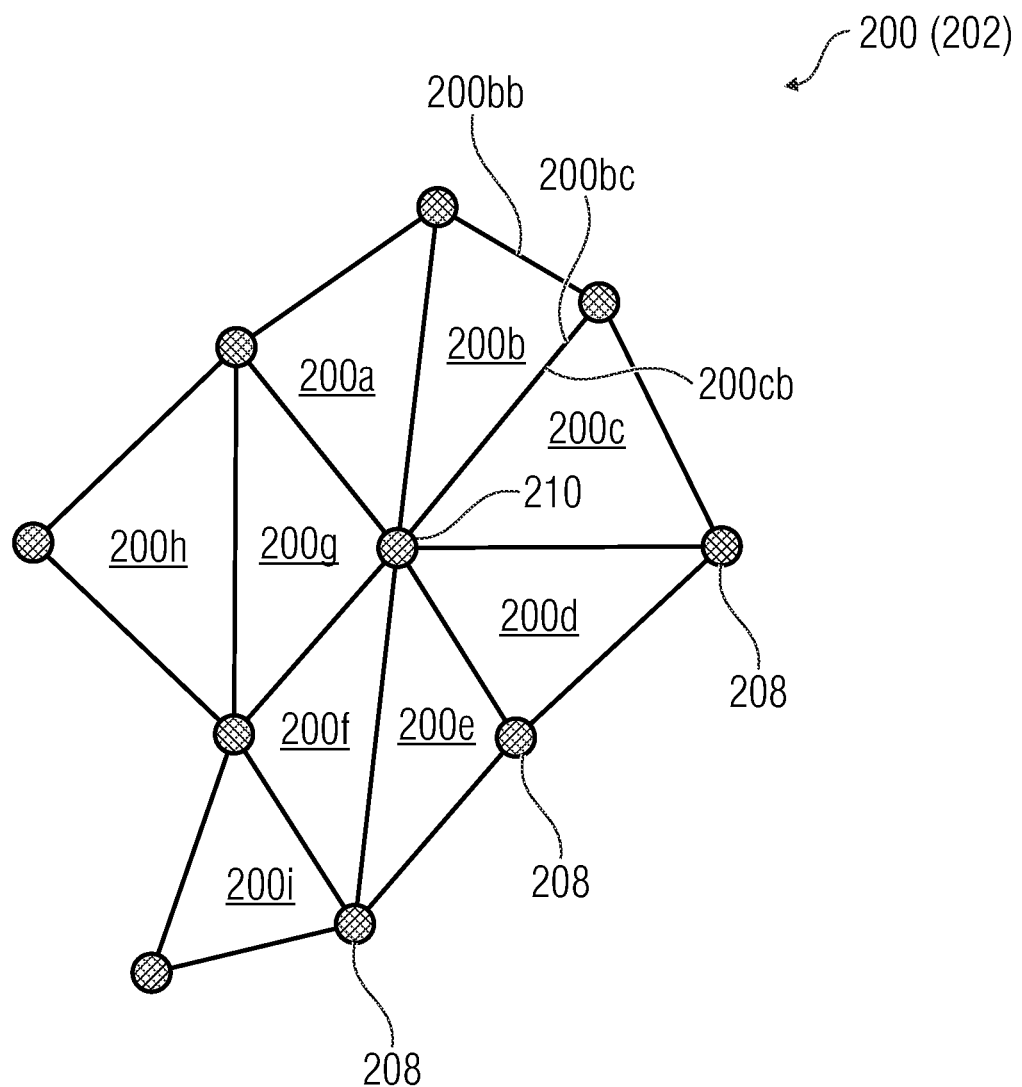

Let's suppose a surface mesh 200 as shown in the FIG. 20. The surface mesh 200 is a structure comprising vertices (control points) 208, edges 200bc, 200cb, 200bb, and surface elements 200a-200i. Each edge connects two vertices, and each surface element is surrounded by at least three edges, and from every vertex there exists a connected path of edges to any other vertex of the structure 200. Each edge may be connected to an even number of surface elements. Each edge may be connected to two surface elements. The structure may occupy a closed structure which has no border (the structure 200, which is not a closed structure, may be understood as a reduced portion of a closed structure). Even if FIG. 20 seems a plane, it may be understood that the structure 200 extends in 3D (i.e., the vertices 208 are not necessarily all coplanar). In particular the normal vector of one surface element may be different than the normal vector of any other surface element.

Let's define that the normal vectors of the surface mesh 200 all point towards the outside of the corresponding 3D object. The external surface of the mesh 200 may be understood as a surface approximation 202, and may embody one of the surface approximations discussed above (e.g., surface approximation 92).

Then an inclusive volume can be generated by shifting all mesh elements (like triangles) or surface elements 200a-200i along their normal vectors by a user-defined value.

Figure 21:
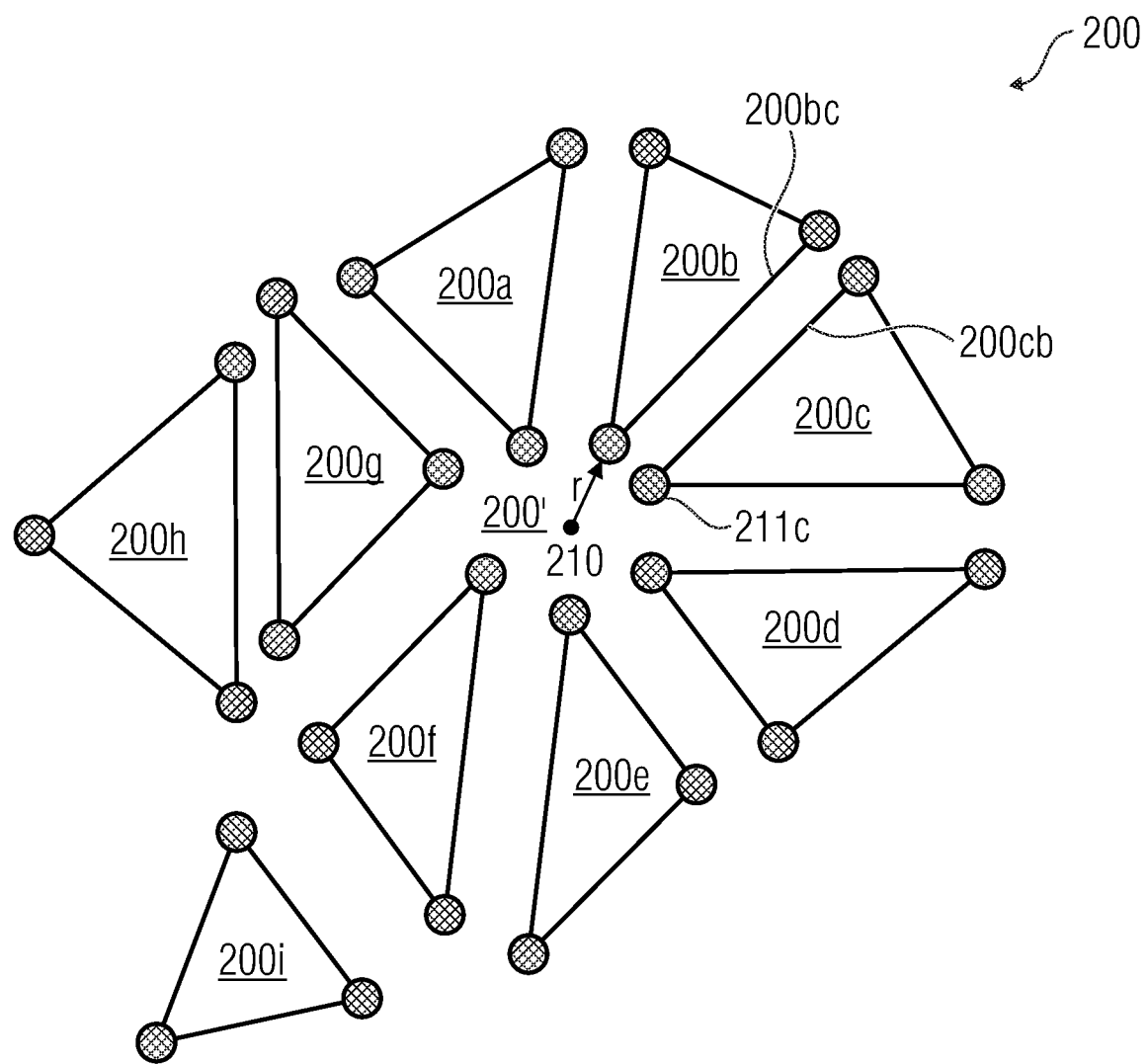
Figure 22:
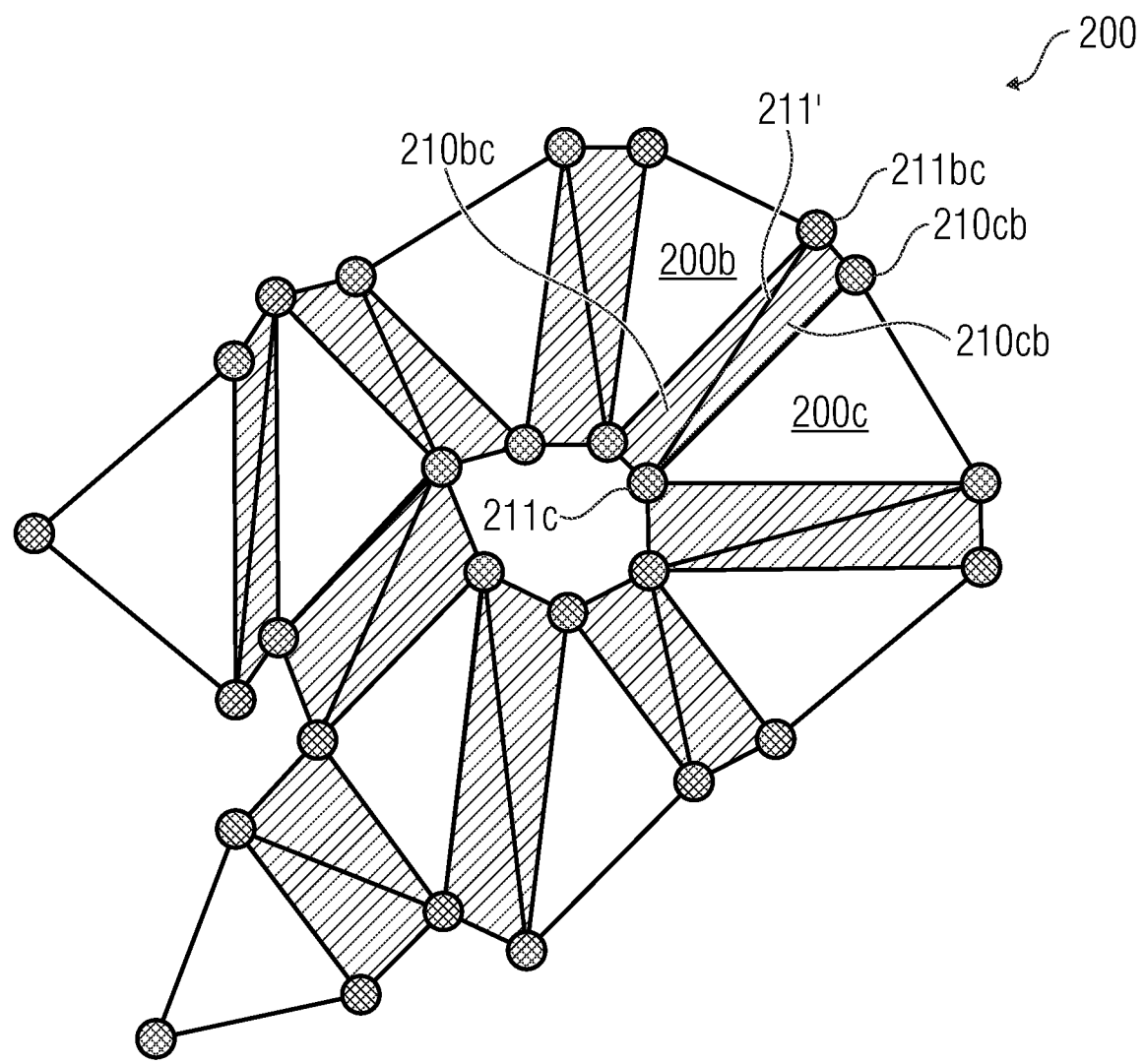
Figure 23:
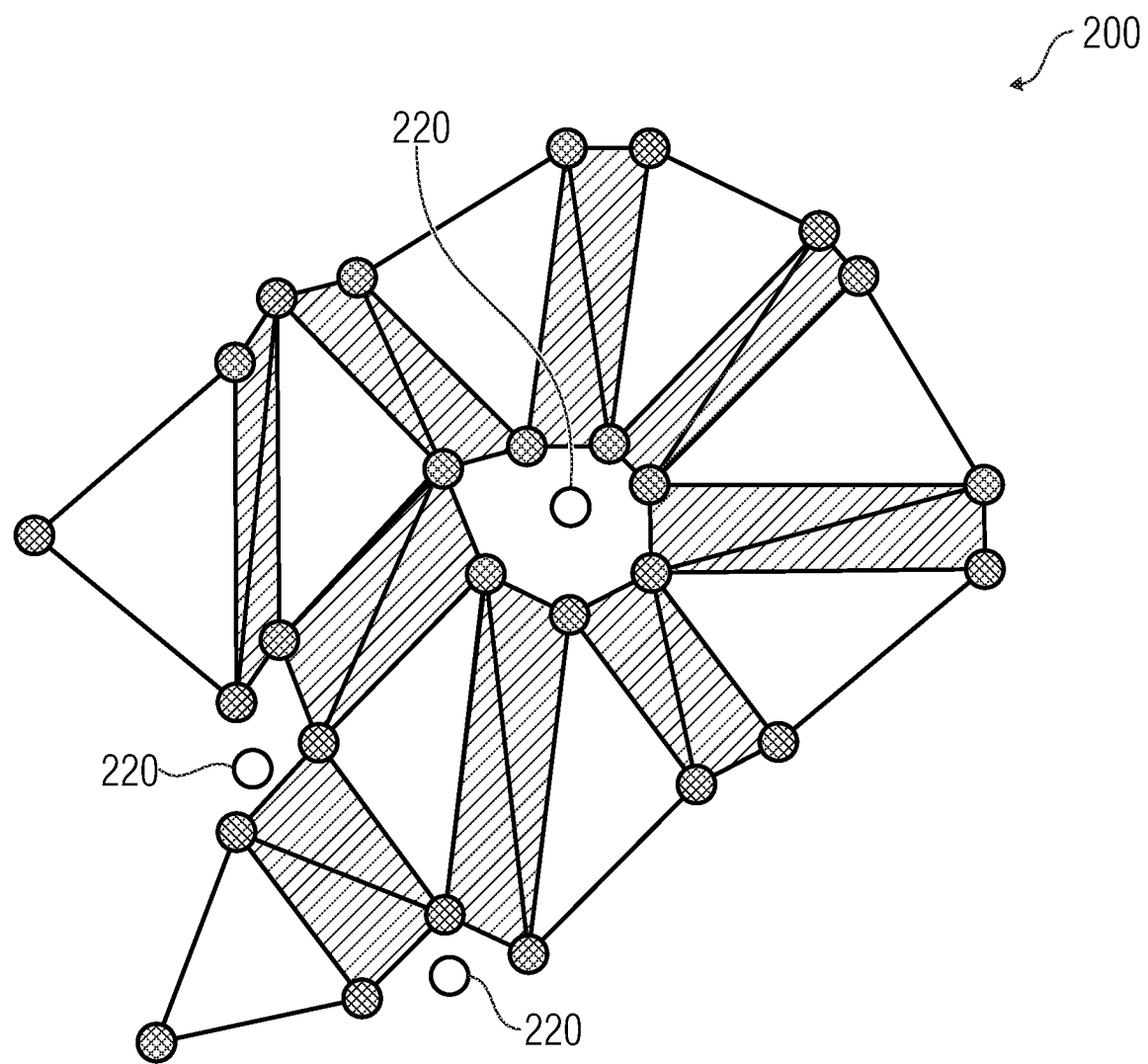

For example, in a transition from FIG. 20 to FIG. 21, the surface element 200b has translated along its normal for a user-defined value r. The normal vector $\vec{n}$ in FIG. 20 and FIG. 21 has three dimensions, and is thus somehow pointing in a third dimension exiting the plane of the paper. For example, surface 200bc that was connected to surface 200cb in FIG. 20, is now separated from surface 200cb in FIG. 21. In this step, all edges that were previously connected may be reconnected by corresponding mesh elements as illustrated in FIG. 22. For example, point 211c is connected to point 211bc through segment 211' to form two new elements 210cb and 210bc. Those new elements interconnect the previously connected edges 200bc and 200cb (FIG. 20), which by the shift along the normal got disconnected (FIG. 21). We also note that, in FIG. 20, a control point 210 was defined, which was connected to more than two mesh elements (200a-200i). Next, as shown in FIG. 23, for each previous control point (e.g., 210) that was connected to more than two mesh elements, a duplicate control point (e.g., 220) may be inserted, being for instance the mean of all new positions of the previous control point 210. (In FIG. 22, new elements are shaded in full color, while old elements are unshaded.)

Figure 24:
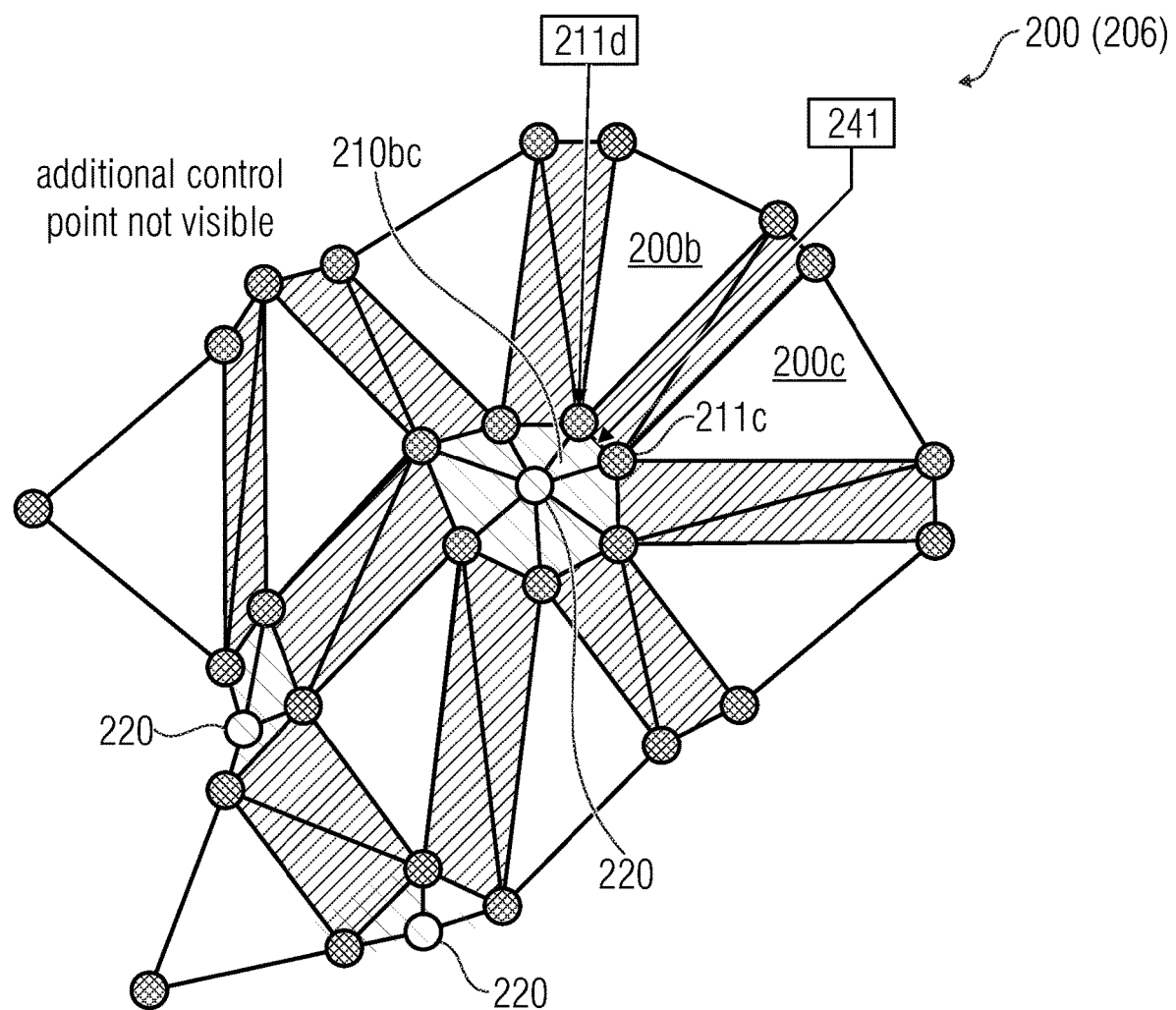

Finally, as shown in FIG. 24, the duplicated control point 220 may be connected with additional mesh elements (e.g., 200a-200i) to each edge reconnecting control points that had been originated from the same source control point. For example, the duplicated control point 220 is connected to edge 241 between control point 211c and 211d, because they both correspond to the same source point 210 (FIG. 20).

In case the original surface approximation 200 were not closed, for all edges that are connected to an odd number of mesh elements, additional mesh elements may be inserted that connect them with the original edge.

Figure 25:
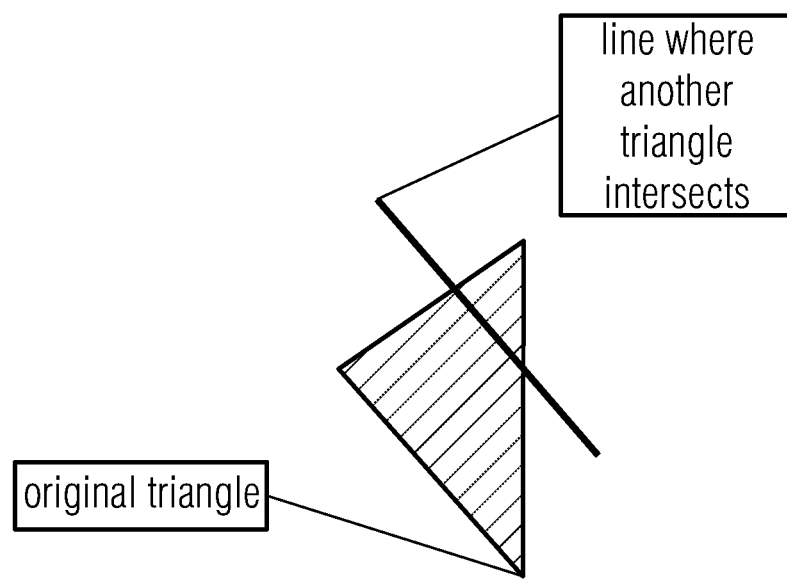
Figure 26:
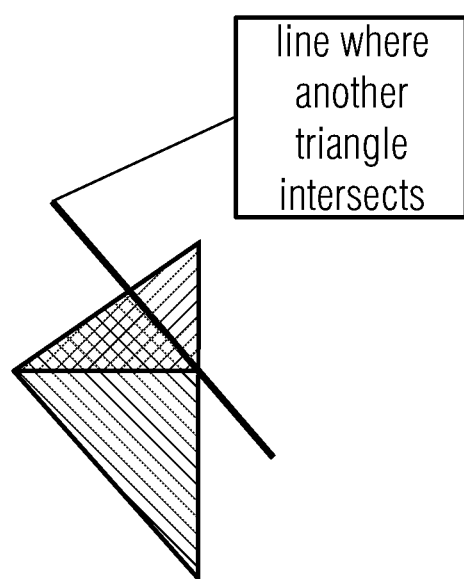

The above procedure might result in mesh elements that are intersecting each other. These intersections may be resolved by some form of mesh-cleaning, where all triangles intersected by another triangle are cut into up to three new triangles along the intersection line as depicted in FIGS. 25 and 26. Then all subvolumes that are completely contained in another volume of the created mesh can be removed.

The volume occupied within the external surface of the so-modified mesh 200 may be used as an inclusive volume 206, and may embody one of the inclusive volumes discussed above (e.g., in FIG. 9, inclusive volume 96, generated from the surface approximation 92).

In general terms, at least part of one inclusive volume (e.g., 96, 206) may be formed starting from a structure (e.g., 200), and in which at least one inclusive volume (e.g., 96, 206) is obtained by:
- shifting elements (e.g., 200a-200i) by exploding the at least some elements (e.g., 200a-200i) along their normals (e.g., from FIG. 20 to FIG. 21);
- reconnecting element (e.g., 200b, 200c) edges (200bc, 200cb) that have been connected before the shift and that got disconnected by the shift by generating additional elements (e.g., 210bc, 210cb) (e.g., from FIG. 21 to FIG. 22); and/or
- inserting a new control point (e.g., 220) within the exploded area (e.g., 200') (e.g., from FIG. 22 to FIG. 23) for each control point (210) in the original structure that has been connected to more than two mesh elements;
- reconnecting the new control points (e.g., 220) with the exploded elements (e.g., 210bc) to form further elements (e.g., 220bc) (e.g., from FIG. 23 to FIG. 24) by building triangular mesh elements (220bc) that connect a new control point (220) and two control points (211d, 211c) originated in the same source control point (210) and whose connected edges (210bc, 210cb) have been neighbours.

13 EXCLUSIVE VOLUME CONSTRAINTS

13.1 Principle

The method discussed in Sections 9 to 12 directly refines the depth map by providing a coarse model of the relevant object. This approach is very intuitive for the user, and close to today's workflows, where 3D scenes are often remodelled by a 3D artist.

However, sometimes it is more intuitive to exclude depth values by defining regions where no 3D point or object element is located. Such constraints can be defined by exclusive volumes.

Figure 27:
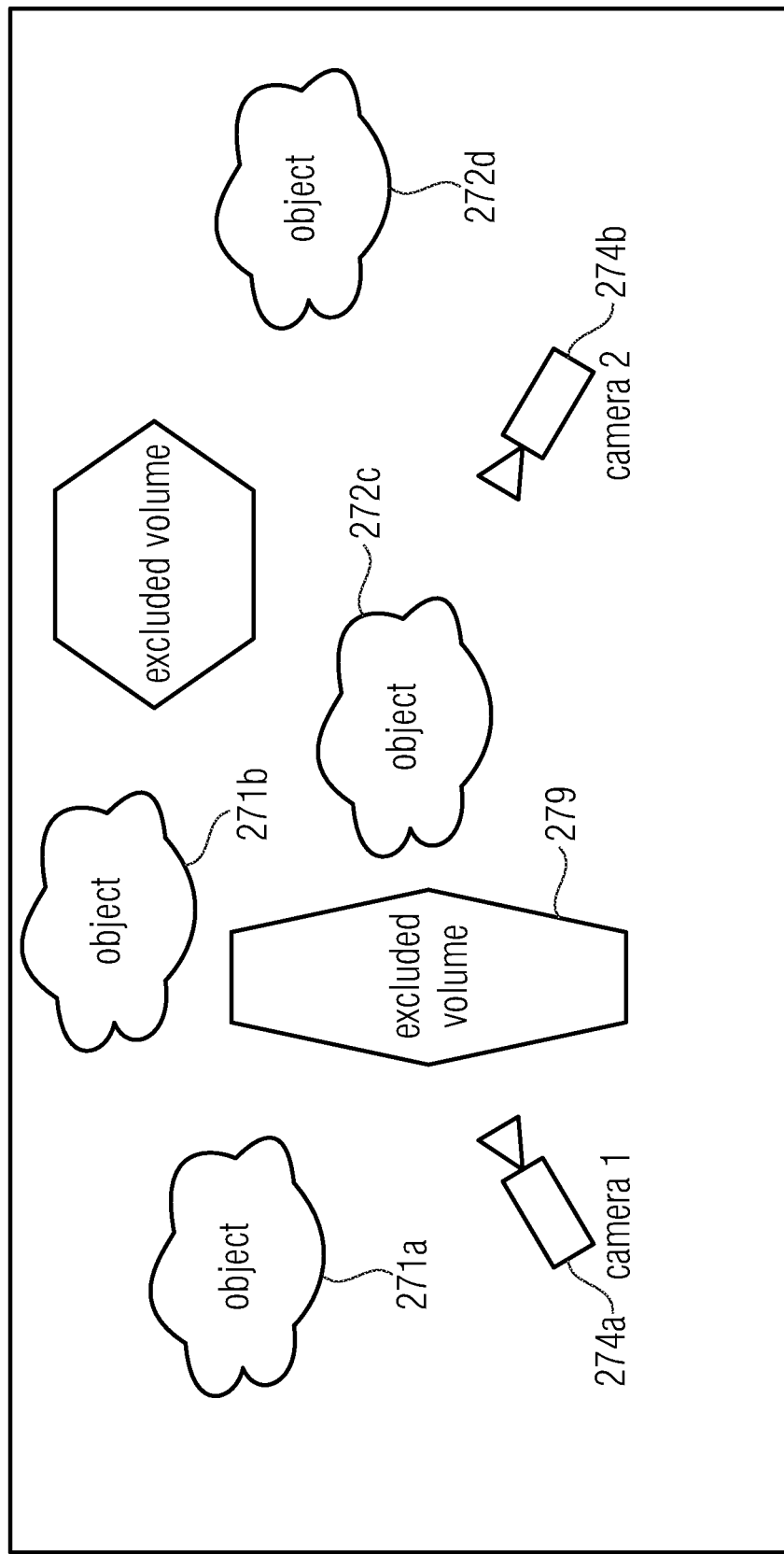

FIG. 27 shows a corresponding example. It illustrates a scene containing several objects 271a-271d that may be observed by different cameras 1 and 2 (274a and 274b) to perform localization processing, such as depth estimation and 3D reconstruction, for example. In case the depth (or another localization) is estimated wrongly, points are located wrongly in the 3D space. By means of scene understanding, a user normally can quickly identify these wrong points. He can then draw or otherwise define volumes 279 (so-called exclusive volumes or excluded volumes) in the 3D space, indicating where no object is placed. The depth estimator can use this information to avoid ambiguities in depth estimation, for example.

13.2 Explicit User's Specification of Excluded Areas by Closed Volumes

In order to define a region where no 3D points or object elements should be situated, a user can draw or otherwise define a closed 3D volume (e.g., using the constraint definer 364). A closed volume can be intuitively understood by a volume where water cannot penetrate into it when the volume is put under water.

Figure 28:
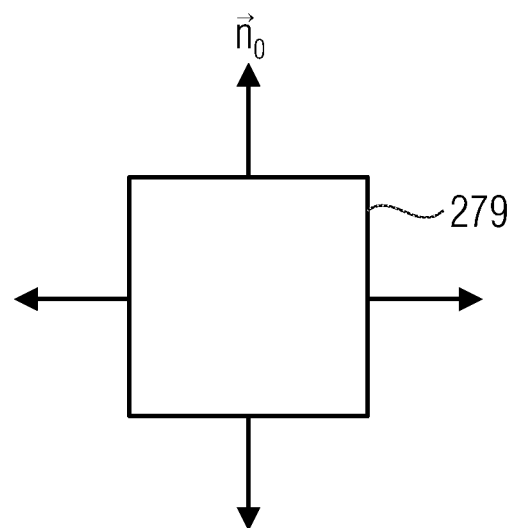

Such a volume can have a simple geometric form, such as a cuboid or a cylinder, but more complex forms are also possible. In order to simplify computation, the volumes of such surfaces may be represented by meshes of triangles (e.g., like in FIGS. 20-24). Independent of the actual representation, each point on the surface of such an exclusive volume may have an associated normal vector $\vec{n}_0$. In order to simplify the later computation, the normal vectors may be oriented in such a way, that they either point all outside of the volume or inside to the volume. In the following we assume that the normal vectors $\vec{n}_0$ are all pointing to the outside of the volume 279 as depicted in the FIG. 28.

Computation of depth ranges from exclusive volumes

Figure 29:
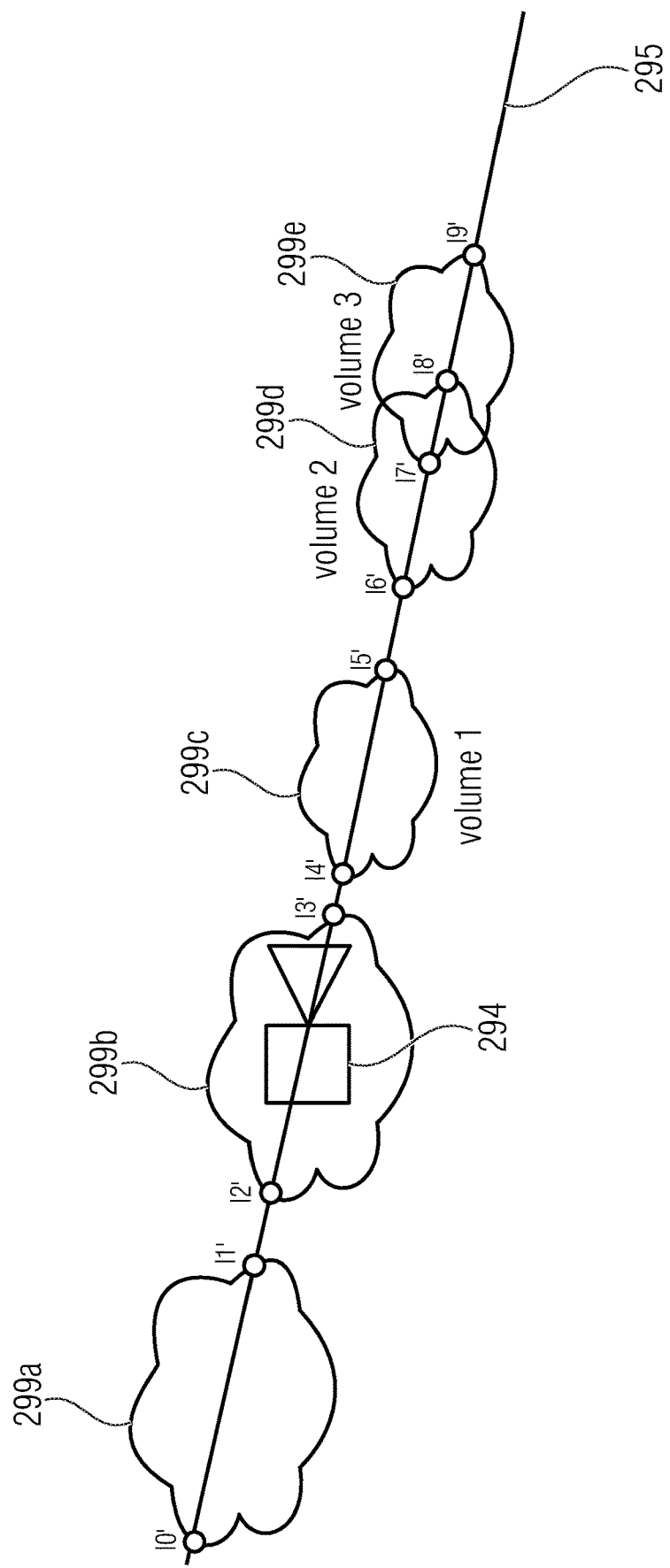

Exclusive volumes permit to restrict the possible depth range for each pixel of a camera view. By these means, for example, an ambiguity of the depth estimation can be reduced. FIG. 29 depicts a corresponding example, with a multiplicity of exclusive volumes 299a-299e. To compute the possible depth values for each pixel of the image, a ray 295 (or another range or interval of candidate positions) may be cast from the pixel through the nodal point of a camera 294. This ray 295 may then be intersected with the volume surfaces (e.g., in a way similar to that of FIGS. 8-14). The intersections I0'-I9' may be (at least apparently) done in both directions of the ray 275, though light will only enter the camera from the right (hence points I0'-I2' are excluded). Intersections I0'-I2' on the inverse ray have negative distances from the camera 294. All found intersections I0'-I9' (extremities of the multiple restricted ranges or intervals of admissible candidate positions) are then ordered in increasing distance.

Let N be the number of intersection points found (e.g., 9 in the case of FIG. 29), and r be the vector describing the ray direction from the camera entrance pupil. Let depth_min be a global parameter that defines the minimum depth an object can have from the camera. Let depth_max be a global parameter that defines the maximum depth an object can have from the camera (can be infinity).

A procedure to compute the set of depth values possible for a given pixel is given below (the set forming restricted ranges or intervals of admissible candidate positions).

```
// Start with an empty set of admissible depth values
DepthSet = { }
// Objects can be situated at distance –infinity (left to the camera
in the inverse ray direction)
lastDist = –Infinity
numValidDist = 1
//Iterate over all intersection points
for j=1:N
    // Get normal of intersection point I(j)
    n = getNormal(I(j))
    // Build the dot product between the vectors n and r to see
    // whether we enter an exclusive volume
    if (n*r<0)
        // ray is entering exclusive volume
        if (numValidDist > 0)
            // get distance of intersection point I(j)
            dist = getDist(I(j))
            //check whether point is situated on the correct side of the
ray
```

-continued

```
    if (dist > 0)
        // Add interval [lastDist, dist] to allowed depth value set
        DepthSet = DepthSet + [max(lastDist,depth_min),dist]
    end
  end
  // lastDisp has been used.
  numValidDist- - // value can get negative
 else
    // ray is leaving exclusive volume
    assert(n*r > 0) // Otherwise no real intersection
    numValidDist++
    assert(numValidDist <= 1)
    if (numValidDist == 1)
        // we have left all exclusive volumes
        // the following distances are admissible again
        lastDist = getDist(I(j))
    end
  end
end
// Add the last admissible depth range
DepthSet = DepthSet + [max(lastDist,depth_min),depth_max]
```

It has to be noted that similarly to section 10.1, exclusive values can be ignored for those pixels whose depth could be determined by an automatic procedure with a reliability or confidence larger or equal to a user provided threshold C0. In other words, if for a given pixel that depth value has already been computed with sufficient reliability, its depth value is not changed, and the before-mentioned procedure is not executed for this pixel.

13.4 Usage of Exclusive Volumes with in the Depth Estimation Procedure

Depth estimators (e.g., at step 37 or 353 or by block 363) may compute a matching cost for each depth (see Section 5). Hence, use of the exclusive volumes for depth estimation (or another localization) may be made easy by setting the costs for non-allowed depths to infinity.

13.5 Definition of Exclusive Volumes

Exclusive volumes can be defined by methods that may be based on 3D graphics software. They may be represented in form of meshes, such as those shown in FIGS. 20-24, which may be based on a triangle structure.

Alternatively, instead of drawing a closed volume directly in a 3D graphics software, the closed volume can also be derived from a 3D surface. This surface can then be extruded into a volume by any method.

13.6 Specification of Excluded Areas by Surface Meshes

Figure 30:
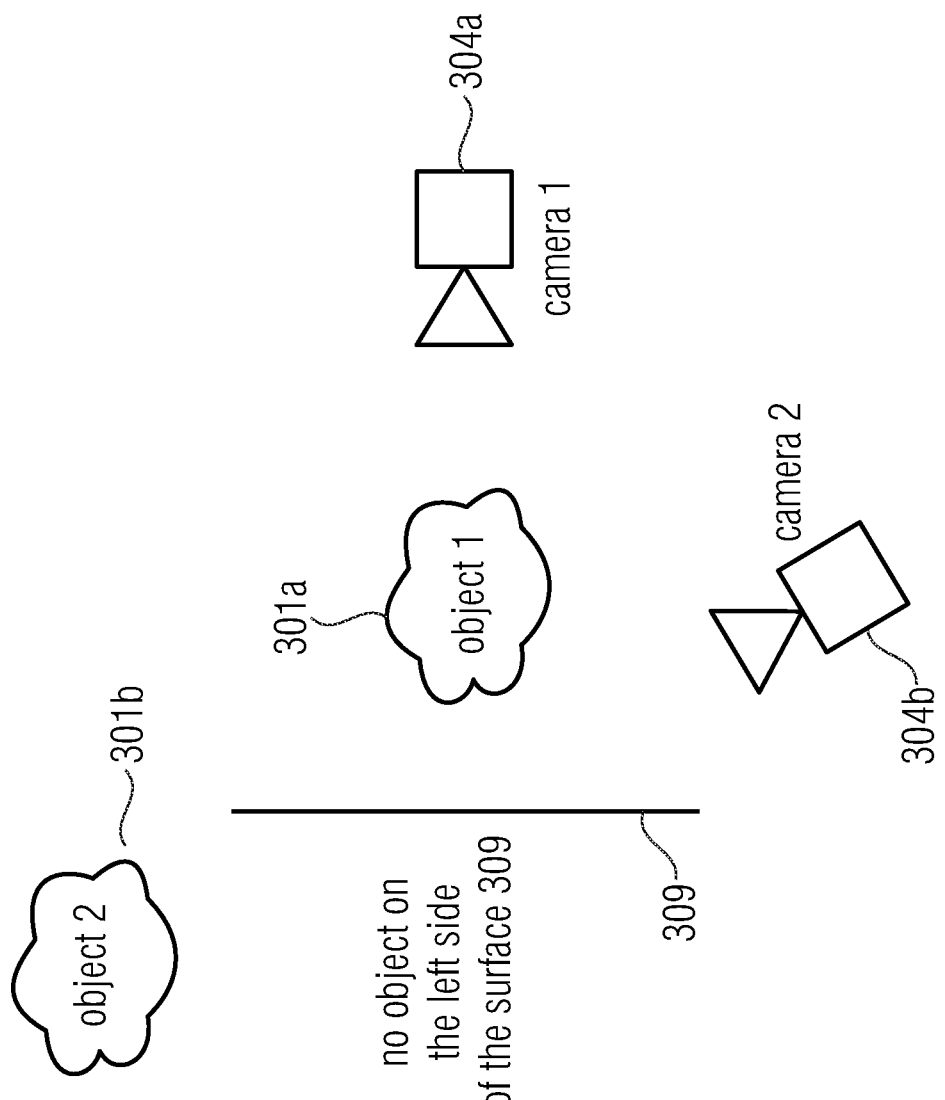

In addition to specifying regions excluded by volumes, they can also be excluded by surfaces. Such surfaces, however, are only valid for a subset of the available cameras. This is shown in FIG. 30. Let's suppose that the user places (e.g., using the constraint definer 364) a surface 309 and declares that there is no object left to the surface (which is therefore an exclusive surface). While this statement is certainly valid for camera 1 (304*a*), it is wrong for camera 2 (304*b*). This problem can be addressed by indicating that the surface 309 is only be taken into account for camera 1 (304*a*). Because this is more complex, it is not the favourite approach.

13.7 Combination of Exclusive Volumes with Surface Approximations and Inclusive Volumes Exclusive volumes can be combined with surface approximations and inclusive volumes to further restrict the admissible depth values.

13.8 Automatic Creation of Exclusive Volumes for Multi-Camera Consistency

Section 10.4 has introduced a method how to further refine the constraints based on multiple cameras. That method essentially considers two situations: First of all, in case a reliable depth could be computed for a first object in a first camera, it avoids that in a second camera a computed depth value would place a second object in such a way that it occludes the first object in the first camera. Secondly, if such a reliable depth does not exist for a first object in a first camera, then it is understood that the depth values of the first object in the first camera are constraint by the inclusive volumes and the surface approximations relevant for the first object in the first camera. This means that for a second camera it is not allowed to compute a depth value of a second object in such a way that it would occlude all inclusive volumes and surface approximations in the first camera for the first object.

Figure 37:
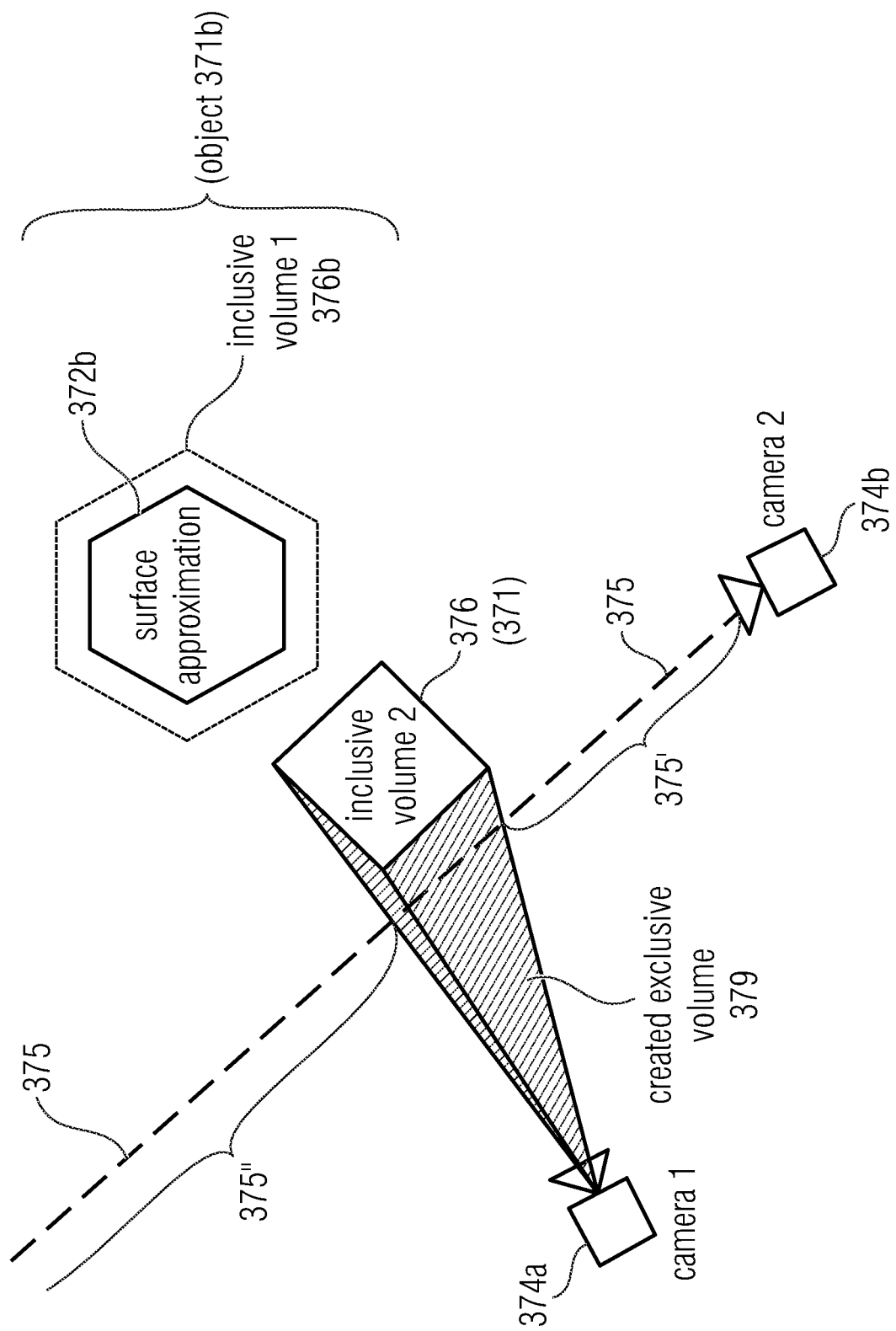

By automatic creation of exclusive volumes, it is possible to express the concept of section 10.4 in an alternative way. This is illustrated in FIG. 37. A basic idea includes creating exclusive volumes (e.g. 379) to prevent that objects are placed (at step 37) between a camera 374*a* and the first intersected inclusive volume 376 of a pixel ray. In addition it may be possible to even prevent objects placed between inclusive volumes. Such an approach however would involve that the user has surrounded each and every object by an inclusive volume, which is typically not the case. Hence, this scenario will not be considered in detail in the following, although it is possible (see also Section 10.4.2).

A procedure for creating exclusive volumes to prevent objects between a camera and the relevant first intersected inclusive volume of each camera ray is described in the following. It assumes that inclusive volumes are described by triangles or planar mesh elements.

```
01  for each camera C_i
02      create an image I_1 by projecting all inclusive volumes onto
        camera C_i
03      create an image I_2 by projecting all surface approximations
        onto camera C_i
04      // images I_1 and I_2 are assumed to have the same size than
        camera image C_i
05      for each (x,y)
06          if I_2(x,y) < > 0
07              I_3(x,y) = I_1(x,y)
08          else if
09              I_3(x,y) = 0
10          end if
11      end for
12      for each inclusive volume V_i
13          // Create a copy of mesh V_i
14          W = copy of V_i
15          // Process inclusive volume mesh to keep only
16          // those elements that are visible
17          // in camera C_i
18          for each triangle M_i of W
19              if M_i not visible in image I_3
20                  remove M_i from W
21              end if
22              if M_I partially visible in image I_3
23                  replace M_i by sub-triangles that only cover the visible
        part of M_i
24              end if
25          end for
26          // Create exclusive volume based on the modified volume mesh
27          for each triangle M_i of W
28              for each edge E_i of M_i
29                  if E_i shared between two triangles
30                      // do nothing
31                      continue
32                  else
```

-continued

```
33          Create triangular surface of exclusive volume by
     connecting edge with
34              nodal point (entrance pupil) of camera C_i
35          end if
36        end for
37      end for
38    end for
39  end for
```

A core idea of the procedure lies in finding for each pixel (or other 2D representation element) the first inclusive volume which is intersected by the ray defined by the pixel under consideration and the camera entrance pupil or nodal point. Then all spatial positions between the camera and this intersected inclusive volume are not admissible and can hence be excluded in case the ray also intersects with a surface approximation. Otherwise, the inclusive volume may be ignored, as mentioned in section 10.1.

Based on this fundamental idea, the challenge now consists in grouping all the different pixel rays into compact exclusive volumes described in form of meshes. To this purpose, the before-standing procedure creates two pixel maps I_1 and I_2. The pixel map I_1 defines for each pixel the identifier of the closest inclusive volume intersected by the corresponding ray. A value of zero means that no inclusive volume has been intersected. The pixel map I_2 defines for each pixel the identifier of the closest surface approximation intersected by the corresponding ray. A value of zero means that no surface approximation has been intersected. The combined pixel map I_3 finally defines for each pixel the identifier of the closest inclusive volume intersected by the corresponding ray, given that also a surface approximation has been intersected. Otherwise the pixel map value equals to zero, which means that no relevant inclusive volume has been intersected.

Lines 14-25 are then responsible to create a copy of the inclusive volume where only those parts are kept which are visible in camera C_i. Or in other words, only those parts of the inclusive volumes are kept whose projection to camera C_i coincides with those pixels whose map value in I_3 equals to the identifier of the inclusive volume. Lines 26 to 37 finally form exclusive volumes from those remaining meshes by connecting the relevant edges with the nodal point of the camera. The relevant edges are those which are at the borders of the copied inclusive volume meshes.

More in general, in the example of FIG. 37 (besides an inclusive volume 376b which is here not of interest), referring to two cameras 1 and 2 (374a and 374b), an inclusive volume 376 has been defined, e.g., manually by a user, for an object 371 (not shown). Moreover, a surface approximation 372b has been defined, e.g., manually by a user for an object 371b (not shown). There may be the possibility of creating automatically an exclusive volume 379. In fact, by virtue of the fact that the inclusive volume 376 is imaged by the camera 1 (374a), it is possible to conclude a priori that no object is positioned between the inclusive volume 2 (372) and the camera 1 (374a). Such a conclusion may be dependent on the fact whether the corresponding ray intersects with a surface approximation. Such a restriction can be concluded from Section 10.1, enumeration item 2, recommending to ignore inclusive volumes in case a ray (or another range of candidate positions) does not intersect with a surface approximation. It has to be noted that this created exclusive volume may be relevant in particular (and, in some cases, only) in case the reliability of the automatically precomputed disparity value (34, 383a) is smaller than the provided user threshold C0. Accordingly, when restricting the range of interval of candidate spatial positions (which may be the ray 375 exiting from the camera 2, 374b), the restricted range of admissible candidate spatial positions may comprise the two intervals (e.g., two disjoint intervals):

A first, proximal interval 375' from the position of the camera 374b to exclusive volume 379; and A second, distal interval 375" which departs from the exclusive volume 379 towards infinite.

Therefore, when retrieving the restricted range of admissible spatial positions (e.g., at 37 or 353 or by block 363, or by other techniques), the positions within the exclusive volume 379 will be avoided (and will not be processed).

In other examples, exclusive volumes may be generated manually by the user.

In general terms, restricting (e.g., at 35, 36, 352, by block 362, etc.) may include finding an intersection between the range or interval of candidate positions with at least one exclusive volume. Restricting may include finding an extremity of the range or interval of candidate positions with at least one of the inclusive volume, exclusive volume, surface approximation.

14 METHODS FOR DETECTING DEPTH MAP ERRORS

In order to be able to place 3D objects at the best possible locations for depth map improvement, the user needs to be able to analyze where depth map errors occurred. To this end, different methods are available:

An easiest situation occurs when a depth map contains holes (missing depth values). To correct these artefacts, the user needs to draw 3D objects that help the depth estimation software to fill these holes. It is to be noted that by applying different kinds of consistency checks, wrong depth values can be converted in holes.

Large depth map errors can also be detected by looking to the depth or disparity images themselves.

Finally, depth map errors can be identified by placing a virtual camera in different locations and performing a view rendering or displaying based on light-field procedures. This is explained in more detail in the following section.

14.1 View Rendering or Displaying Based Detection of Coarse Depth Map Errors

Figure 39:
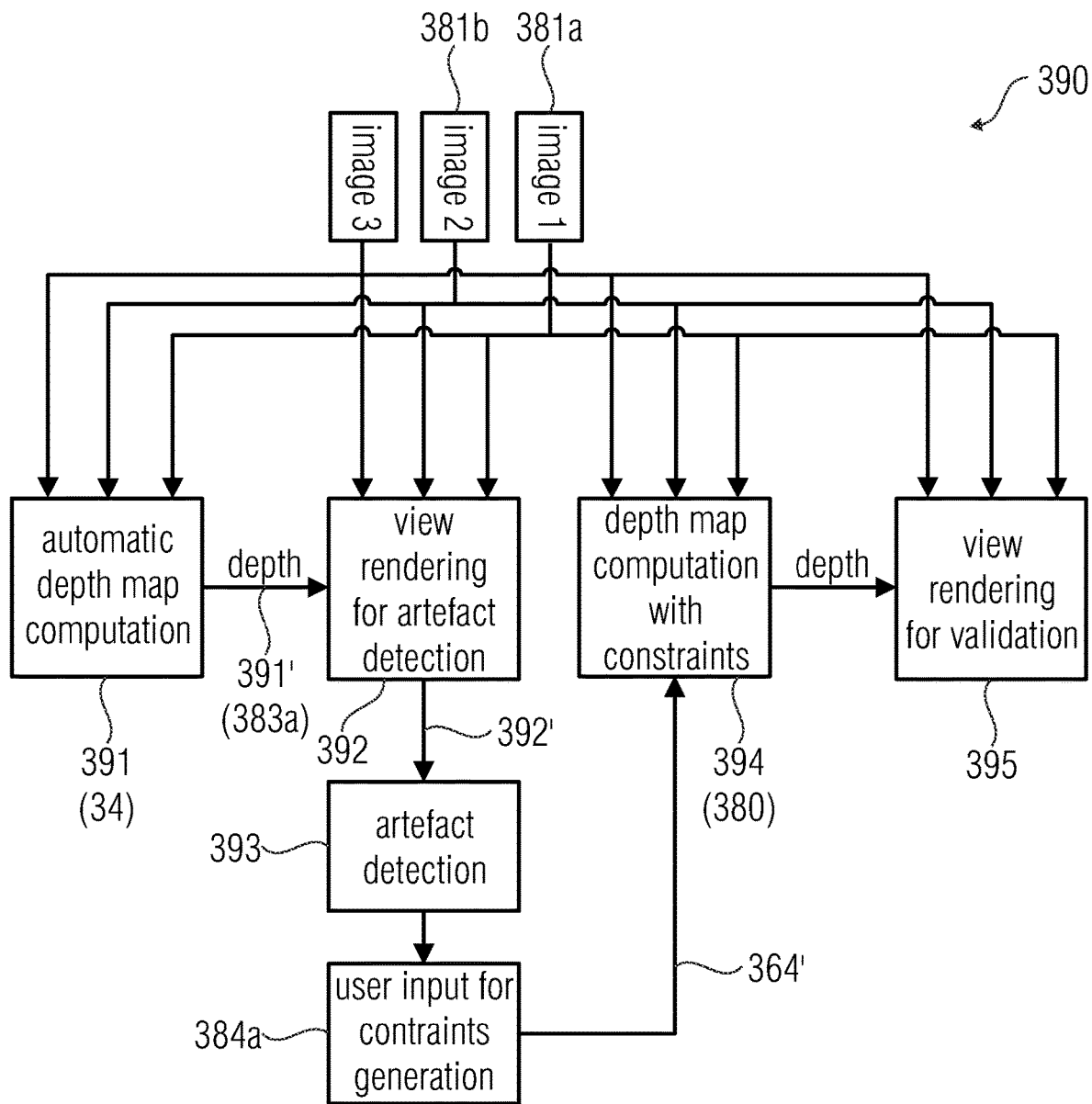
FIG. 39 shows a procedure according to an example.

FIG. 39 shows a procedure 390 implementing a procedure of how to determine erroneous locations based on view rendering or displaying (see also FIG. 38). To this end, the user may perform an automatic depth map computation (e.g., at step 34). The generated depth maps 391' (e.g., 383a) are used at 392 for creating novel virtual camera views 392' using view rendering or displaying. Based on the synthesized results, at 393 the user may identify (e.g., visually) which depth values contributed to the artefact visible in the synthesized result 392' (in other examples, this may be performed automatically).

Hence, the user may input (e.g., at 384a) constraints 364', e.g., to exclude parts of the ranges or intervals of candidate space positions, with the intention of excluding positions which are evidently invalid. Hence, a depth map 394 (with constraints 364') may be obtained, so as to obtain restricted ranges of admissible spatial positions. The relevant object can then be processed by the methods 380 described above (see in particular the previous sections). Otherwise a new view rendering or displaying 395 can be performed to validate whether the artefacts could get eliminated, or whether the user constraints need to be refined.

Figure 31:
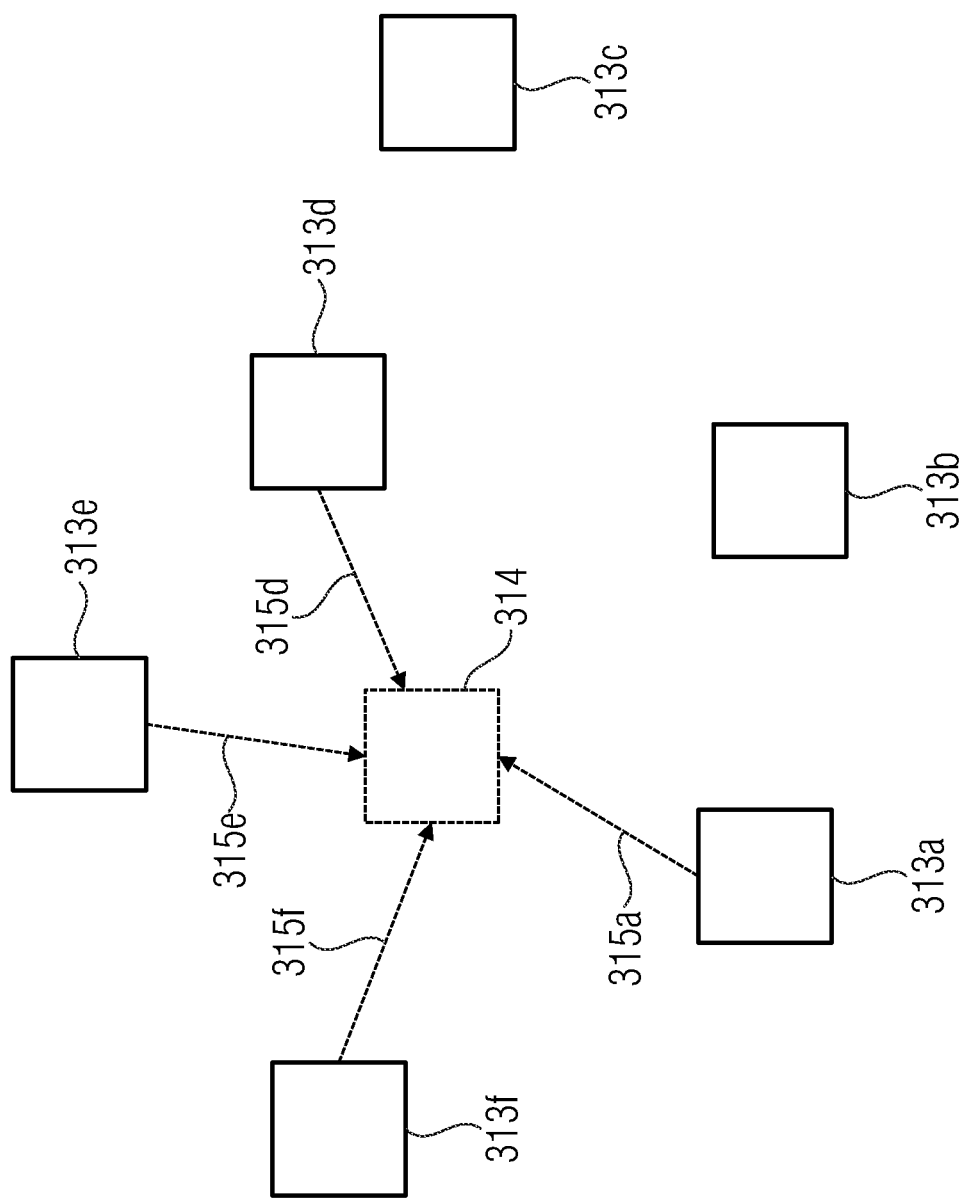

FIG. 31 shows an example for an image-based view rendering or displaying. Each rectangle corresponds to a camera view (e.g., a 2D previously processed 2D image, such as the first or second 2D image 363 or 363b, and which may have been acquired by a camera such as a camera 94, 114, 124, 124a, 134, 144, 274a, 274b, 294, 304a, 304b, etc.). Solid rectangles 313a-313f represent images acquired by real cameras (e.g., 94, 114, 124, 124a, 134, 144, 274a, 274b, 294, 304a, 304b, etc.) in predetermined positional relationships with each other, while the dashed rectangle 314 defines a virtual camera image that is to be synthesized (using the determined depth map, or the localization of the object elements in the images 313a-313f). The arrows 315a and 315e-315f define the cameras (here, 313a and 313e-313f) that have been used for rendering or displaying the virtual target view 314. As can be seen not all camera views need to be selected (this may follow a selection from the user or a choice from an automatic rendering or displaying procedure).

Figure 32:
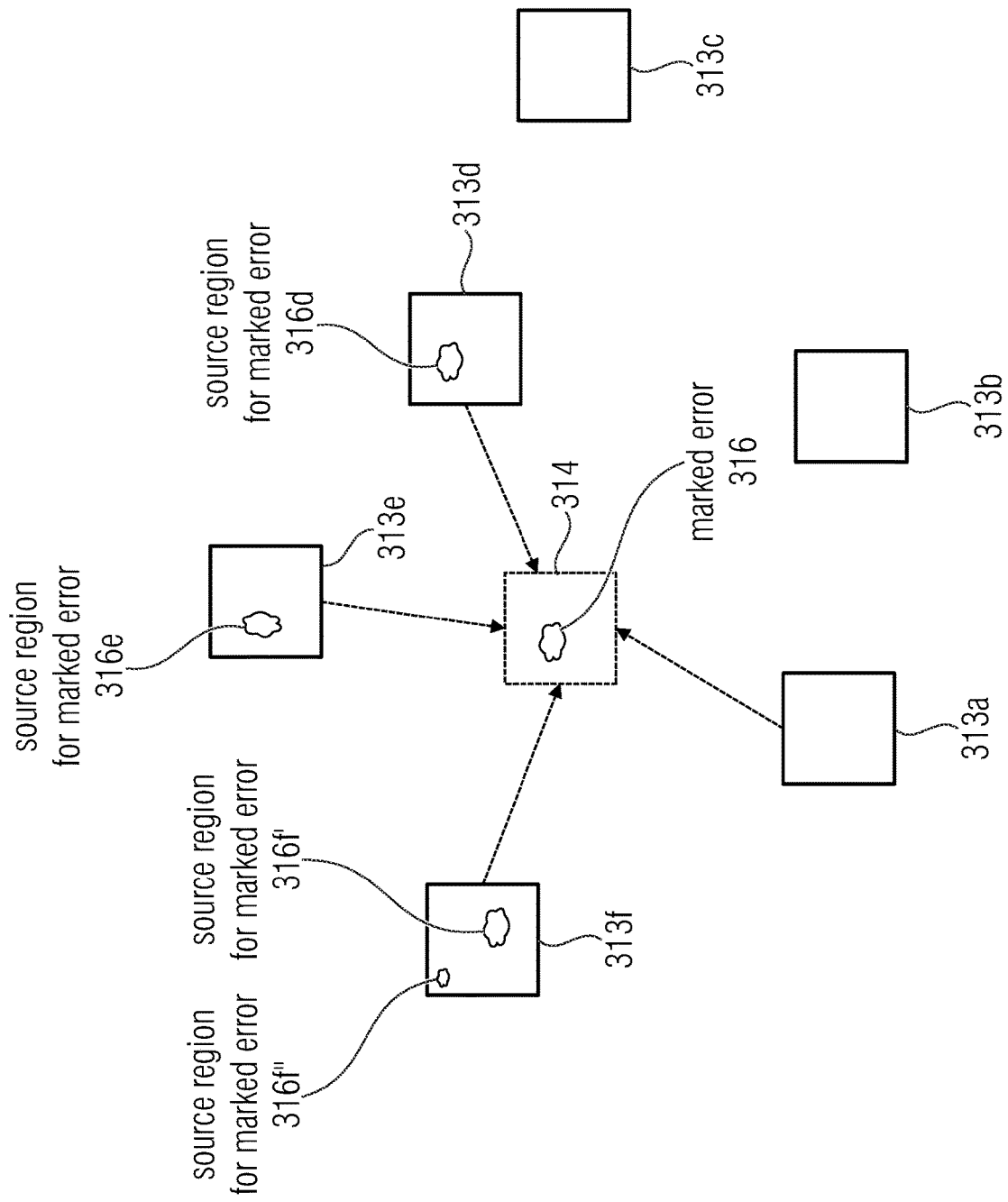

When, as in FIG. 32, the user (at step 38 or 351, for example) spots a view rendering or displaying artefact, he may mark the corresponding region by a marking tool 316. The user may operate so that the marked region contains the erroneous pixels. In order to simplify the user's operation, the marked region 316 can also contain some pixels (or other 2D representation elements) that are properly rendered (but that have been happened to be in the marked region because of the approximation of the marking made by the user). In other words, the marking doesn't need to be very precise. A coarse marking of the artefact region is sufficient. Only the number of correct pixels shouldn't be too large, otherwise the precision of the analysis gets reduced.

The view rendering or displaying procedure can then mark all source pixels (or other 2D representation elements) that have been contributing to the marked region as shown in FIG. 32, basically identifying regions 316d, 316e, 316f' and 316f'' which are associated to the marked error region 316. This is possible, because the view rendering or displaying procedure essentially has shifted each pixel of a source camera view (313a, 313d-313f) to a location in the virtual target view (314) based on the depth value of the source pixel. Then all pixels in 314 are removed that are occluded by some other pixel. In other words, if several source pixels from images 313a-313f are rendered to the same pixel in the target view 314, then only those with the smallest distance to the virtual camera are kept. If several pixels have the same distance, then they are merged or blended, by computing for instance a mean value of all pixels with same minimum distance.

Hence, by simply tracking which pixel contributes to the erroneous region, the view rendering or displaying procedure can identify the source pixels. The source regions 316d, 316e, 316f' and 316f'' do not need to be connected, although the error-marking is. Based on a semantic understanding of the scene, the user can then easily identify, which source pixels should not have contributed to the marked regions, and perform measures to correct their depth values.

14.2 View Rendering or Displaying Based Detection of Small Depth Map Errors

Error detection such as that described above works well when some depth values are quite different from their correct value. However, if depth values are only off by a small value, the marked source regions will be correct, although the view rendering or displaying gets blurry or shows small artefacts.

Nevertheless, a similar approach than described above can be performed. In case the source regions are correct, this means that the depth values are approximately correct, but need to be refined for a sharper view rendering or displaying or less artefacts. As a consequence, the user needs to perform measures to improve the depth maps for the indicated source regions.

15 METHODS FOR CREATING LOCATION CONSTRAINTS IN 3D SPACE

This section describes a user interface and some general strategies how a user can create the surface approximations in a 3D editing software.

It is noted that FIGS. 4-14 and 29, 30, 37, 41, 49, etc. may be understood as images (e.g., 2D images) being displayed to a user (e.g., by the GUI associated to the constraint definer 364) on the basis of a previous, rough localization obtained, for example, at step 34. The user may see the images and may hinted to refine them using one of the methods above and/or below (e.g., the user may graphically select the constraints such as surface approximations and/or inclusive volumes).

15.1 Problem Formulation

In order to be able to improve the depth maps in an interactive manner, the user may create 3D (e.g., using the constraint definer 363) geometry constraints that match with the captured footage as closely as possible.

Creation of 3D geometries is possible in a variety of ways. An advantageous one is to use any existing 3D editing software. Since this method is well known, it will not be detailed in the following. Instead we consider approaches where 3D geometries are drawn based on one, two or more 2D images.

15.2 Basic Concept

Since we have multiple photos 316a-316f of the same scene, the user can select two or more of them for creating constraints in 3D space. Each of these images may then be displayed in a window of the graphical user interface (e.g., operated by the constraint definer 364). The user then positions the 2D projection of the 3D geometry primitives in these two 2D images by overlaying the projections with the part of the 2D image that the geometry primitive should model. Since the user locates the geometry primitive projections in two images, the geometry primitive is also located in 3D space.

In order to ensure that the drawn 3D geometry primitive never exceeds the object and is only contained inside the object, the drawn 3D geometry primitive might be afterwards shifted a bit relative to the optical axis of the cameras. Again, a variety of methods are available to achieve these goals. In the following, we present extensions to this concept that simplify the creation and editing process.

15.3 Single Camera Editing with Constant Coordinate Projection Mode

In this drawing mode, the user defines a 3D reference coordinate system that can be placed arbitrary. Then the user can select one coordinate that should have a fixed value. When drawing a 2D object in a single camera view window, a 3D object is created whose projection leads to the 2D object shown in the camera window and where the fixed coordinate has the defined value. Please note that by this method the position of the 3D object in the 3D space is uniquely defined.

Suppose that the coordinates of the projected 2D images are labelled with u and v. The computation of the 3D coordinates in the reference coordinate system can be achieved by inverting the following relation:

$$\begin{pmatrix} u \\ v \\ w \end{pmatrix} = K \cdot R \cdot \begin{pmatrix} X \\ Y \\ Z \\ 1 \end{pmatrix}$$

$$K \in \mathbb{R}^{3 \times 3}, R \in \mathbb{R}^{3 \times 4}$$

K is the camera intrinsic matrix, and R is the camera rotation matrix relative to the 3D reference coordinate system. Since one of the coordinates X, Y, Z is fixed, and u and v are given as well, there are remaining three unknown variables for three equations, leading to a unique solution.

15.4 Multi-Camera Strict Epi-Polar Editing Mode

The strict epi-polar editing mode is a very powerful mode to place the 3D objects in the 3D space in accordance with the captured camera views. To this end, the user needs to open two camera view windows and selects two different cameras. These two cameras should show the object that is to be partially modelled in the 3D space to help the depth estimation.

Figure 33:
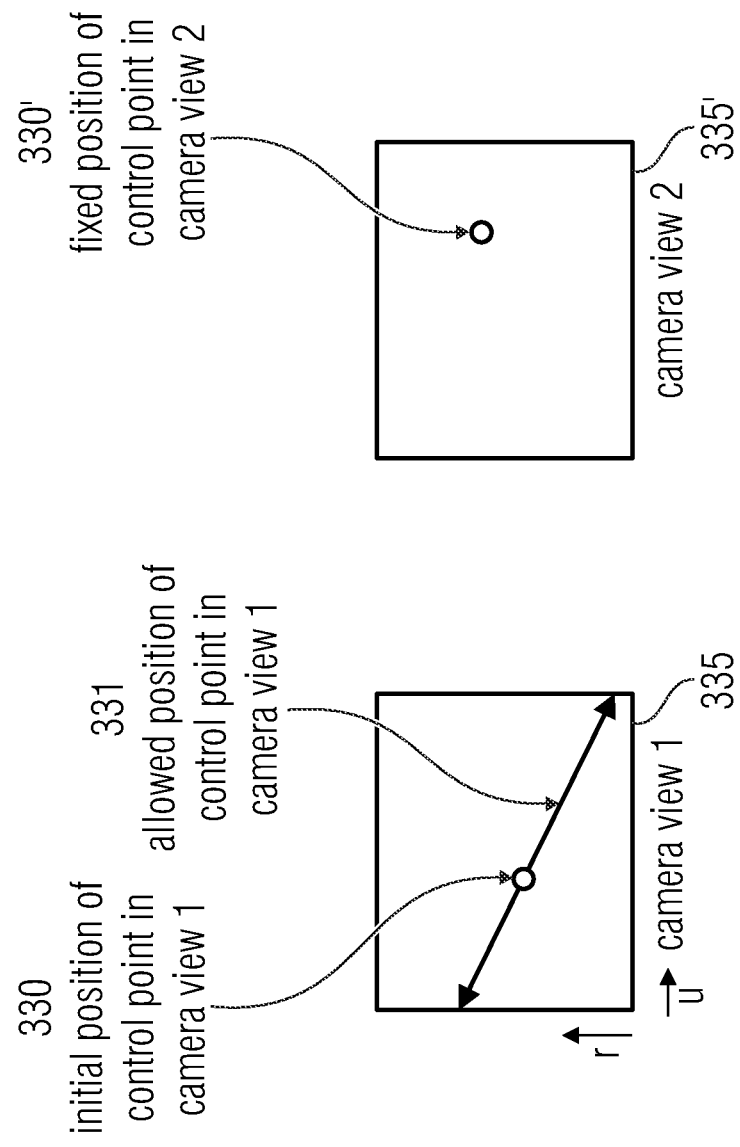

With reference to FIG. 33, the user is allowed to pick a control point (e.g. corner point of a triangle) 330 of a mesh, a line or a spline and shift it in the pixel coordinate system (also called u-v coordinate system in the image space) of the selected camera view. In other words, the selected control point is projected to/imaged by the selected camera view, and then the user is allowed to shift this projected control point in the image coordinate system. The location of the control point in the 3D space is then adjusted in such a way so that its projection to the camera view corresponds to the new position selected by the user. The possible movements in the image coordinate system are however restricted by assuming that the position of the same control point (330') in the other camera view (335') does not change. Hence, the user is only allowed to change the control point in camera 1 along the epi-polar line 331 of the selected camera pair. In other words, given a control point of a 3D mesh that is depicted in camera view 1 (335) by point 330 and in camera view 2 (335) by point 330', it is assumed that in camera view 2 (335') the control point location 330' is already on the right pixel showing the desired object element. Then the user moves the control point position 330 in camera view 1 in such a way that its location matches with the same object element than for camera view 2. By these means, the user can precisely set the depth of the modified control point.

Accordingly, it is possible to define a method including:
  selecting a first 2D image (e.g., 335) of the space and a second 2D image (e.g., 335') of the space, wherein the first and second 2D images have been acquired at camera positions in a predefined positional relationship with each other;
  displaying at least the first 2D image (e.g., 335),
  guiding a user to select a control point in the first 2D image (e.g., 335), wherein the selected control point (e.g., 330) is a control point (e.g., 210) of an element (e.g., 200a-200i) of a structure (e.g., 200) forming a surface approximation or an exclusive volume or an inclusive volume;
  guiding the user to selectively translate the selected point (e.g., 330), in the first 2D image (e.g., 335), while limiting the movement of the point along the epi-polar line (e.g., 331) associated to the point (e.g., 330') in the second 2D image (e.g., 335'), wherein point (e.g., 330') corresponds to the same control point (e.g., 210) of the element (e.g., 200a-200i) of a structure (e.g., 200) than point (e.g., 330),
  so as to define a movement of the element (e.g., 200a-200i) of the structure (e.g., 200) in the 3D space.

15.5 Multi-Camera Free Epi-Polar Editing Mode

In this example, the user selects two different camera views displayed in two windows. These two cameras are in a predetermined spatial relationship with each other. The two images show the object, that shall be at least partially modelled in the 3D space to help the depth estimation.

Figure 34:
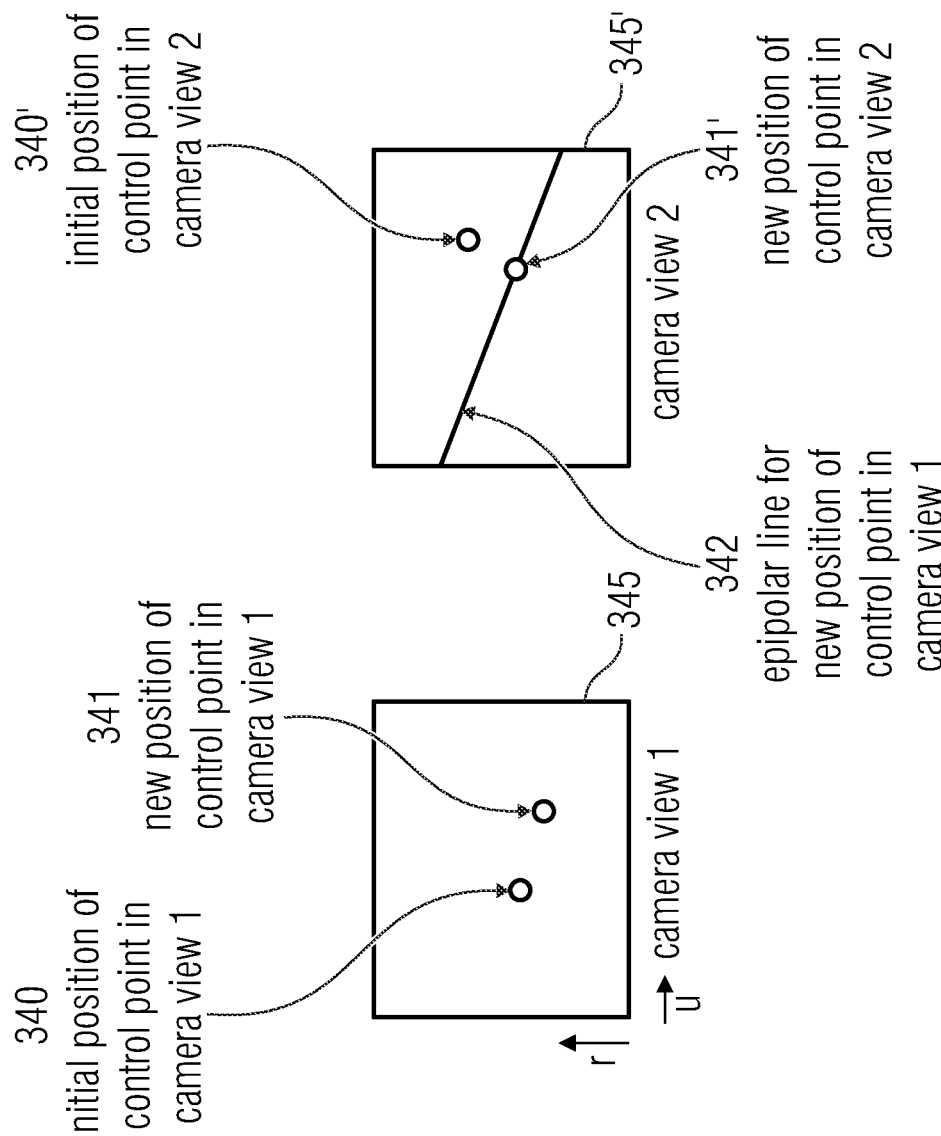

Similar to the previous section, consider, with reference to FIG. 34, a mesh control point that is imaged in camera view 1 (345) at position 340, and in camera view 2 at position 340'. The user is then allowed to pick the control point 340 of a mesh, a line or a spline in camera view 1 (345) and shift it in the image space or image coordinate system. While the strict epi-polar editing mode of the previous example assumes a fixed position of the control point 340' in the second camera view, the free epi-polar editing mode of the present example assumes that the control point 340' in the second camera view is shifted as little as possible. In other words, the user can freely shift the control point in camera view 1, e.g., from 340 to 341. The depth value of the control point is then computed in such a way that the control point in camera view 2 (345') needs to be shifted as little as possible.

Technically, this is possible by computing the epi-polar line 342 given by the new position 341 of the control point in the camera view 1. The control point in camera view 2 is then adjusted such that it lies on this epi-polar line 342, but has minimum distance to its original position.

Accordingly, it is possible to define a method including:
  selecting a first 2D image (e.g., 345) of the space and a second 2D image (e.g., 345') of the space, wherein the first and second 2D images have been acquired at camera positions in a predefined positional relationship with each other;
  displaying at least the first 2D image (e.g., 345),
  guiding a user to select a first control point (e.g., 340) in the first 2D image (e.g., 345), wherein the first control point (340) corresponds to a control point (e.g., 210) of an element (e.g., 200a-200i) of a structure (e.g., 200) forming a surface approximation or an exclusive volume or an inclusive volume;
  obtaining from the user a selection associated to a new position (e.g., 341) for the first control point in the first 2D image (e.g., 345);
  restricting the new position in the space of the control point (e.g. 210) as a position on the epi-polar line (e.g., 342), in the second 2D image (e.g., 345'), associated to the new position (e.g., 341) of the first control point in the first 2D image (e.g., 345), and determining the new position in the space as the position (e.g., 341') of a second control point on the epi-polar line (e.g., 342) which is closest to the initial position (e.g., 340') in the second 2D image (e.g., 345'),
  wherein the the second control point (e.g., 340') corresponds to the same control point (e.g., 210) of the element (e.g., 200a-200i) of a structure (e.g., 200) than the first control point (e.g., 340),
  so as to define a movement of the element (e.g., 200a-200i) of the structure (e.g., 200).

15.6 A General Technique for the Interaction with the User

With reference to the examples above, it is possible to perform the following procedure:

- a first, coarse localization is performed (e.g., at step 34) from multiple views (e.g., from 2D images 313a-313e);
- then, at least one image (e.g., the virtual image 314 and/or at least one of the images 313a-313f) is visualized or rendered;
- with a visual inspection for the user to identify the errors regions (e.g., 314 in the virtual image 314, or any of region 316d, 316e, 316f', 316f''' in images 313a-313f) (alternatively, the inspection may be performed automatically);
- for example, the user understands that the region 316f''' has been wrongly contributed to the rendering or displaying of the region 316 by understanding from image semantics that region 316f''' can never contribute to the object shown in region 316 (this may have been generated, for example, by one of the issues shown in FIGS. 5 and 6, relating to occluding objects)
- in order to cope with, the user (e.g., at step 35 or 351) sets some constraints, such as:
  - at least one surface approximation (e.g., 92, 32, 142, 182, 372b, etc.), e.g. for the object shown in region 316f'''(in some examples, the surface approximation may automatically generate an inclusive volume as in the examples of FIGS. 18 and 20-24; in some examples, the surface approximation may be associated to other values such as a tolerance value $t_0$ as in the example of FIG. 14); and/or
  - at least one inclusive volume (e.g., 86, 96, 136a-136f, 376, 376b, etc.), e.g. for the object shown in region 316f''' (in some examples, as in FIG. 37, the definition of an inclusive volume 376 for one camera may cause the automatic creation of an exclusive volume 379); and/or
  - at least one exclusive volume (e.g., 299a-299e, 379, etc.), e.g. in between the object shown in region 316f''' and another object;
  - for example, the user may manually create inclusive volumes in correspondence to regions 316f' and 316f''' (e.g., around the objects that are in the regions 316f' and 316f'''), or an exclusive volume between region 316f' and 316f''', or surface approximations in correspondence to regions 316f' and 316f''' (e.g., within the objects in regions 316b' and 316b''');
- after having set the constraints, the range of candidate spatial positions is restricted to a restricted range of admissible candidate spatial positions (e.g., at step 351) (for example, the area between regions 316f' and 316f''' may be excluded from the restricted range of admissible candidate spatial positions);
- subsequently, similarity metrics may be processed only in the restricted range of admissible candidate spatial positions, so as to more correctly localize the object elements in the regions 316f' and 316f''' (and in case also those in the other regions associated to the marked region 316) (Alternatively, they could have been stored in a previous run, and can now be reused);
- hence, the depth map(s) of images 313f and 314 are updated;
- the procedure may be reinitiated or, in case the user is satisfied, the obtained depth maps and/or localizations may be stored.

16 ADVANTAGES OF THE PROPOSED SOLUTION AND FURTHER EXAMPLES

See section 6

Applicable to a wide range of depth estimation procedures

Derivation of multiple constraint types (depth range, normal range) from the same user input Use of standard 3D graphics software to generate the user constraints. By these means, the user gets a very powerful toolset to draw the user constraints

16.1 Other Examples

In general terms, the strategies discussed above may be implemented for refining a previously obtained depth map (or at least a previously localized object element).

It is possible to implement, for example, the following iterative procedure:

- from a previous step, a depth map is provided, or at least one the localization of an object element (e.g., 93) is provided;
- with the depth map or the localized object element, a reliability (or confidence) is measured (e.g., as in [17]);
- in case the reliability is below a predetermined threshold C0 (unsatisfactory localization), a new iteration is performed, e.g., by:
  - deriving a range or interval of candidate spatial positions (e.g., 95) for the imaged space element (e.g., 93) on the basis of predefined positional relationships;
  - restricting (e.g., 35, 36) the range or interval of candidate spatial positions to at least one restricted range or interval of admissible candidate spatial positions (e.g., 93a), wherein restricting includes at least one of one of the following constraints:
    - limiting the range or interval of candidate spatial positions using at least one inclusive volume (e.g., 96) surrounding at least one determined object (e.g., 91) (the inclusive volume may be defined manually by the user, for example); and/or
    - limiting the range or interval of candidate spatial positions using at least one exclusive volume (e.g., defined manually or as in FIG. 37) including non-admissible candidate spatial positions; and/or
    - defining (e.g., manually by a user) at least one surface approximation (e.g., 142) and one tolerance interval (e.g., $t_0$), so as to limit the at least one range or interval of candidate spatial positions to a restricted range or interval of candidate spatial positions (e.g., 147) defined by the tolerance interval, wherein the tolerance interval has:
      - a distal extremity (e.g., 143''') defined by the at least one surface approximation (e.g., 142); and
      - a proximal extremity (e.g., 147') defined on the basis of the tolerance interval; and
    - retrieving, among the admissible candidate spatial positions of the restricted range or interval, a most appropriate candidate spatial position on the basis of similarity metrics
  - retrieving (e.g., 37), among the admissible candidate spatial positions of the restricted range or interval (e.g., 93a), a most appropriate candidate spatial position (e.g., 93) on the basis of similarity metrics.

This method may be repeated (as in FIG. 3), so as to increase reliability. Hence, a previous, rough depth map (e.g., even if obtained with another method) may be refined. The user may create constraints (e.g., surface approximations and/or inclusive volumes and/or exclusive volumes) and may, after visual inspection, remedy by indicating incorrect region(s) in a previously obtained depth which need to be processed with higher reliability. The user may easily insert such constraints which are subsequently automatically processed with a method as above. Hence, it is not needed to refine the whole depth map, while it is simply possible to restrict the similarity analysis to only some portions of the depth map, hence reducing the computational effort for refining the depth map.

Therefore, the method above is an example of a method for localizing, in a space containing at least one determined object, an object element associated to a particular 2D representation element in a determined 2D image of the space, the method comprising:
- obtaining a spatial position for the imaged space element;
- obtaining a reliability or unreliability value for this spatial position of the imaged space element;
- in case of the reliability value does not comply with a predefined minimum reliability or the unreliability does not comply with a predefined maximum unreliability, performing the method of any of the preceding claims.

It is also possible to implement an iterative method based on the example of FIG. 14. For example, a user may choose a surface approximation 142 for an object 141 and define a predetermined tolerance value $t_0$, which will subsequently determine the restricted range or interval of admissible candidate positions 147. As can be understood from FIG. 14, the interval 147 (and the tolerance value $t_0$ as well) shall be large enough to enclose the real surface of the object 141. However, there arises the risk that the interval 147 is so large, that encloses another, unintended, different object. Therefore, it is possible to have an iterative solution in which a tolerance value is decreased (or increased, in other cases) if the result is not satisfying. In some examples, it is possible to verify whether the reliability (e.g., as in [17]) complies with a predefined minimum reliability or the unreliability does not comply with a predefined maximum unreliability, and to use a different tolerance value (e.g., increased or reduced tolerance value $t_0$).

In general terms, methods above may permit to attain a method for refining, in a space containing at least one determined object, the localization of an object element associated to a particular 2D representation element in a determined 2D image of the space, the method comprising a method according to any of the preceding claims, wherein while restricting, at least one of the at least one inclusive volume, at least one surface approximation, and at least one surface approximation is selected by the user.

17 FURTHER EXAMPLES

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

17 LITERATURE

[1] H. Yuan, S. Wu, P. An, C. Tong, Y. Zheng, S. Bao, and Y. Zhang, "Robust Semiautomatic 2D-to-3D Conversion with Welsch M-Estimator for Data Fidelity," Mathematical Problems in Engineering, vol. 2018. p. 15, 2018.

[2] D. Donatsch, N. Farber, and M. Zwicker, "3D conversion using vanishing points and image warping," in 3DTV-Conference: The True Vision-Capture, Transmission and Display of 3D Video (3DTV-CON), 2013, 2013, pp. 1-4.

[3] X. Cao, Z. Li, and Q. Dai, "Semi-automatic 2D-to-3D conversion using disparity propagation," IEEE Transactions on Broadcasting, vol. 57, no. 2, pp. 491-499, 2011.

[4] S. Knorr, M. Hudon, J. Cabrera, T. Sikora, and A. Smolic, "DeepStereoBrush: Interactive Depth Map Creation," International Conference on 3D Immersion, Brussels, Belgium, 2018.

[5] C. Lin, C. Varekamp, K. Hinnen, and G. de Haan, "Interactive disparity map post-processing," in Second International Conference on 3D Imaging, Modeling, Processing, Visualization and Transmission (3DIMPVT), 2012, 2012, pp. 448-455.

[6] M. O. Wildeboer, N. Fukushima, T. Yendo, M. P. Tehrani, T. Fujii, and M. Tanimoto, "A semi-automatic depth estimation method for FTV," Special Issue Image Processing/Coding and Applications, vol. 64, no. 11, pp. 1678-1684, 2010.

[7] S. D. Cohen, B. L. Price, and C. Zhang, "Stereo correspondance smoothness tool," U.S. Pat. No. 9,208, 547 B2, 2015.

[8] K.-K. Kim, "Apparatus and Method for correcting disparity map," U.S. Pat. No. 9,208,541 B2, 2015.

[9] Michael Bleyer, Christoph Rhemann, Carsten Rother, "PatchMatch Stereo-Stereo Matching with Slanted Support Windows", BMVC 2011 http://dx.doi.org/10.5244/C.25.14
[10] https://github.com/alicevision/MeshroomMaya
[11] Heiko Hirschmüller and Daniel Scharstein, "Evaluation of Stereo Matching Costs on Images with Radiometric Differences", IEEE Transactions on pattern analysis and machine intelligence, August 2008
[12] Johannes L. Schönberger, Jan-Michael Frahm, "Structure-from-Motion Revisited", Conference on Computer Vision and Pattern Recognition (CVPR), 2016
[13] Johannes L. Schönberger, Enliang Zheng, Marc Pollefeys, Jan-Michael Frahm, "Pixelwise View Selection for Unstructured Multi-View Stereo", ECCV 2016: Computer Vision-ECCV 2016 pp 501-518
[14] Blender, "Blender Renderer Passes", https://docs.blender.org/manual/en/latest/render/blender_render/settings/passes.html, accessed 18.12.2018
[15] Glyph, The Glyph Mattepainting Toolik, http://www.glyphfx.com/mptk.html, accessed 18 Dec. 2018
[16] Enwaii, "Photogrammetry software for VFX-Ewasculpt", http://www.banzai-pipeline.com/product_enwasculpt.html, accessed 18 Dec. 2018
[17] Ron Op het Veld, Joachim Keinert, "Concept for determining a confidence/uncertainty measure for disparity measurement", EP18155897.4

What is claimed is:

1. A method for localizing, in a space comprising at least one determined object, an object element associated to a particular 2D representation element in a determined 2D image of the space, the method comprising:
deriving a range or interval of candidate spatial positions for the imaged object element on the basis of pre-defined positional relationships;
restricting the range or interval of candidate spatial positions to at least one restricted range or interval of admissible candidate spatial positions, wherein restricting comprises defining at least one surface approximation, so as to limit the at least one range or interval of candidate spatial positions to a restricted range or interval of candidate spatial positions;
considering a normal vector of the surface approximation located at the intersection between the surface approximation and the range or interval of candidate spatial positions;
retrieving, among the admissible candidate spatial positions of the restricted range or interval, a most appropriate candidate spatial position on the basis of similarity metrics, wherein retrieving comprises retrieving, among the admissible candidate spatial positions of the restricted range or interval and on the basis of the normal vector, a most appropriate candidate spatial position on the basis of similarity metrics involving the normal vector,
wherein
retrieving comprises processing similarity metrics for at least one candidate spatial position for the particular 2D representation element,
wherein processing involves further 2D representation elements within a particular neighborhood of the particular 2D representation element,
wherein processing comprises acquiring a vector $\vec{n}$ among a plurality of vectors within a predetermined range defined from vector $\vec{n}_0$, to derive a candidate spatial position, associated to vector $\vec{n}$, for each of the other 2D representation elements, under the assumption of a planar surface of the object in the object element, wherein the candidate spatial position is used to determine the contribution of each of the 2D representation elements, in the neighborhood to the similarity metrics.

2. A method for localizing, in a space comprising at least one determined object, an object element associated to a particular 2D representation element in a determined 2D image of the space, the method comprising:
deriving a range or interval of candidate spatial positions for the imaged object element on the basis of pre-defined positional relationships;
restricting the range or interval of candidate spatial positions to at least one restricted range or interval of admissible candidate spatial positions, wherein restricting comprises defining at least one surface approximation, so as to limit the at least one range or interval of candidate spatial positions to a restricted range or interval of candidate spatial positions;
considering a normal vector of the surface approximation located at the intersection between the surface approximation and the range or interval of candidate spatial positions;
retrieving, among the admissible candidate spatial positions of the restricted range or interval, a most appropriate candidate spatial position on the basis of similarity metrics, wherein retrieving comprises retrieving, among the admissible candidate spatial positions of the restricted range or interval and on the basis of the normal vector, a most appropriate candidate spatial position on the basis of similarity metrics involving the normal vector,
wherein retrieving is based on a relationship of the type:

$$\frac{1}{D(x_0, y_0, x, y, d, \vec{n})} = \frac{1}{d} \cdot \frac{\vec{n} \cdot K^{-1} \cdot \begin{bmatrix} x \\ y \\ 1 \end{bmatrix}}{\vec{n} \cdot K^{-1} \cdot \begin{bmatrix} x_0 \\ y_0 \\ 1 \end{bmatrix}}$$

where $(x_0, y_0)$ is the particular 2D representation element, $(x, y)$ are elements in a neighborhood of $(x_0, y_0)$, K is the intrinsic camera matrix, d is a depth candidate representing the candidate spatial position, $D(x_0, y_0, x, y, d, \vec{n})$ is a function that computes a depth candidate for the particular 2D representation element $(x, y)$ based on the depth candidate d for the particular 2D representation element $(x_0, y_0)$ under the assumption of a planar surface of the object in the object element.

3. The method of claim 2, wherein retrieving is based on evaluating a similarity metric $c_{sum}(d)$ of the type $$c_{sum}(d, \vec{n}) = \sum_{(x,y) \in N(x_0, y_0)} c(x, y, D(x_0, y_0, x, y, d, \vec{n}))$$

where $\Sigma_{(x,y) \in N(x_0, y_0)}$ represents a sum or a general aggregation function.

4. A method for localizing, in a space comprising at least one determined object, an object element associated to a particular 2D representation element in a determined 2D image of the space, the method comprising:
- deriving a range or interval of candidate spatial positions for the imaged object element on the basis of predefined positional relationships;
- restricting the range or interval of candidate spatial positions to at least one restricted range or interval of admissible candidate spatial positions, wherein restricting comprises defining at least one surface approximation, so as to limit the at least one range or interval of candidate spatial positions to a restricted range or interval of candidate spatial positions;
- considering a normal vector of the surface approximation located at the intersection between the surface approximation and the range or interval of candidate spatial positions;
- retrieving, among the admissible candidate spatial positions of the restricted range or interval, a most appropriate candidate spatial position on the basis of similarity metrics, wherein retrieving comprises retrieving, among the admissible candidate spatial positions of the restricted range or interval and on the basis of the normal vector, a most appropriate candidate spatial position on the basis of similarity metrics involving the normal vector,
- wherein restricting comprises acquiring a vector $\vec{n}$ normal to the at least one determined object at the intersection with the range or interval of candidate spatial positions among a range or interval of admissible vectors within a maximum inclination angle relative to the normal vector $\vec{n_0}$.

5. A method for localizing, in a space comprising at least one determined object, an object element associated to a particular 2D representation element in a determined 2D image of the space, the method comprising:
- deriving a range or interval of candidate spatial positions for the imaged object element on the basis of predefined positional relationships;
- restricting the range or interval of candidate spatial positions to at least one restricted range or interval of admissible candidate spatial positions, wherein restricting comprises defining at least one surface approximation, so as to limit the at least one range or interval of candidate spatial positions to a restricted range or interval of candidate spatial positions;
- considering a normal vector of the surface approximation located at the intersection between the surface approximation and the range or interval of candidate spatial positions;
- retrieving, among the admissible candidate spatial positions of the restricted range or interval, a most appropriate candidate spatial position on the basis of similarity metrics, wherein retrieving comprises retrieving, among the admissible candidate spatial positions of the restricted range or interval and on the basis of the normal vector, a most appropriate candidate spatial position on the basis of similarity metrics involving the normal vector,
- wherein restricting comprises acquiring the vector normal to the at least one determined object according to $$\vec{n} \in \left\{ \begin{pmatrix} \sin\theta \cdot \cos\phi \\ \sin\theta \cdot \sin\phi \\ \cos\theta \end{pmatrix} \mid 0 \le \theta \le \theta_{max}, 0 \le \phi \le 2\pi \right\}$$

where $\theta$ is the inclination angle around the normal vector $\vec{n_0}$, $\theta_{max}$ is a predefined maximum inclination angle, $\phi$ is the azimuth angle, and where $\vec{n}$ is interpreted relative to an orthonormal coordinate system whose third axes is parallel to $\vec{n_0}$ and whose other two axes are orthogonal to $\vec{n_0}$.

6. The method of claim 1, wherein the normal vector is different for different restricted ranges of admissible candidate spatial positions associated to the same range of candidate spatial positions.

7. The method of claim 1, wherein the surface approximation is selected by a user.

8. The method of claim 1, wherein the at least one surface approximation is comprised within the at least one object.

9. The method of claim 1, wherein the at least one surface approximation is a rough approximation of the at least one object.

10. The method of claim 1, wherein restricting comprises finding an intersection between the range or interval of candidate positions with at least one of the inclusive volume and/or surface approximation.

11. The method of claim 1, wherein restricting comprises finding an extremity of a restricted range or interval of candidate positions with at least one of the inclusive volume and/or surface approximation.

12. A system for localizing, in a space for comprising at least one determined object, an object element associated to a particular 2D representation element in a determined 2D image of the space, the system comprising:
- a deriving block for deriving a range or interval of candidate spatial positions for the imaged object element on the basis of predefined positional relationships, wherein the range or interval of candidate spatial positions for the imaged object element is developed in a depth direction with respect to the determined 2D representation element;
- a restricting block for restricting the range or interval of candidate spatial positions to at least one restricted range or interval of admissible candidate spatial positions;
- a retrieving block for retrieving, among the admissible candidate spatial positions of the restricted range or interval, a most appropriate candidate spatial position on the basis of similarity metrics, wherein retrieving comprises retrieving, among the admissible candidate spatial positions of the restricted range or interval and on the basis of a normal vector, a most appropriate candidate spatial position on the basis of similarity metrics involving the normal vector, wherein the normal vector of the surface approximation is located at the intersection between the surface approximation and the range or interval of candidate spatial positions,
- wherein
- the retrieving block is configured for processing similarity metrics for at least one candidate spatial position for the particular 2D representation element, wherein processing involves further 2D representation elements within a particular neighborhood of the particular 2D representation element, wherein processing comprises acquiring a vector $\vec{n}$ among a plurality of vectors within a predetermined range defined from vector $\vec{n_0}$, to derive a candidate spatial position, associated to vector $\vec{n}$, for each of the other 2D representation elements, under the assumption of a planar surface of the object in the object element, wherein the candidate spatial position is used to determine the contribution of each of the 2D representation elements, in the neighborhood to the similarity metrics.

13. A non-transitory storage unit comprising instructions which, when executed by a processor, cause the processor to perform a method for localizing, in a space containing at least one determined object, an object element associated to a particular 2D representation element in a determined 2D image of the space, the method comprising:
- deriving a range or interval of candidate spatial positions for the imaged object element on the basis of pre-defined positional relationships;
- restricting the range or interval of candidate spatial positions to at least one restricted range or interval of admissible candidate spatial positions, wherein restricting comprises defining at least one surface approximation, so as to limit the at least one range or interval of candidate spatial positions to a restricted range or interval of candidate spatial positions;
- considering a normal vector of the surface approximation located at the intersection between the surface approximation and the range or interval of candidate spatial positions;
- retrieving, among the admissible candidate spatial positions of the restricted range or interval, a most appropriate candidate spatial position on the basis of similarity metrics, wherein retrieving comprises retrieving, among the admissible candidate spatial positions of the restricted range or interval and on the basis of the normal vector, a most appropriate candidate spatial position on the basis of similarity metrics involving the normal vector, wherein retrieving comprises processing similarity metrics for at least one candidate spatial position for the particular 2D representation element, wherein processing involves further 2D representation elements within a particular neighborhood of the particular 2D representation element, wherein processing comprises acquiring a vector $\vec{n}$ among a plurality of vectors within a predetermined range defined from vector $\vec{n}_0$, to derive a candidate spatial position, associated to vector $\vec{n}$, for each of the other 2D representation elements, under the assumption of a planar surface of the object in the object element, wherein the candidate spatial position is used to determine the contribution of each of the 2D representation elements, in the neighborhood to the similarity metrics.

* * * * *